(12) United States Patent
Takahashi et al.

(10) Patent No.: US 12,451,714 B2
(45) Date of Patent: Oct. 21, 2025

(54) POWER STORAGE DEVICE AND METHOD FOR OPERATING POWER STORAGE DEVICE

(71) Applicant: Semiconductor Energy Laboratory Co., Ltd., Atsugi (JP)

(72) Inventors: Kei Takahashi, Isehara (JP); Takayuki Ikeda, Atsugi (JP); Takanori Matsuzaki, Atsugi (JP); Munehiro Kozuma, Atsugi (JP); Hiroki Inoue, Atsugi (JP); Ryota Tajima, Isehara (JP); Yohei Momma, Isehara (JP); Mayumi Mikami, Atsugi (JP); Kazutaka Kuriki, Ebina (JP); Shunpei Yamazaki, Setagaya (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 847 days.

(21) Appl. No.: 17/286,088

(22) PCT Filed: Oct. 16, 2019

(86) PCT No.: PCT/IB2019/058799
§ 371 (c)(1),
(2) Date: Apr. 16, 2021

(87) PCT Pub. No.: WO2020/084398
PCT Pub. Date: Apr. 30, 2020

(65) Prior Publication Data
US 2021/0384751 A1    Dec. 9, 2021

(30) Foreign Application Priority Data
Oct. 25, 2018    (JP) .................................. 2018-200834

(51) Int. Cl.
*H02J 7/00* (2006.01)
*H10B 12/00* (2023.01)
(Continued)

(52) U.S. Cl.
CPC ........ *H02J 7/00712* (2020.01); *H02J 7/0029* (2013.01); *H02J 7/0071* (2020.01); *H10B 12/00* (2023.02)

(58) Field of Classification Search
CPC .... H02J 7/00712; H02J 7/0071; H02J 7/0029; H10B 12/00
See application file for complete search history.

(56) References Cited

U.S. PATENT DOCUMENTS 4,777,424 A * 10/1988 Sakamura ........... H02M 3/1563
                                                          320/140
5,959,437 A    9/1999 Hamaguchi
(Continued)

FOREIGN PATENT DOCUMENTS

CN    001199264 A    11/1998
JP    10-224981 A    8/1998
(Continued)

OTHER PUBLICATIONS

Garaipoom "How does NE555 timer circuit work" https://www.eleccircuit.com/555-timer-circuit-works/ Aug. 5, 2023 (Year: 2023).*
(Continued)

*Primary Examiner* — Drew A Dunn
*Assistant Examiner* — Pamela J Jeppson
(74) *Attorney, Agent, or Firm* — Eric J. Robinson, Robinson Intellectual

(57) ABSTRACT

A battery control circuit with a novel structure, a battery protection circuit with a novel structure, and a power storage device including either of the battery circuits are provided. The power storage device includes a first circuit portion, a
(Continued)

second circuit portion, a third circuit portion, and a secondary battery; the first circuit portion has a function of controlling charging of the secondary battery; the first circuit portion has a function of supplying the start time and the end time of the charging of the secondary battery to the third circuit portion; the second circuit portion has functions of generating a first voltage and a first current and supplying them to the third circuit portion; the third circuit portion has a function of generating a second voltage by charging the first current in a capacitor; and the third circuit portion has a function of comparing the first voltage and the second voltage.

10 Claims, 32 Drawing Sheets

(51) Int. Cl.
 *H10B 41/70* (2023.01)
 *H10B 99/00* (2023.01)

(56) References Cited

U.S. PATENT DOCUMENTS

| | | | |
|---|---|---|---|
| 8,471,526 B2 | 6/2013 | Kanno | |
| 8,749,204 B2 | 6/2014 | Majima et al. | |
| 10,091,563 B2 | 10/2018 | Koyama | |
| 2004/0218384 A1* | 11/2004 | Newton | H02J 7/0044 |
| | | | 362/183 |
| 2005/0195098 A1* | 9/2005 | Panov | H03M 1/682 |
| | | | 341/154 |
| 2008/0197707 A1* | 8/2008 | Chi Yang | H02J 7/0068 |
| | | | 320/162 |
| 2010/0239896 A1 | 9/2010 | Kanno | |
| 2010/0307559 A1 | 12/2010 | Yamazaki et al. | |
| 2011/0187329 A1 | 8/2011 | Majima et al. | |
| 2011/0267726 A1 | 11/2011 | Ikeuchi et al. | |
| 2013/0271220 A1* | 10/2013 | Takahashi | H03F 1/0261 |
| | | | 330/293 |
| 2018/0102741 A1 | 4/2018 | Takahashi et al. | |
| 2021/0190471 A1 | 6/2021 | Ikeda et al. | |
| 2021/0242690 A1 | 8/2021 | Okamoto et al. | |
| 2021/0294367 A1 | 9/2021 | Takahashi et al. | |

FOREIGN PATENT DOCUMENTS

| | | | | |
|---|---|---|---|---|
| JP | 10-322917 A | 12/1998 | | |
| JP | H10322917 A | * 12/1998 | | G01R 31/392 |
| JP | 2000-092735 A | 3/2000 | | |
| JP | 2002-345164 A | 11/2002 | | |
| JP | 2010-066161 A | 3/2010 | | |
| JP | 2010-220389 A | 9/2010 | | |
| KR | 1998-0071235 A | 10/1998 | | |
| TW | I514598 | 12/2015 | | |
| WO | WO-2010/140495 | 12/2010 | | |

OTHER PUBLICATIONS

Machine translation of Takeno et al. JPH10322917A. (Year: 1998).*
Electronics Tutorials "Introduction to Capacitors" https://www.electronics-tutorials.ws/capacitor/cap_1.html (Year: 2021).*
International Search Report (Application No. PCT/IB2019/058799) Dated Dec. 24, 2019.
Written Opinion (Application No. PCT/IB2019/058799) Dated Dec. 24, 2019.
Taiwanese Office Action (Application No. 108138117) Dated May 3, 2023.
Chinese Office Action (Application No. 201980070395.3) Dated Sep. 7, 2024.

* cited by examiner

103

$V_B = V_R + V_C$ $V_R = 0V$
$V_B = V_C$ $V_B = V_R + V_C$ $V_B$=constant $V_B = V_C$

POWER STORAGE DEVICE AND METHOD FOR OPERATING POWER STORAGE DEVICE

TECHNICAL FIELD

One embodiment of the present invention relates to a semiconductor device and an operation method of the semiconductor device. One embodiment of the present invention relates to a battery control circuit, a battery protection circuit, a power storage device, and an electronic device.

Note that one embodiment of the present invention is not limited to the above technical field. The technical field of the invention disclosed in this specification and the like relates to an object, a method, or a manufacturing method. One embodiment of the present invention relates to a process, a machine, manufacture, or a composition of matter. Thus, more specifically, examples of the technical field of one embodiment of the present invention disclosed in this specification include a display device, a light-emitting device, a power storage device, an imaging device, a memory device, a driving method thereof, and a manufacturing method thereof.

BACKGROUND ART

Power storage devices (also referred to as batteries or secondary batteries) have been utilized in a wide range of areas from small electric devices to automobiles. As the application range of batteries expands, the number of applications each with a multi-cell battery stack where a plurality of battery cells are connected in series increases.

The power storage device is provided with a circuit for detecting an abnormality at charging and discharging, such as overdischarging, overcharging, overcurrent, or a short circuit. In such a circuit performing protection and control of a battery, data of a voltage, a current, and the like is obtained in order to detect the abnormality at charging and discharging. Also in such a circuit, stop of charging and discharging, cell balance, and the like are controlled on the basis of the observed data.

Patent Document 1 discloses a protection IC that functions as a battery protection circuit. Patent Document 1 discloses a protection IC that detects abnormality in charging and discharging by comparing, using a plurality of comparators provided inside, a reference voltage and a voltage of a terminal to which a battery is connected.

Patent Document 2 discloses a battery state detector that detects a micro short circuit of a secondary battery and a battery pack incorporating the detector.

Patent Document 3 discloses a protection semiconductor device for protecting an assembled battery in which secondary battery cells are connected in series.

REFERENCE

Patent Document

[Patent Document 1] Specification of United States Patent Application Publication No. 2011-267726
[Patent Document 2] Japanese Published Patent Application No. 2010-66161
[Patent Document 3] Japanese Published Patent Application No. 2010-220389

SUMMARY OF THE INVENTION

Problems to be Solved by the Invention

It is preferable that a power storage device of one embodiment of the present invention detect a micro short circuit or detect a sign of a micro short circuit to improve the safety of a secondary battery.

A micro short circuit refers to a minute short circuit in a secondary battery, and is not a short circuit of a positive electrode and a negative electrode of a secondary battery which makes charging and discharging impossible but a phenomenon in which a small amount of short circuit current flows through a minute short circuit portion for a short period. A micro short circuit is presumably caused in the following manner: a plurality of charging and discharging operations generate deterioration, a metal element such as lithium or cobalt is precipitated in the battery, the growth of the precipitate generates a local current concentration in part of a positive electrode and part of a negative electrode, and the function of a separator partially stops or a by-product is generated.

A thinner separator is desired for a smaller secondary battery, and furthermore, charging by high-speed power feeding at a high voltage is desired, both of which have a structure where a micro short circuit easily occurs in a secondary battery.

Conventionally, device designers set the upper limit voltage and the lower limit voltage of a secondary battery and limit the upper limit of the external output current. The range from the lower limit voltage to the upper limit voltage of the secondary battery is a recommended voltage range, and detection of abnormalities which occur within that range, such as a micro short circuit, is not performed with a protection circuit or the like. Therefore, repeated flows of an instantaneous large current due to a micro short circuit may lead to abnormal heat generation and serious accidents, such as firing, of a secondary battery. Thus, a micro short circuit is preferably found at an early stage. In addition, charging and discharging control of a battery for reducing this risk is also required.

An object of one embodiment of the present invention is to provide a novel battery control circuit, a novel battery protection circuit, a power storage device, an electronic device, or the like. One embodiment of the present invention can reduce power consumption. Another object of one embodiment of the present invention is to provide a battery control circuit, a battery protection circuit, a power storage device, an electronic device, or the like which has a novel structure.

Another object of one embodiment of the present invention is to provide a highly safe power storage device that detects a micro short circuit or detects a sign of a micro short circuit in a secondary battery.

Note that the objects of one embodiment of the present invention are not limited to the objects listed above. The objects listed above do not preclude the existence of other objects. Note that the other objects are objects that are not described in this section and will be described below. The objects that are not described in this section will be derived from the description of the specification, the drawings, and the like and can be extracted from the description by those skilled in the art. Note that one embodiment of the present invention is to solve at least one of the description listed above and/or the other objects.

Means for Solving the Problems (1) One embodiment of the present invention is a power storage device including a first circuit portion, a second circuit portion, a third circuit portion, and a secondary battery. The first circuit portion has a function of controlling a charging of the secondary battery. The first circuit portion has a function of informing a start of the charging of the secondary battery to the third circuit portion. The second circuit portion has functions of generating a first voltage and a first current and supplying the first voltage and the first current to the third circuit portion. The third circuit portion has a function of generating a second voltage by charging the first current in the capacitor. The comparator has a function of comparing the first voltage and the second voltage.

(2) In the structure of the above (1), it is preferable that the second circuit portion generate the first voltage by converting a digital signal supplied from the first circuit portion, and the first voltage be an analog signal.

(3) In the structure of the above (1) or (2), it is preferable that the third circuit portion include a transistor; a channel formation region of the transistor contain indium, zinc, and an element M; the element M be one or more elements selected from aluminum, gallium, yttrium, copper, vanadium, beryllium, boron, titanium, iron, nickel, germanium, zirconium, molybdenum, lanthanum, cerium, neodymium, hafnium, tantalum, tungsten, and magnesium; one of a non-inverting input terminal and an inverting input terminal of the comparator be electrically connected to one electrode of the capacitor; the other of the non-inverting input terminal and the inverting input terminal of the comparator be electrically connected to one of a source and a drain of the transistor; and the power storage device have a function of retaining the first voltage in the one of the source and the drain of the transistor by turning off the transistor.

(4) In the structure of the above (1), (2), or (3), it is preferable that the third circuit portion include a second transistor; a channel formation region of the second transistor contain indium, zinc, and an element M; the element M be one or more elements selected from aluminum, gallium, yttrium, copper, vanadium, beryllium, boron, titanium, iron, nickel, germanium, zirconium, molybdenum, lanthanum, cerium, neodymium, hafnium, tantalum, tungsten, and magnesium; and one of a source and a drain of the second transistor be electrically connected to one electrode of the capacitor.

(5) Another embodiment of the present invention is a method for operating a power storage device including a first circuit portion, a second circuit portion, a third circuit portion, and a secondary battery. The first circuit portion has a function of controlling a charging of the secondary battery. The method includes a first step in which the second circuit portion generates a first voltage and a first current; a second step in which the first voltage and the first current are supplied to the third circuit portion; a third step in which a current is supplied to the secondary battery to start the charging; a fourth step in which a first signal for informing the start of the charging is supplied from the first circuit portion to the third circuit portion; a fifth step in which the third circuit portion generates a second voltage corresponding to an elapsed time from the start time of the charging; and a sixth step in which the first voltage and the second voltage are compared.

(6) In the above (5), it is preferable that the third circuit portion include a capacitor; in the fifth step, the third circuit portion charge the capacitor with electric charges with an amount corresponding to a product of the first current and the elapsed time; and the second voltage be calculated as a potential difference between electrodes on both ends of the capacitor.

(7) In the first step of the operating method of the above (5) or (6), it is preferable that the second circuit portion generate the first voltage by converting a digital signal supplied from the first circuit portion, and the first voltage be an analog signal.

(8) In the operation method of the above (5), (6), or (7), it is preferable that the third circuit portion include a comparator and a transistor; one of a non-inverting input terminal and an inverting input terminal of the comparator be electrically connected to one of a source and a drain of the transistor; in the second step, the first voltage be supplied to the one of the non-inverting input terminal and the inverting input terminal of the comparator; in the third step to the sixth step, the transistor be turned off to retain the first voltage supplied to the one of the non-inverting input terminal and the inverting input terminal of the comparator; and in the fifth step, the second voltage be supplied to the other of the non-inverting input terminal and the inverting input terminal of the comparator.

(9) In the operation method of the above (5), (6), (7), or (8), it is preferable that the third circuit portion include a capacitor; a charging of the first current to the capacitor start in accordance with the first signal; and the second voltage correspond to a potential difference between both ends of the capacitor.

(10) Another embodiment of the present invention is a method for operating a power storage device including a first circuit portion, a second circuit portion, a third circuit portion, a temperature sensor, and a secondary battery. The first circuit portion includes an arithmetic circuit and a memory, and the first circuit portion has a function of controlling a charging of the secondary battery. The method includes a first step in which a current is supplied to the secondary battery to start a first charging at a first time; a second step in which the first charging is terminated at a second time; a third step in which a temperature measured by the temperature sensor, the first time, and the second time are supplied to the memory; a fourth step in which the arithmetic circuit in the first circuit portion performs an arithmetic operation using the temperature, the first time, and the second time stored in the memory to determine a level of a first voltage; a fifth step in which the second circuit portion generates the first voltage whose level is determined by the arithmetic operation and a first current; a sixth step in which the first voltage and the first current are supplied to the third circuit portion; a seventh step in which a current is supplied to the secondary battery to start a second charging; an eighth step in which a first signal for informing the start of the second charging is supplied from the first circuit portion to the third circuit portion; a ninth step in which the third circuit portion generates a second voltage corresponding to an elapsed time from the start time of the charging; and a tenth step in which the first voltage and the second voltage are compared. The first charging is a CC charging and the second charging is a CV charging.

In the operation method of the above (10), it is preferable that the third circuit portion include a capacitor; in the eighth step, the third circuit portion charge the capacitor with electric charges with an amount corresponding to a product of the first current and the elapsed time; and the second voltage be calculated as a potential difference between electrodes on both ends of the capacitor.

(12) In the operation method of the above (10) or (11), it is preferable that in the fifth step, the second circuit portion generate the first voltage by converting a digital signal supplied from the first circuit portion; and the first voltage be an analog signal.

In the operation method of the above (10), (11), or (12), it is preferable that the third circuit portion include a comparator and a transistor; one of a non-inverting input terminal and an inverting input terminal of the comparator be electrically connected to one of a source and a drain of the transistor; in the sixth step, the first voltage be supplied to the one of the non-inverting input terminal and the inverting input terminal of the comparator; in the sixth step to the tenth step, the transistor be turned off to retain the first voltage supplied to the one of the non-inverting input terminal and the inverting input terminal of the comparator; and in the ninth step, the second voltage be supplied to the other of the non-inverting input terminal and the inverting input terminal of the comparator.

Effect of the Invention

One embodiment of the present invention can provide a novel battery control circuit, a novel battery protection circuit, a power storage device, an electronic device, or the like. One embodiment of the present invention can reduce the power consumption. Another embodiment of the present invention can provide a battery control circuit, a battery protection circuit, a power storage device, an electronic device, or the like which has a novel structure.

Another embodiment of the present invention can provide a highly safe power storage device that detects a micro short circuit or detects a sign of a micro short circuit in a secondary battery.

Note that the effects of one embodiment of the present invention are not limited to the effects listed above. The effects listed above do not preclude the existence of other effects. Note that the other effects are effects that are not described in this section and will be described below. The other effects that are not described in this section will be derived from the description of the specification, the drawings, and the like and can be extracted from the description by those skilled in the art. Note that one embodiment of the present invention is to have at least one of the effects listed above and/or the other effects. Accordingly, depending on the case, one embodiment of the present invention does not have the effects listed above in some cases.

MODE FOR CARRYING OUT THE INVENTION

Figure 1:
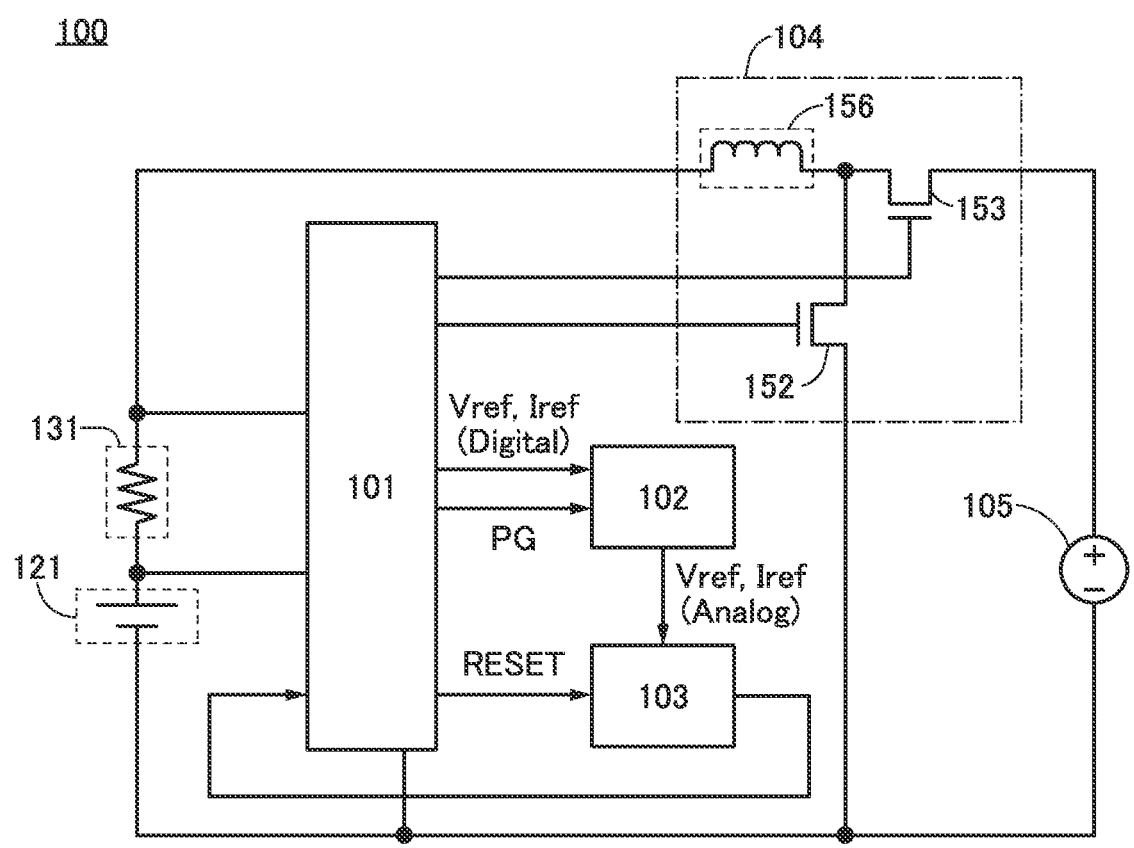
FIG. 1 is a block diagram illustrating one embodiment of the present invention.

Hereinafter, embodiments will be described with reference to the drawings. Note that the embodiments can be implemented with many different modes, and it will be readily understood by those skilled in the art that modes and details thereof can be changed in various ways without departing from the spirit and scope thereof. Thus, the present invention should not be construed as being limited to the following description of the embodiments.

Note that ordinal numbers such as "first", "second", and "third" in this specification and the like are used in order to avoid confusion among components. Thus, the ordinal numbers do not limit the number of components. In addition, the ordinal numbers do not limit the order of components. Furthermore, in this specification and the like, for example, a "first" component in one embodiment can be referred to as a "second" component in other embodiments or claims. Moreover, in this specification and the like, for example, a "first" component in one embodiment can be omitted in other embodiments or claims.

Note that in the drawings, the same elements, elements having similar functions, elements formed of the same material, elements formed at the same time, or the like are sometimes denoted by the same reference numerals, and repeated description thereof is omitted in some cases.

Embodiment 1

In this embodiment, an example of a power storage device of one embodiment of the present invention is described.

A power storage device 100 illustrated in FIG. 1 includes a control circuit 101, a reference generation circuit 102, a timer circuit 103, a regulator 104, a power source 105, a resistor 131, and a secondary battery 121.

The control circuit 101 supplies signals to the reference generation circuit 102 and the timer circuit 103. The control circuit 101 also has a function of performing charging of the secondary battery 121.

The resistor 131 is electrically connected in series to the secondary battery 121. The control circuit 101 is preferably electrically connected to both ends of the resistor 131. The control circuit 101 has a function of measuring current flowing through the resistor 131. The current flowing through the resistor 131 is almost equal to current flowing through the secondary battery 121, for example.

The reference generation circuit 102 supplies a reference voltage and a reference current (Vref, Iref (Digital)) to the timer circuit 103 on the basis of a signal supplied from the control circuit 101. In addition, the reference generation circuit 102 has a function of converting a supplied digital signal into an analog signal. In the case where signals such as the reference voltage and the reference current are supplied from the control circuit 101 as digital signals, the digital signals can be converted into analog signals to be supplied to the timer circuit 103.

The timer circuit 103 has a function of measuring or monitoring constant current charging time and constant voltage charging time of the secondary battery 121 on the basis of the supplied reference voltage and reference current (Vref, Iref (Analog)). With the use of the current Iref supplied from the reference generation circuit 102, the timer circuit 103 can also generate a current Iss1, a current Iss2, a current Iss3, and the like described later.

The timer circuit 103 has a function of retaining a supplied analog signal. In addition, the timer circuit 103 has a function of comparing supplied two or more analog signals. Furthermore, the timer circuit 103 has a function of calculating time corresponding to a supplied analog signal.

Figure 2A:
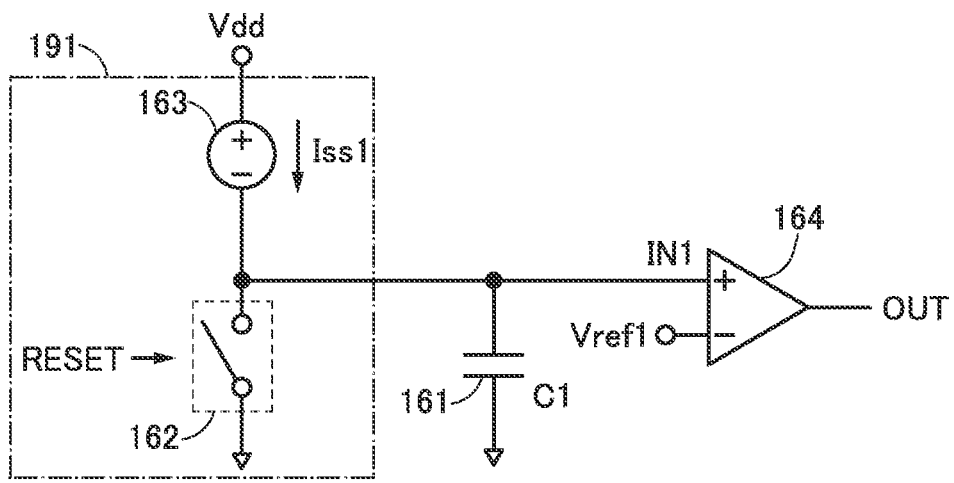
FIG. 2A is a circuit diagram illustrating one embodiment of the present invention.
Figure 2B:
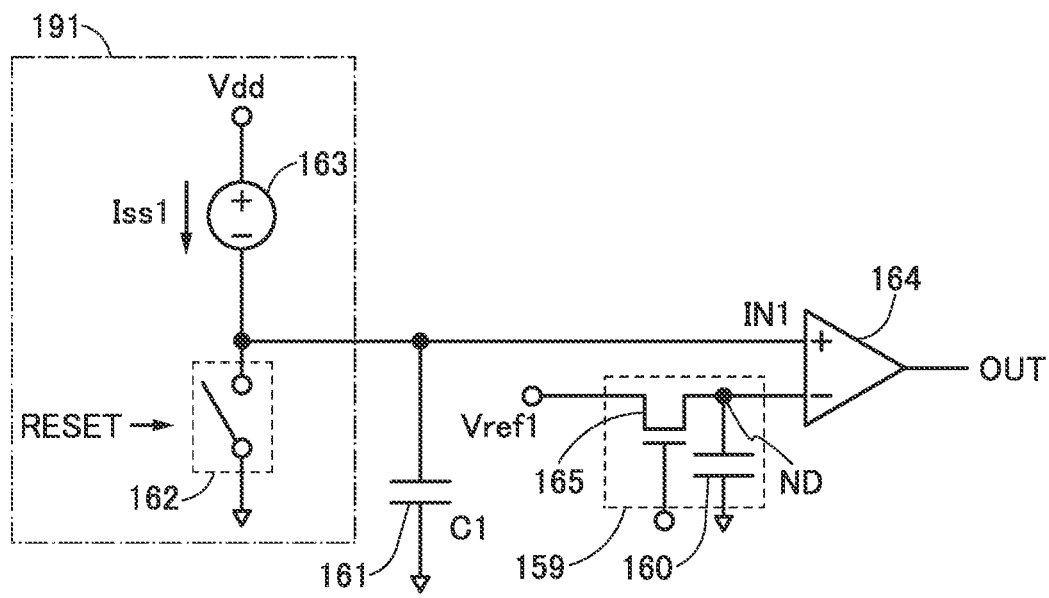
FIG. 2B is a circuit diagram illustrating one embodiment of the present invention.

FIG. 2A and FIG. 2B each illustrate a configuration example of the timer circuit 103. The timer circuit 103 illustrated in FIG. 2A includes a current supply portion 191, a capacitor 161, and a comparator 164. The current supply portion 191 includes a switch 162 and a constant current source 163. One electrode of the switch 162 is electrically connected to a ground potential, and one electrode of the constant current source 163 is electrically connected to a high potential signal Vdd. A non-inverting input terminal of the comparator 164 is referred to as a terminal IN1 and an output terminal thereof is referred to as a terminal OUT. In FIG. 2A, one electrode of the capacitor 161, the other electrode of the switch 162, and the other electrode of the constant current source 163 are electrically connected to the terminal IN1. The other electrode of the capacitor 161 is electrically connected to a ground potential. Note that in this embodiment, a low potential signal may be used instead of the ground potential.

The current source illustrated in FIG. 2A is referred to as a source-type current source in some cases.

The timer circuit 103 illustrated in FIG. 1, FIG. 2A, and FIG. 2B preferably includes an OS transistor. The OS transistor will be described later. The timer circuit 103 including an OS transistor can retain a supplied analog signal. The timer circuit 103 having a function of retaining a signal is capable of power gating. A signal PG for power gating is supplied from the control circuit 101 to the reference generation circuit 102.

FIG. 2B illustrates a configuration example of the timer circuit 103 capable of power gating. The timer circuit 103 illustrated in FIG. 2B is different from that in FIG. 2A in including a memory element 159. One of a source and a drain of a transistor 165 is connected to an inverting input terminal of the comparator 164. The memory element 159 includes the transistor 165 and a capacitor 160. In FIG. 2B, the one of the source and the drain of the transistor 165 is referred to as a node ND. When the transistor 165 is an OS transistor and the transistor 165 is turned off, a potential supplied to the inverting input terminal can be retained at the node ND for a long time. One electrode of the capacitor 160 is preferably electrically connected to the node ND. The other electrode of the capacitor 160 is connected to a ground potential, for example. In a period during which the transistor 165 is off, the timer circuit 103 is not necessarily supplied with a signal from the reference generation circuit 102. Therefore, the signal PG is preferably supplied to the reference generation circuit 102 in the period so that operation is performed on the basis of the supplied signal. When the signal PG is supplied to the reference generation circuit 102, power supply to the reference generation circuit 102 is shut off, for example. Alternatively, part of power supply to the reference generation circuit 102 is shut off. Alternatively, at least part of voltage supplied to the reference generation circuit 102 is set to a low potential signal, for example, a ground signal. The power gating enables extremely low current consumption of the reference generation circuit 102.

The current source illustrated in FIG. 2B is referred to as a source-type current source in some cases.

The regulator 104 illustrated in FIG. 1 will be described later.

Note that in this specification and the like, a battery control circuit or a storage device including the battery control circuit, each of which is one embodiment of the present invention, is referred to as BTOS (Battery operating system or Battery oxide semiconductor) in some cases. BTOS can build a system with low power consumption in some cases. BTOS can build a system with a simple circuit in some cases.

<Charging Time>

It is preferable that a power storage device of one embodiment of the present invention detect a micro short circuit or detect a sign of a micro short circuit to improve the safety of a secondary battery.

The inventors have found that, in charging or the like of a secondary battery, a charging time becomes longer before a phenomenon indicating a micro short circuit is observed. Examples of the phenomenon indicating a micro short circuit include a rapid decrease in a charging voltage. "Before a phenomenon indicating a micro short circuit is observed" means, for example, charging that is one cycle before the charging indicating a micro short circuit, or charging at least one of one to three cycles before the charging. "A charging time becomes longer" means that, for example, the charging time is longer than that of charging after shipment of the secondary battery or the storage device, or the charging time is longer than that of charging ten or more cycles before.

Note that a charging time depends on the temperature of a secondary battery (e.g., the temperature of a temperature sensor included in the secondary battery), degradation of the secondary battery due to use, and the like; thus, a micro short circuit is determined to occur in the case where the charging time is longer than expected even with such a change factor taken into consideration.

Thus, in monitoring the charging time of a secondary battery, in the case where the charging time is longer than a predetermined period, operation of the secondary battery is stopped or the operation of the secondary battery is limited, for example, more specifically, the voltage range of the secondary battery is narrowed, for example, whereby a micro short circuit can be inhibited and the safety of the secondary battery can be improved.

The relation between a micro short circuit and a charging time can be considered as follows, for example. When a micro short circuit occurs, it is considered that a charging voltage becomes less likely to increase and a constant current (hereinafter, CC) charging time becomes longer. In constant voltage (hereinafter, CV) charging, it is considered that short-circuit current flow prolongs the time for the charging current to reach its lower limit.

The influence of a micro short circuit is likely to appear more noticeably in CV charging than in CC charging in some cases.

The power storage device of one embodiment of the present invention can perform evaluation of SOH (State of Health) of a secondary battery in addition to a micro short circuit detection. The SOH of a brand new secondary battery is set to 100, and the SOH takes a value smaller than 100 as the deterioration of the secondary battery progresses. As the secondary battery deteriorates, the CV charging time becomes longer in some cases. The SOH can be calculated by measuring the charging time and comparing it with data stored in a table or the like, for example.

CC charging and CV charging will be described below.

[Charging and Discharging Methods]

The secondary battery can be charged and discharged in the following manner, for example.

Figure 11A:
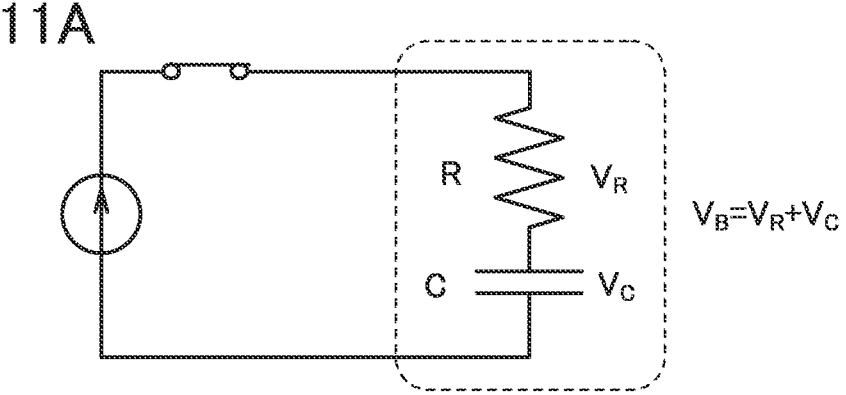
FIG. 11A is diagram illustrating a charging method of a secondary battery.

First, CC charging is described as one of the charging methods. CC charging is a charging method in which a constant current is made to flow to a secondary battery in the whole charging period and charging is stopped when the voltage reaches a predetermined voltage. The secondary battery is assumed to be an equivalent circuit with internal resistance R and secondary battery capacitance C as illustrated in FIG. 11A. In this case, a secondary battery voltage $V_B$ is the sum of a voltage $V_R$ applied to the internal resistance R and a voltage $V_C$ applied to the secondary battery capacitance C.

While the CC charging is performed, a switch is on as illustrated in FIG. 11A, so that a constant current I flows to the secondary battery. During the period, the current I is constant; thus, in accordance with the Ohm's law ($V_R = R \times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 11B:
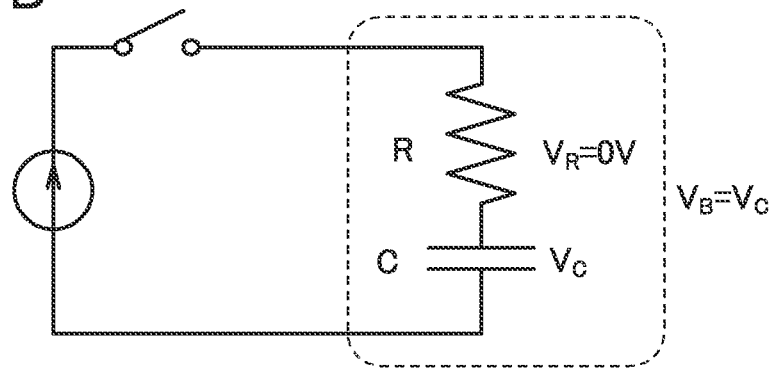
FIG. 11B is a diagram illustrating a charging method of a secondary battery.

When the secondary battery voltage $V_B$ reaches a predetermined voltage, e.g., 4.3 V, the charging is terminated. On termination of the CC charging, the switch is turned off as illustrated in FIG. 11B, and the current I becomes 0. Thus, the voltage $V_R$ applied to the internal resistance R becomes 0 V. Consequently, the secondary battery voltage $V_B$ is decreased.

Figure 11C:
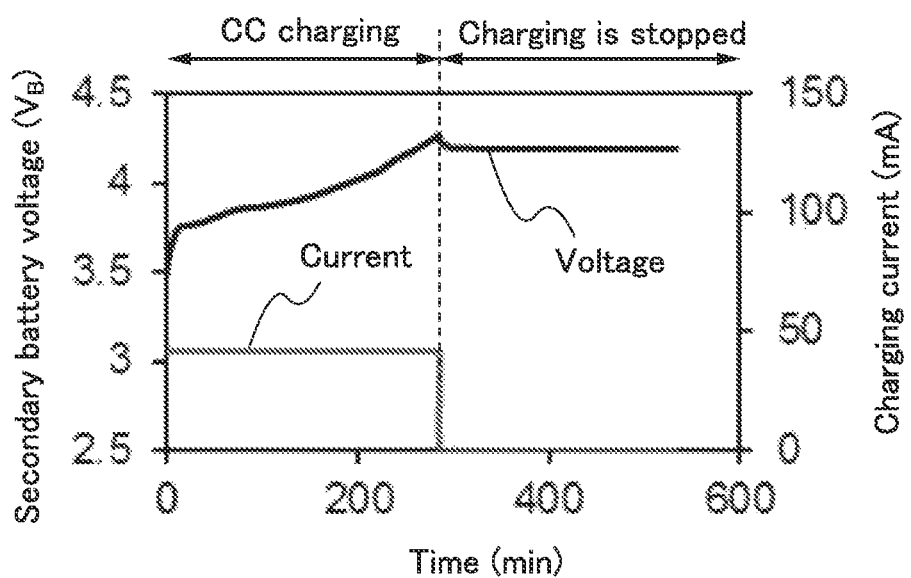
FIG. 11C is a diagram showing an example of a secondary battery voltage and a charging current.

FIG. 11C shows an example of the secondary battery voltage $V_B$ and charging current during a period in which the CC charging is performed and after the CC charging is stopped. The secondary battery voltage $V_B$ increases while the CC charging is performed, and slightly decreases after the CC charging is stopped.

Next, CCCV charging, which is a charging method different from the above-described method, is described. CCCV charging is a charging method in which CC charging is performed until the voltage reaches a predetermined voltage and then CV charging is performed until the amount of current flow becomes small, specifically, a termination current value.

Figure 12A:
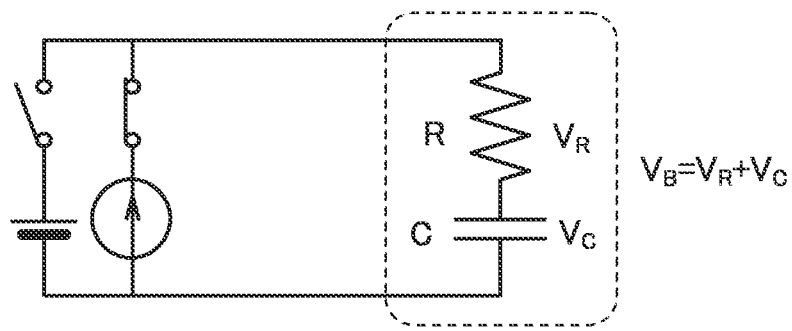
FIG. 12A is a diagram illustrating a charging method of a secondary battery.

While the CC charging is performed, a switch of a constant current power source is on and a switch of a constant voltage power source is off as illustrated in FIG. 12A, so that the constant current I flows to the secondary battery. During the period, the current I is constant; thus, in accordance with the Ohm's law ($V_R=R \times I$), the voltage $V_R$ applied to the internal resistance R is also constant. In contrast, the voltage $V_C$ applied to the secondary battery capacitance C increases over time. Accordingly, the secondary battery voltage $V_B$ increases over time.

Figure 12B:
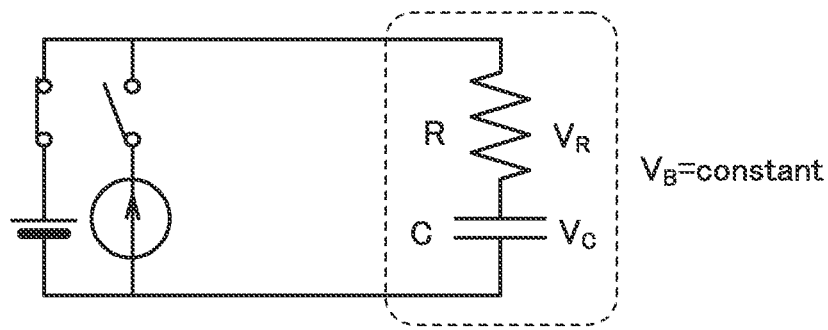
FIG. 12B is a diagram illustrating a charging method of a secondary battery.

When the secondary battery voltage $V_B$ reaches a predetermined voltage, e.g., 4.3 V, switching is performed from the CC charging to the CV charging. While the CV charging is performed, the switch of the constant voltage power source is on and the switch of the constant current power source is off as illustrated in FIG. 12B; thus, the secondary battery voltage $V_B$ is constant. In contrast, the voltage $V_C$ applied to the secondary battery capacitance C increases over time. Since $V_B=V_R+V_C$ is satisfied, the voltage $V_R$ applied to the internal resistance R decreases over time. As the voltage $V_R$ applied to the internal resistance R decreases, the current I flowing to the secondary battery also decreases in accordance with the Ohm's law ($V_R=R \times I$).

Figure 12C:
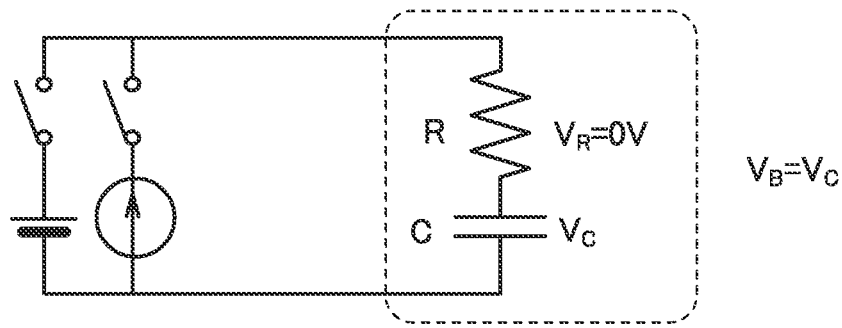
FIG. 12C is a diagram illustrating a charging method of a secondary battery.

When the current I flowing to the secondary battery becomes a predetermined current, e.g., approximately 0.01 C, charging is stopped. When the CCCV charging is stopped, all the switches are turned off as illustrated in FIG. 12C, so that the current I becomes 0. Thus, the voltage $V_R$ applied to the internal resistance R becomes 0 V. However, the voltage $V_R$ applied to the internal resistance R becomes sufficiently small by the CV charging; thus, even when a voltage drop no longer occurs in the internal resistance R, the secondary battery voltage $V_B$ hardly decreases.

Figure 13A:
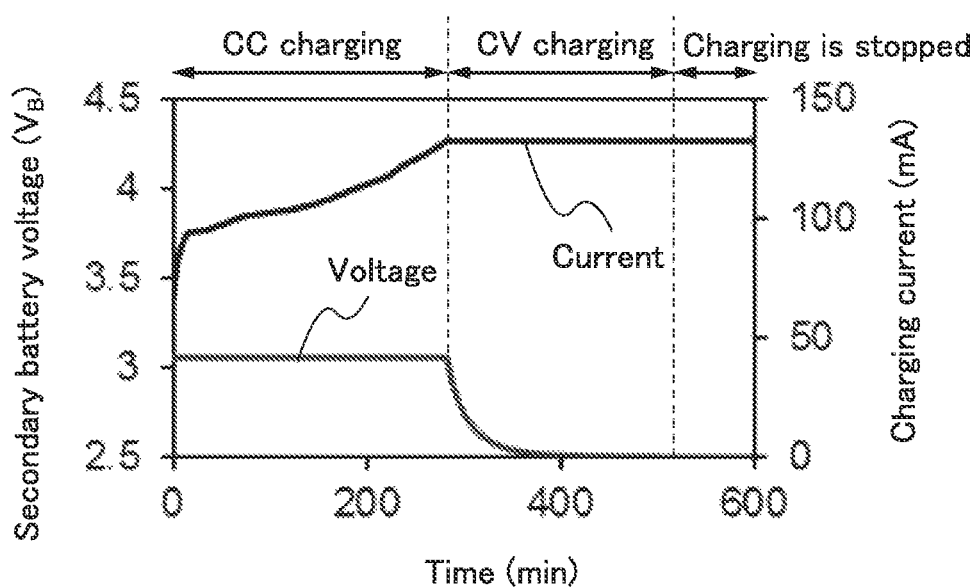
FIG. 13A is a diagram showing an example of a secondary battery voltage and a charging current.

FIG. 13A shows an example of the secondary battery voltage $V_B$ and charging current while the CCCV charging is performed and after the CCCV charging is stopped. FIG. 13A shows that the secondary battery voltage $V_B$ hardly decreases even after the CCCV charging is stopped.

Next, CC discharging, which is one of discharging methods, is described. CC discharging is a discharging method in which a constant current is made to flow from the secondary battery in the whole discharging period, and discharging is stopped when the secondary battery voltage $V_B$ reaches a predetermined voltage, e.g., 2.5 V.

Figure 13B:
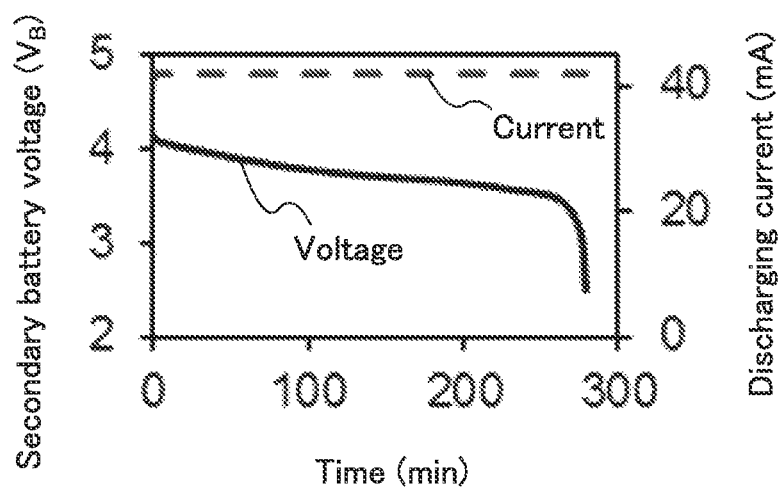
FIG. 13B is a diagram showing an example of a secondary battery voltage and a discharging current.

FIG. 13B shows an example of the secondary battery voltage $V_B$ and discharging current while the CC discharging is performed. As discharging proceeds, the secondary battery voltage $V_B$ decreases.

Next, a discharging rate and a charging rate are described. The discharging rate refers to the relative ratio of discharging current to battery capacity and is expressed in a unit C. A current corresponding to 1 C in a battery with a rated capacity X (Ah) is X (A). The case where discharging is performed at a current of 2X (A) is rephrased as to perform discharging at 2 C, and the case where discharging is performed at a current of X/5 (A) is rephrased as to perform discharging at 0.2 C. The same applies to the charging rate; the case where charging is performed at a current of 2X (A) is rephrased as to perform charging at 2 C, and the case where charging is performed at a current of X/5 (A) is rephrased as to perform charging at 0.2 C.

<Operation Example of Power Storage Device>

Figure 3:
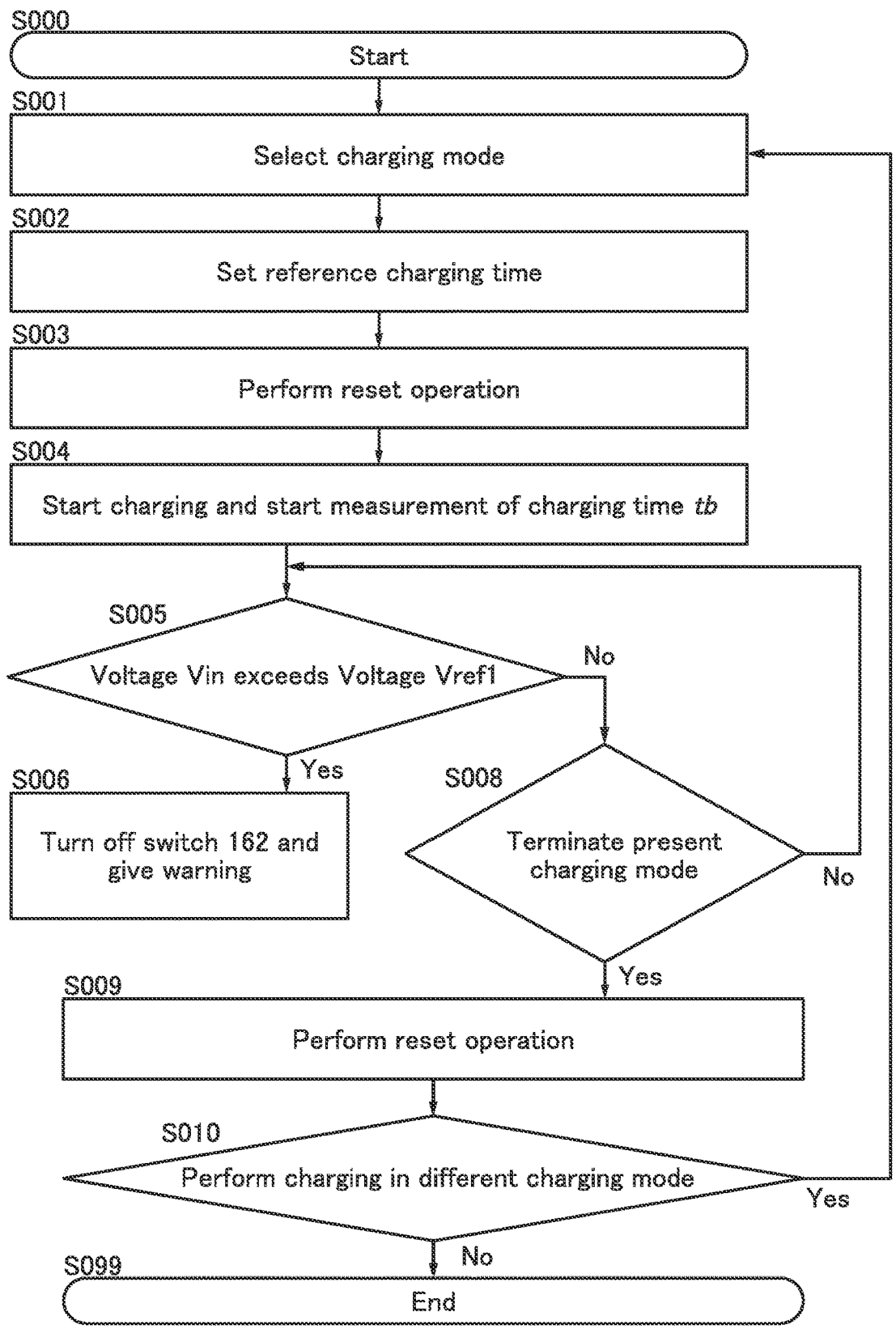
FIG. 3 is a flow chart showing an operation example of one embodiment of the present invention.
Figure 4A:
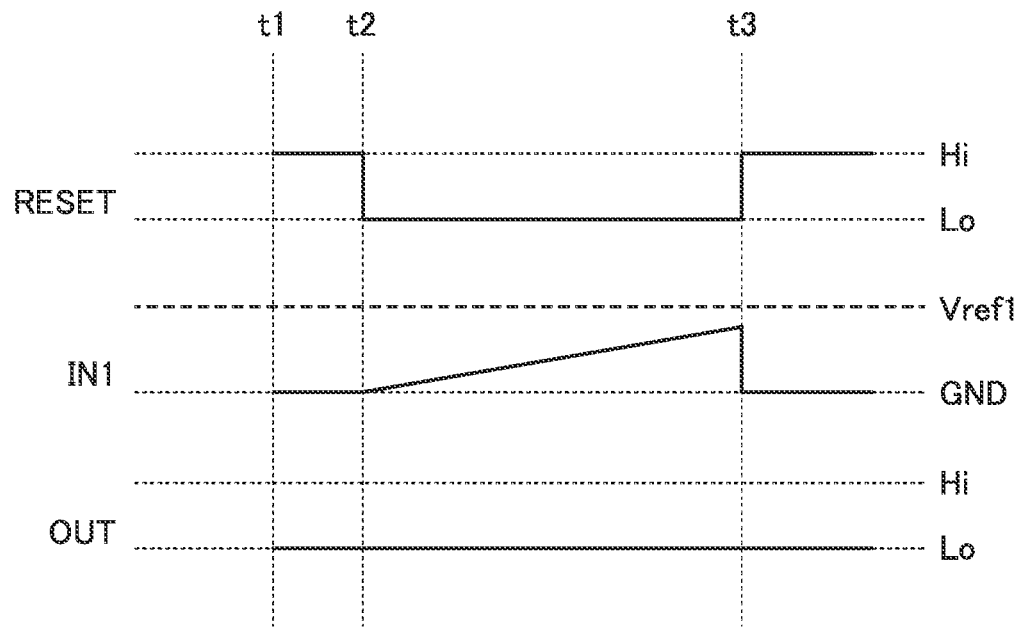
FIG. 4A is a timing chart showing an operation example of one embodiment of the present invention.
Figure 4B:
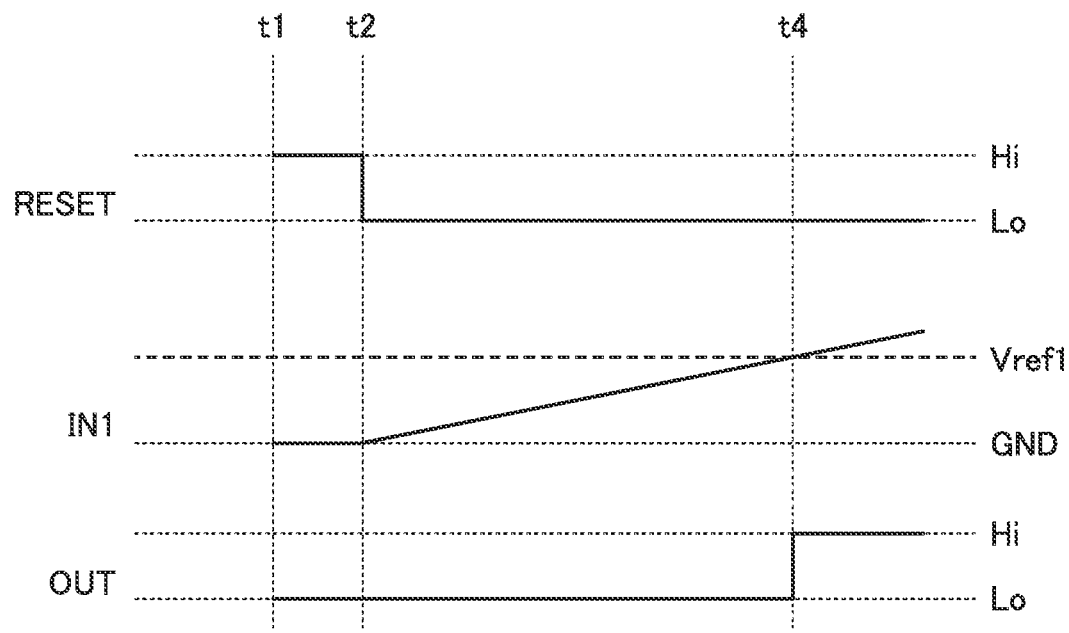
FIG. 4B is a timing chart showing an operation example of one embodiment of the present invention.

FIG. 3 is a flowchart showing an operation example of a power storage device of one embodiment of the present invention. FIG. 4A and FIG. 4B each show an example of a timing chart showing states of a signal RESET, the terminal IN1, and the terminal OUT. In FIG. 4A and FIG. 4B, a high potential signal is denoted by Hi and a low potential signal is denoted by Lo.

First, processing starts in Step S000.

Next, the charging mode is selected in Step S001. For example, either CC charging or CV charging is selected.

Next, a reference time of charging is set in Step S002. A reference time tc of the constant current charging is set when the charging mode is CC charging, and a reference time tv of the constant voltage charging is set when the charging mode is CV charging. More specifically, a voltage Vref1 and the current Iss1, which correspond to the set reference time, are supplied from the reference generation circuit 102 to the timer circuit 103, for example. The voltage Vref1 and the current Iss1 are respectively supplied to the inverting input terminal of the comparator 164 and the constant current source 163.

The voltage and the current that correspond to the charging time can be calculated as follows. The capacitance value of the capacitor 161 is referred to as a capacitance value Ca1. The product of the current Iss1 and a time tr is equal to the product of the capacitance value Ca1 and the voltage Vref. With the use of this relation, the current Iss1 and the voltage Vref1 are determined so that the charging time tr has a desired value.

The reference time is, for example, a value obtained by adding a certain margin to an assumed charging time. For the reference time tc and the reference time tv, a predetermined value may be used; alternatively, a value obtained by adding a certain time to the charging time measured in the previous charging may be used. The reference time tc and the reference time tv can be stored in a table, for example. The table includes one or both of a volatile memory and a nonvolatile memory, for example. As the memory, a DOSRAM and a NOSRAM that are described later may be used, for example.

The value of the reference time tc is determined in accordance with a voltage of a secondary battery at the start of charging. The voltage at the start of charging changes depending on the remaining capacity SOC (State of charge) of the secondary battery. In the table, the reference time tc corresponding to the voltage at the start of charging is preferably stored. The voltage at the start of charging is, for example, a voltage after a certain period, e.g., several seconds elapsed from the start of charging.

The charging time depends on a temperature Tb of the secondary battery, and thus a reference time corresponding to the temperature is preferably stored in the table, for example. Reference times corresponding to some conditions, e.g., three temperatures here, may be stored in the table, and reference times corresponding to temperatures other than those to which the reference times stored in the table correspond may be calculated by an arithmetic circuit included in the control circuit 101 or the like using the values stored in the table.

Alternatively, the dependence on the temperature Tb and the dependence on the remaining capacity SOC may be set as certain coefficients, and a value obtained by multiplication of these coefficients and the charging time measured in the previous charging may be used as a reference time.

Furthermore, the reference time tv may be calculated using the temperature Tb and the measured CC charging time.

In addition, the voltage of a secondary battery increases (or decreases) due to internal resistance in some cases. The voltage increase amount (or decrease amount) depends on the internal resistance and the current density. The influence of the internal resistance can be reduced with the use of an open circuit voltage (OCV) as the voltage of the secondary battery in some cases. Therefore, an OCV can be used as a voltage at the start of charging of a secondary battery. Alternatively, a voltage at a predetermined current density is preferably used. Alternatively, the amount of voltage increase due to current density is preferably taken into consideration when the reference time is calculated.

Next, a reset operation is performed in Step S003 (Time t1 in FIG. 4A and FIG. 4B). Specifically, the signal RESET is supplied from the control circuit 101 to the timer circuit 103. For example, a high potential signal is supplied as shown in FIG. 4A and FIG. 4B. The switch 162 is turned on when the signal RESET is supplied to the timer circuit 103. When the switch 162 is turned on, a ground potential is supplied to the terminal IN.

In Step S004, charging starts, the switch 162 is turned off, and the measurement of a charging time tb starts (Time t2 in FIG. 4A and FIG. 4B). When the charging starts, the signal RESET becomes a low potential and the switch 162 is turned off, for example. Here, the charging time can be obtained by measuring the voltage of the terminal IN1 in the timer circuit 103. That is, the voltage of the terminal IN1 (hereinafter, a voltage Vin) is measured in Step S004.

Next, in Step S005, the processing proceeds to Step S006 in the case where the voltage Vin exceeds the voltage Vref1 (Time t4 in FIG. 4B), and the processing proceeds to Step S008 in the case where the voltage Vin does not exceed the voltage Vref1. Here, the voltage Vin exceeding the voltage Vref1 indicates a longer charging time than the preset reference time of charging. A high potential signal is output from the output terminal OUT of the comparator 164 in the case where the voltage Vin exceeds the voltage Vref1, and an opposite-polarity signal, e.g., the low potential signal Lo here, is output in the case where the voltage Vin does not exceed the voltage Vref1.

Next, in Step S006, the power storage device 100 gives a warning to a user. The warning may be displayed on a display portion included in the power storage device 100, or a warning beep may be output from a speaker included in the power storage device 100. Note that the switch 162 remains off in Step S006, for example, but may be on.

Alternatively, the power storage device 100 may stop the charging of the secondary battery 121 in Step S006.

In Step S008, whether to terminate the present charging mode is determined. The determination is performed by, for example, the control circuit 101. The processing proceeds to Step S009 in the case where the present charging mode is terminated, and the processing returns to Step S004 in the case where it is not terminated.

In Step S009, the signal RESET is supplied from the control circuit 101 to the timer circuit 103 and the switch 162 is turned on, so that the reset operation is performed (Time t3 in FIG. 4A).

Next, in Step S010, the processing returns to Step S002 in the case where charging is continuously performed in a different charging mode, and the processing proceeds to Step S099 in the case where the charging is not performed.

In Step S099, the processing ends.

<Regulator>

As illustrated in FIG. 1, the power storage device 100 preferably includes the regulator 104. The regulator 104 has a function of outputting a desired voltage on the basis of a supplied signal, for example. The regulator 104 preferably has a function of stepping down or boosting a supplied voltage.

The regulator 104 illustrated in FIG. 1 is described. The regulator 104 is a step-down power stage. The regulator 104 includes a transistor 152, a transistor 153, and a coil 156. One of a source and a drain of the transistor 152 is electrically connected to a negative electrode of the secondary battery 121 and a negative electrode of the power source. One of a source and a drain of the transistor 153 is electrically connected to a positive electrode of the power source. The other of the source and the drain the transistor 152 is electrically connected to the other of the source and the drain of the transistor 153. One electrode of the coil 156 is electrically connected to a positive electrode of the secondary battery 121 through the resistor 131. The other electrode of the coil 156 is electrically connected to the other electrode of the source and the drain of the transistor 152. Gate electrodes of the transistor 152 and the transistor 153 are each supplied with a signal from the control circuit 101.

<Modification Example of Timer Circuit>

Modification examples of the timer circuit 103 are described with reference to FIG. 5 to FIG. 9.

Figure 5A:
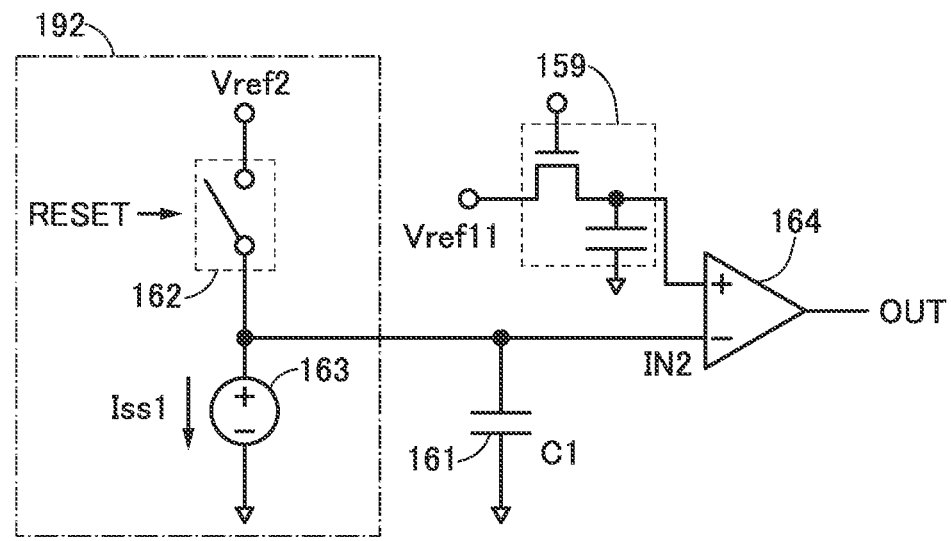
FIG. 5A is a circuit diagram illustrating one embodiment of the present invention.

The timer circuit 103 illustrated in FIG. 5A includes a current supply portion 192 instead of the current supply portion 191 illustrated in FIG. 2A. The current supply portion 192 includes the switch 162 and the constant current source 163. One electrode of the switch 162 is electrically connected to a high potential signal Vref2, and one electrode of the constant current source 163 is electrically connected to a ground potential. The other electrode of the switch 162 and the other electrode of the constant current source 163 are electrically connected to one electrode of the capacitor 161. In FIG. 5A, the one electrode of the capacitor 161 is electrically connected to a terminal IN2 that is an inverting input terminal of the comparator 164. A non-inverting input terminal of the comparator 164 is supplied with a voltage Vref11 through the memory element 159.

Figure 5B:
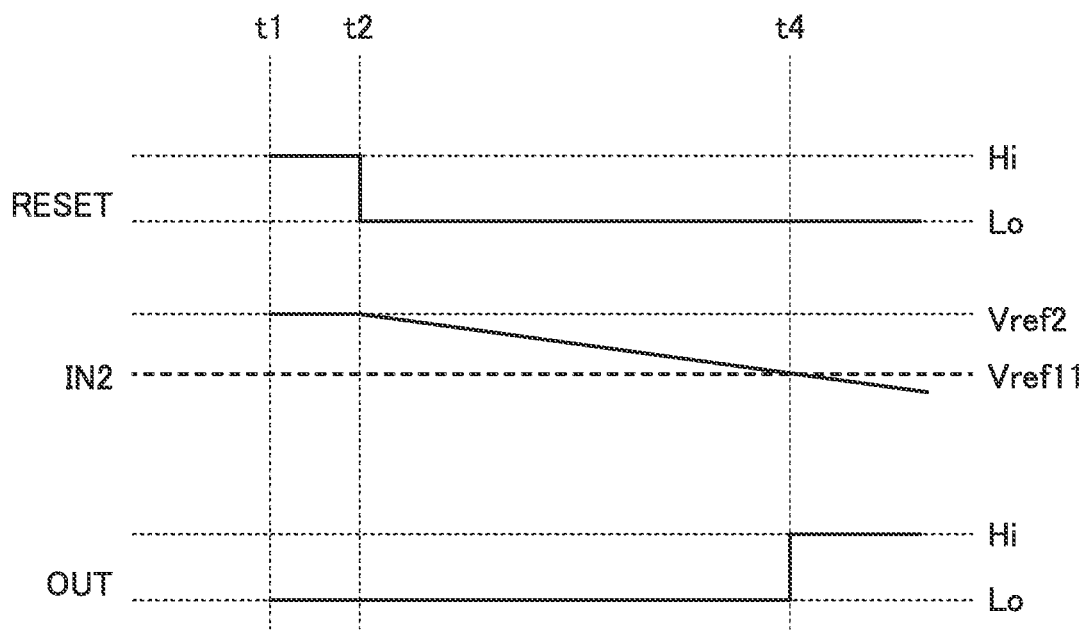
FIG. 5B is a timing chart showing an operation example of one embodiment of the present invention.

FIG. 5B shows an example of a timing chart showing the states of the signal RESET, the terminal IN2, and the terminal OUT in the timer circuit 103 illustrated in FIG. 5A. At Time t1, the signal RESET is supplied to the switch 162 and the high potential signal Vref2 is supplied to the terminal IN2. At Time t2, charging starts. In the timer circuit 103 illustrated in FIG. 5A, the voltage of the terminal IN2 gradually decreases as a current flows through the constant current source 163.

At Time t4, a high potential signal is output from the terminal OUT when the voltage of the terminal IN2 is lower than the voltage Vref11, that is, when charging is performed longer than the reference time of charging. In FIG. 5B, a high potential signal is denoted by Hi and a low potential signal is denoted by Lo.

Figure 6A:
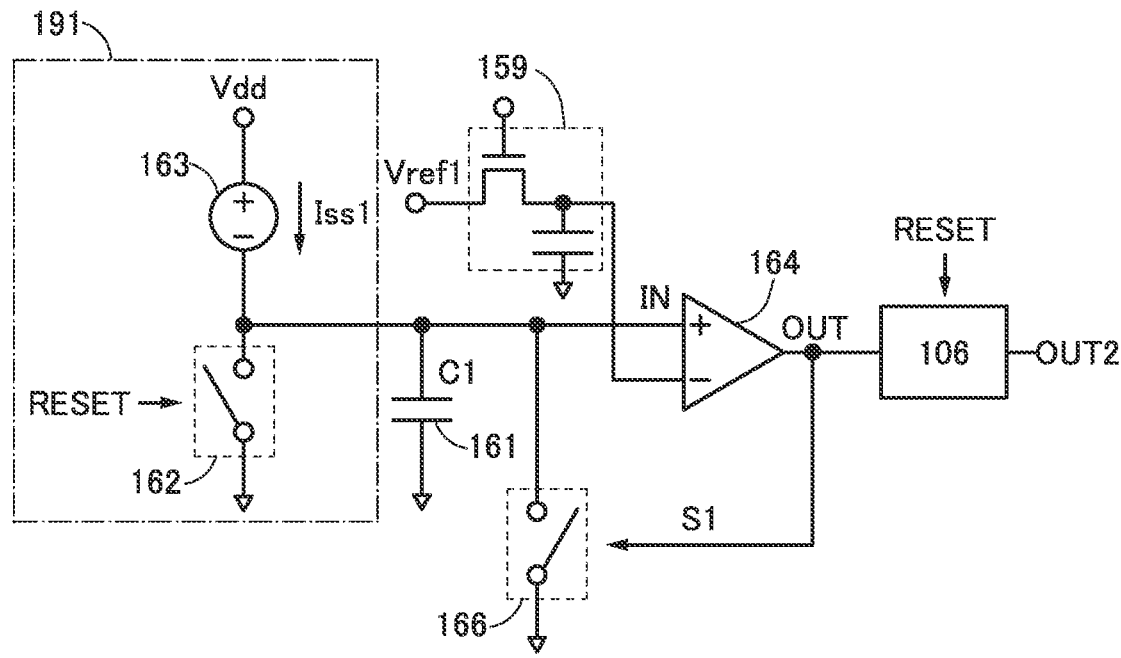
FIG. 6A is a circuit diagram illustrating one embodiment of the present invention.

The timer circuit 103 illustrated in FIG. 6A includes a counter 106 in addition to the timer circuit 103 illustrated in FIG. 2A. The counter 106 is supplied with the signal RESET and resets the count number in accordance with the signal RESET, for example. The terminal OUT of the comparator 164 is input to the counter 106. When a signal (e.g., a high potential signal) is supplied from the terminal OUT to the counter 106, the count number of the counter 106 increases by one (count up). In addition, a switch 166 is turned on in accordance with the high potential signal from the terminal OUT, so that the voltage of the capacitor 161 becomes a ground potential. Owing to the counter 106 included in the timer circuit 103, the count number corresponding to the charging time of the secondary battery can be output from a terminal OUT2, which is an output terminal of the timer circuit 103.

Figure 6B:
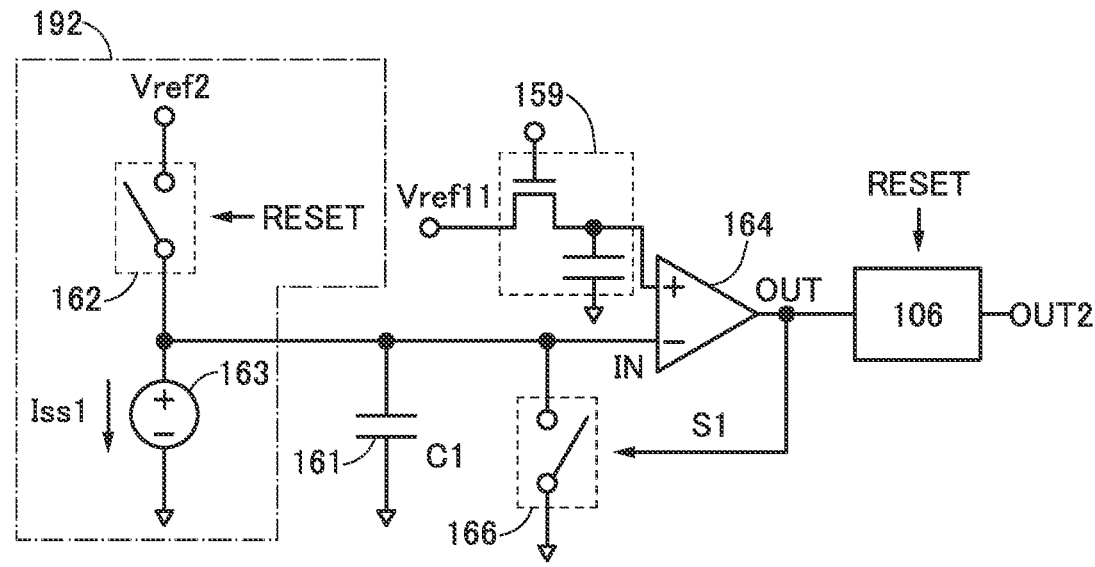
FIG. 6B is a circuit diagram illustrating one embodiment of the present invention.

The timer circuit 103 illustrated in FIG. 6B has a structure in which the current supply portion 191 of the timer circuit 103 illustrated in FIG. 6A is replaced with the current supply portion 192.

Figure 7:
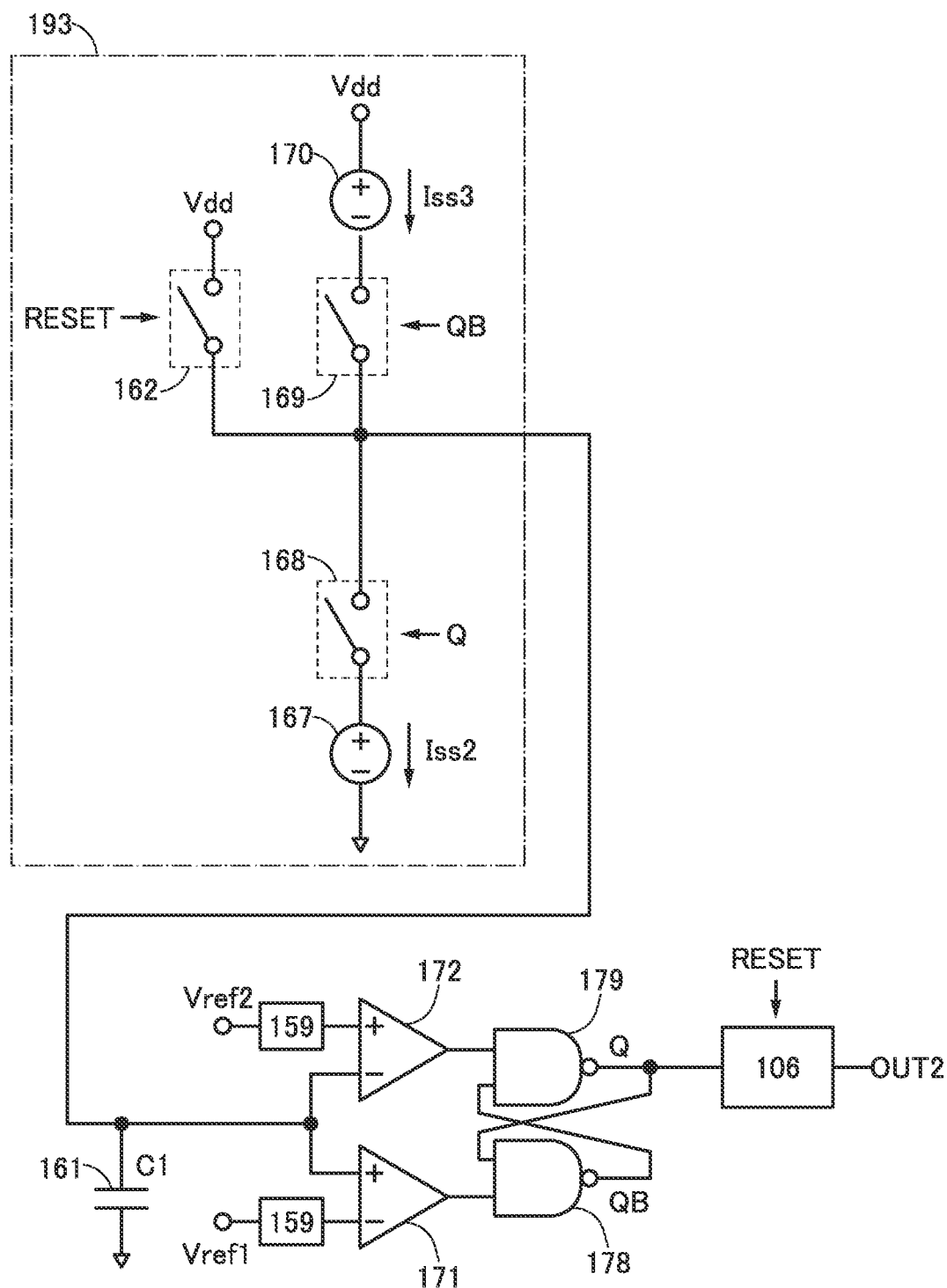
FIG. 7 is a circuit diagram illustrating one embodiment of the present invention.

The timer circuit 103 illustrated in FIG. 7 includes a current supply portion 193, the capacitor 161, a comparator 171, a comparator 172, the counter 106, a NAND circuit 178, and a NAND circuit 179.

The current supply portion 193 includes the switch 162, a constant current source 167, a switch 168, a switch 169, and a constant current source 170. The constant current source 167, the switch 168, the switch 169, and the constant current source 170 are electrically connected in series in the order of the constant current source 167, the switch 168, the switch 169, and the constant current source 170; an electrode of the constant current source 167 which is not electrically connected to the switch 168 is electrically connected to a ground potential; and an electrode of the constant current source 170 which is not electrically connected to the switch 169 is electrically connected to the high potential signal Vdd. One electrode of the switch 162 is electrically connected to the high potential signal Vdd, and the other electrode is electrically connected to the switch 169, the switch 168, and one electrode of the capacitor 161.

The one electrode of the capacitor 161 is electrically connected to a non-inverting input terminal of the comparator 171 and an inverting input terminal of the comparator 172. An inverting input terminal of the comparator 171 is supplied with the voltage Vref1 and a non-inverting input terminal of the comparator 172 is supplied with the high potential signal Vref2. Note that as illustrated in FIG. 7, the voltage Vref1 and the high potential signal Vref2 may each be supplied to the terminal of the comparator through the memory element 159. A first input of the NAND circuit 178 is supplied with an output signal of the comparator 171, and a second input is supplied with an output of the NAND circuit 179. A first input of the NAND circuit 179 is supplied with an output signal of the comparator 172, and a second input is supplied with an output of the NAND circuit 178. The output of the NAND circuit 179 is input to the counter 106. The count number is output from the terminal OUT2 of the counter 106.

An operation example of the timer circuit 103 illustrated in FIG. 7 is described. A signal QB is a signal having an opposite phase to a signal Q.

In the case where a high potential signal is supplied as the signal RESET, the switch 162 is turned on and the high potential signal Vdd is supplied to the capacitor 161. The counter 106 is reset in accordance with the signal RESET.

Next, a low potential signal is supplied as the signal RESET, so that the switch 162 is turned off.

In the case where the signal Q becomes a high potential, the switch 168 is turned on, the switch 169 is turned off, the capacitor 161 is electrically connected to the constant current source 167, and the constant current source 167 is electrically connected to a ground potential, so that the voltage of the capacitor 161 gradually decreases. When the voltage of the capacitor 161 becomes lower than Vref1, a low potential signal is output from the comparator 171, so that the signal Q and the signal QB are inverted and the signal QB becomes a high potential.

When the signal QB becomes a high potential, the switch 169 is turned on, the switch 168 is turned off, the capacitor 161 is electrically connected to the constant current source 170, and the constant current source 170 is electrically connected to the high potential signal Vdd; thus, the voltage of the capacitor 161 gradually increases. When the voltage of the capacitor 161 becomes higher than the high potential signal Vref2, a low potential signal is output from the comparator 172, so that the signal Q and the signal QB are inverted and the signal Q becomes a high potential. Since the signal Q supplied to the counter 106 becomes a high potential again, the count number of the counter 106 increases by one.

When a source-type current source and a sink-type current source are combined as the current sources in the above manner, the voltage of the capacitor 161 alternately increase and decrease within the range from the voltage Vref1 to the high potential signal Vref2; thus, a signal supplied to the counter 106 oscillates by alternating a high potential and a low potential.

Figure 8A:
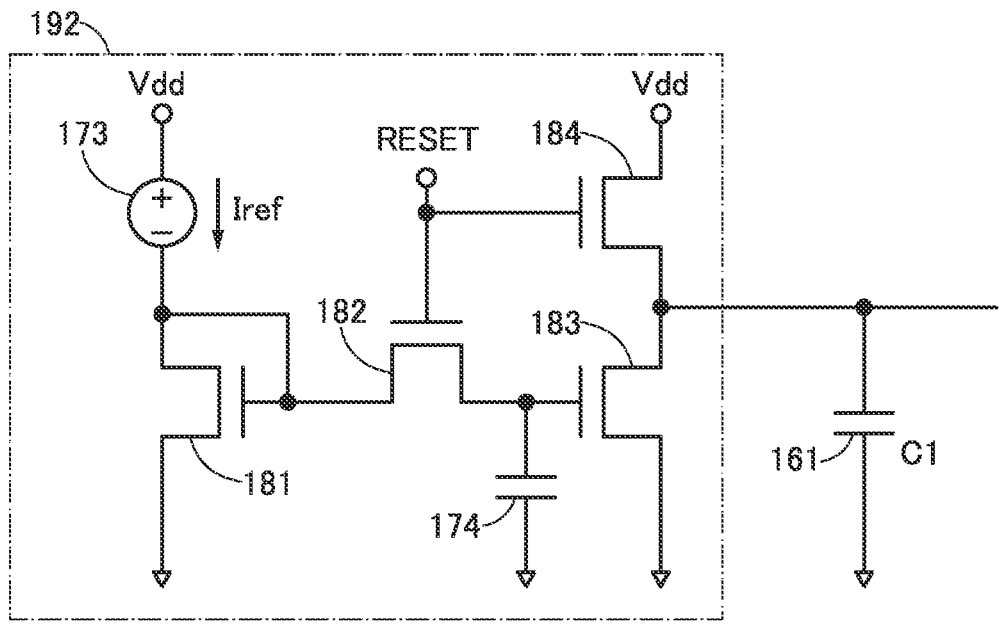
FIG. 8A is a circuit diagram illustrating one embodiment of the present invention.

FIG. 8A illustrates a specific example applicable to the current supply portion 192. The current supply portion 192 includes a constant current source 173, a capacitor 174, and a transistor 181 to a transistor 184. One electrode of the constant current source 173 is electrically connected to the high potential signal Vdd and the other electrode is electrically connected to a gate and one of a source and a drain of the transistor 181. The other of the source and the drain of the transistor 181 is electrically connected to a ground potential. One of a source and a drain of the transistor 182 is electrically connected to the gate of the transistor 181, and the other is electrically connected to a gate of the transistor 183 and one electrode of the capacitor 174. The other electrode of the capacitor 174 is electrically connected to a ground potential. A gate of the transistor 182 and a gate of the transistor 184 are each supplied with the signal RESET. One of a source and a drain of the transistor 183 is electrically connected to a ground potential and the other is electrically connected to one of a source and a drain of the transistor 184 and one electrode of the capacitor 161. The other of the source and the drain of the transistor 184 is supplied with the high potential signal Vdd.

An operation example of the circuit illustrated in FIG. 8A is described. In FIG. 8A, in the case where a high potential signal is supplied as the signal RESET, the transistor 181, the transistor 182, the transistor 183, and the transistor 184 are turned on, so that the current Iss1 corresponding to the current Iref flowing through the constant current source 173 flows through the transistor 183 and the transistor 184. The ratio of the current Iref to the current Iss1 changes depending on the ratio of size (e.g., an inverse of a channel length, a channel width, or the like) of the transistor 181 to the transistor 183. Electric charges are accumulated in the capacitor 174 due to current flowing through the transistor 182. Electric charges are accumulated in the capacitor 161 due to the current Iss1.

Next, in the case where a low potential signal is supplied as the signal RESET, the transistor 181, the transistor 182, and the transistor 184 are turned off and a voltage corresponding to the electric charges accumulated in the capacitor 174 is supplied to the gate of the transistor 183, so that the transistor 183 is turned on. The electric charges accumulated in the capacitor 161 flow through the transistor 183, and the voltage of the capacitor 161 gradually decreases.

Figure 8B:
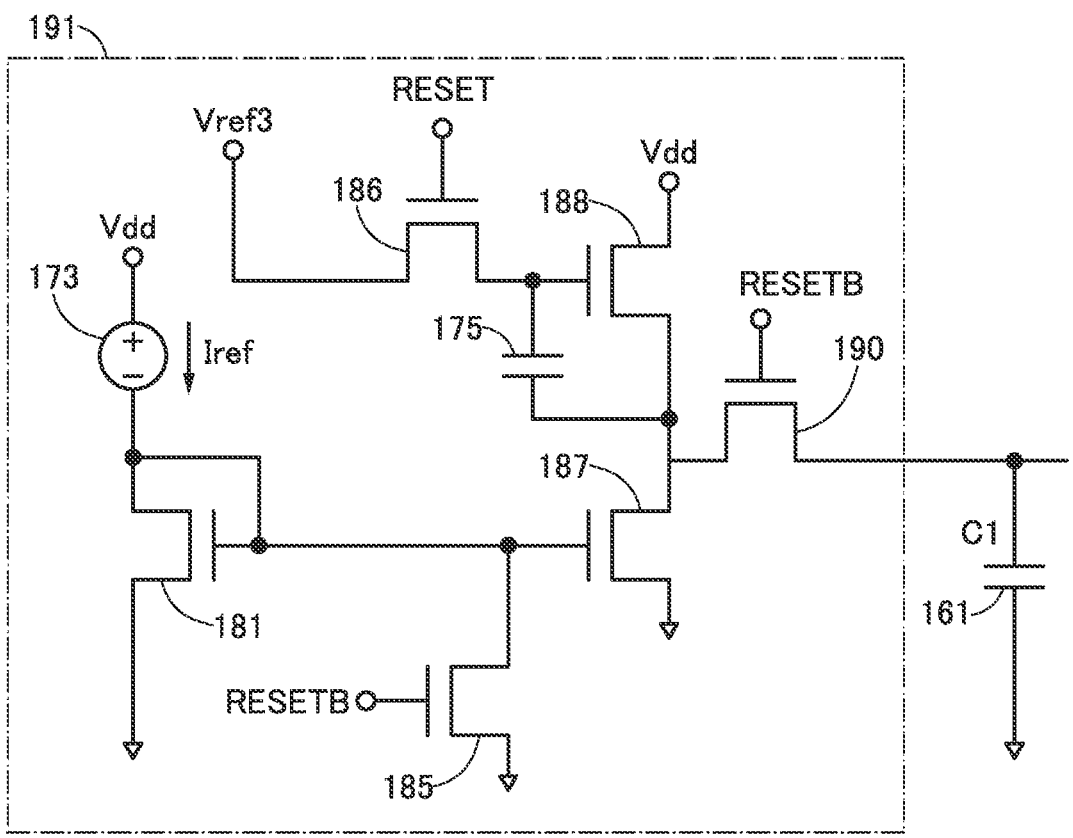
FIG. 8B is a circuit diagram illustrating one embodiment of the present invention.

FIG. 8B illustrates a specific example applicable to the current supply portion 191. The current supply portion 191 includes the constant current source 173, a capacitor 175, the transistor 181, and a transistor 185 to a transistor 190. One electrode of the constant current source 173 is supplied with the high potential signal Vdd, and the other electrode is electrically connected to the gate and one of the source and the drain of the transistor 181 and one of a source and a drain of the transistor 185. The other of the source and the drain of the transistor 185 is electrically connected to a ground potential. One of a source and a drain of the transistor 186 is supplied with a high potential signal Vref3, and the other is electrically connected to one electrode of the capacitor 175 and a gate of the transistor 188. One of a source and a drain of the transistor 188 is supplied with the high potential signal Vdd, and the other is electrically connected to one of a source and a drain of the transistor 187 and one of a source and a drain of the transistor 190. The other of the source and the drain of the transistor 187 is electrically connected to a ground potential. The other of the source and the drain of the transistor 188 is electrically connected to the other electrode of the capacitor 175. The other of the source and the drain of the transistor 190 is electrically connected to one electrode of the capacitor 161. A gate of the transistor 186 is supplied with the signal RESET, and a gate of the transistor 185 and a gate of the transistor 190 are each supplied with a signal RESETB.

The signal RESETB is an opposite-phase signal of the signal RESET. The opposite-phase signal means that, for example, one signal outputs a high potential signal while the other signal outputs a low potential signal.

An operation example of the circuit illustrated in FIG. 8B will be described. In FIG. 8B, in the case where a high potential signal is supplied as the signal RESET, the gate of the transistor 188 is supplied with the voltage Vref3 and the transistor 181, the transistor 187, and the transistor 188 are turned on, so that the current Iss1 corresponding to the current Iref flowing through the constant current source 173 flows through the transistor 188 and the transistor 187. The ratio of the current Iref to the current Iss1 changes depending on the ratio of the transistor 181 to the transistor 187.

Next, in the case where a low potential signal is supplied as the signal RESET, the transistor 186 is turned off and the gate of the transistor 188 retains a voltage corresponding to electric charges accumulated in the capacitor 175, so that the transistor 188 is turned on. In addition, the transistor 190 is turned on and the transistor 187 is turned off. Thus, the capacitor 161 is supplied with the current Iss1 flowing through the transistor 188, and the voltage of the capacitor 161 gradually increases.

In FIG. 8A and FIG. 8B, current supply from the constant current source 173 is unnecessary during a period in which a low potential signal is supplied as the signal RESET, and thus the constant current source 173 can be stopped. Thus, the reference generation circuit 102 is capable of power gating during the period in which a low potential signal is supplied as the signal RESET.

An OS transistor has a low off-state current, and thus enables a wide-range use of on-state currents from a low value to a high value. Since the on-state current can be controlled to a low value, a current of $10^{-10}$ A/μm or less can be used as the on-state current, for example. Thus, when OS transistors are used as the transistor 183 and the transistor 184 in FIG. 8A and the transistor 187 and the transistor 188 in FIG. 8B, the capacitance value of the capacitor 161 can be reduced and the area of the capacitor 161 can be reduced, for example. Thus, the area of the circuit can be reduced.

OS transistors may be used as the transistor 181 to the transistor 188 and the transistor 190.

The OS transistor has a small variation in threshold voltage due to temperature change, and thus is suitable for a device used within a wide temperature range, such as a secondary battery, in some cases.

Figure 9:
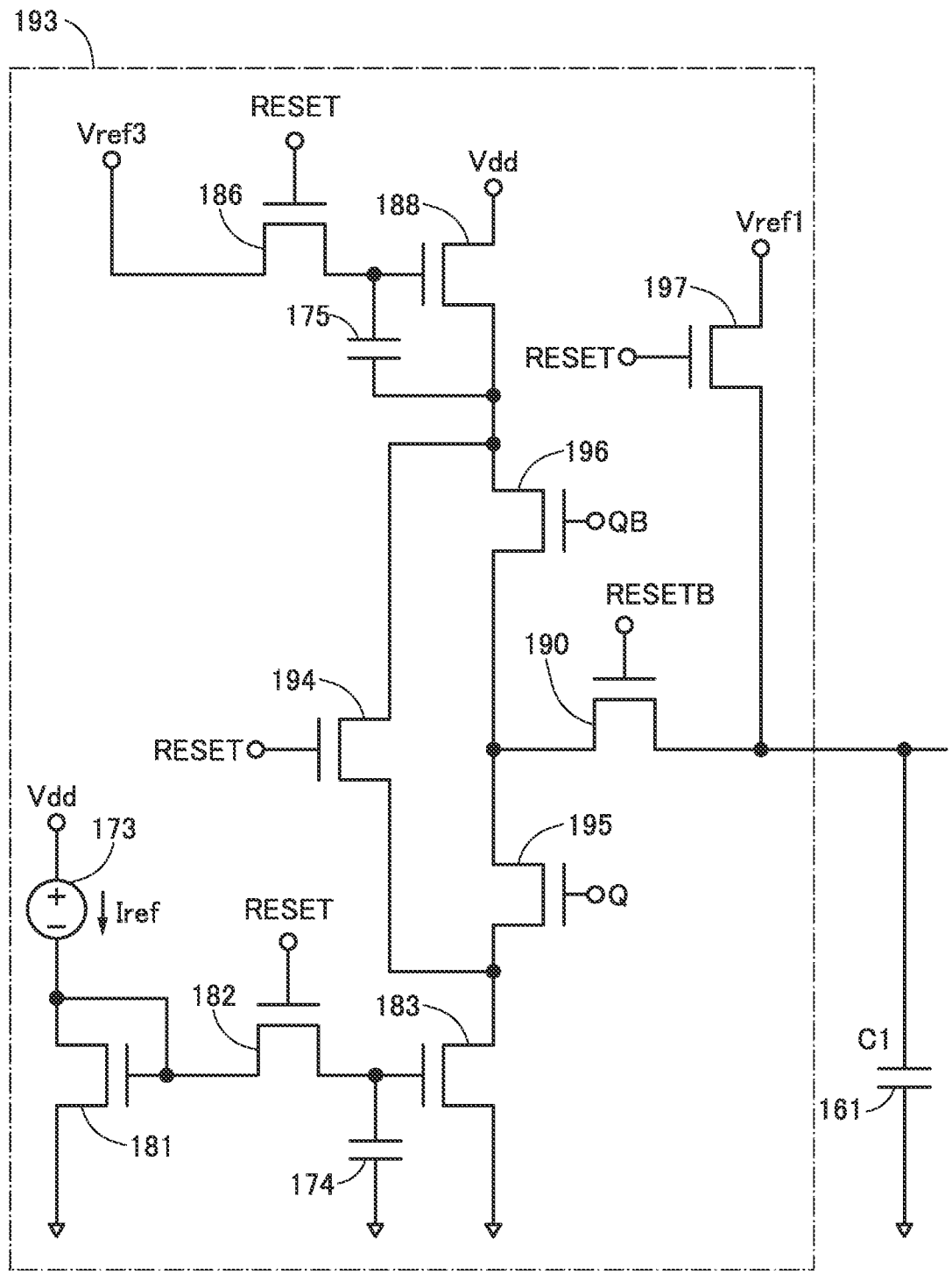
FIG. 9 is a circuit diagram illustrating one embodiment of the present invention.

FIG. 9 illustrates a specific example applicable to the current supply portion 193. The current supply portion 193 has a structure in which the current supply source illustrated in FIG. 8A and the current supply source illustrated in FIG. 8B are combined.

For the electrical connection between the constant current source 173, the transistor 181, the transistor 182, the capacitor 174, and the transistor 183 in the current supply portion 193, FIG. 8A can be referred to. For the electrical connection between the transistor 186, the capacitor 175, and the transistor 188, FIG. 8B can be referred to. A gate of a transistor 194 is supplied with the signal RESET; one of a source and a drain of the transistor 194 is electrically connected to the other of the source and the drain of the transistor 183 and one of a source and a drain of a transistor 195; and the other of the source and the drain of the transistor 194 is electrically connected to one of a source and a drain of a transistor 196 and the other electrode of the source and the drain of the transistor 188. A gate of the transistor 195 is supplied with the signal Q and a gate of the transistor 196 is supplied with the signal QB. The gate of the transistor 190 is supplied with the signal RESETB; one of the source and the drain of the transistor 190 is electrically connected to the other of the source and the drain of the transistor 195 and the other of the source and the drain of the transistor 196; and the other of the source and the drain of the transistor 190 is electrically connected to one of a source and a drain of a transistor 197 and one electrode of the capacitor 161. The other of the source and the drain of the transistor 197 is supplied with the voltage Vref1. A gate of the transistor 197 is supplied with the signal RESET.

<Modification Example of Power Storage Device>

Figure 10:
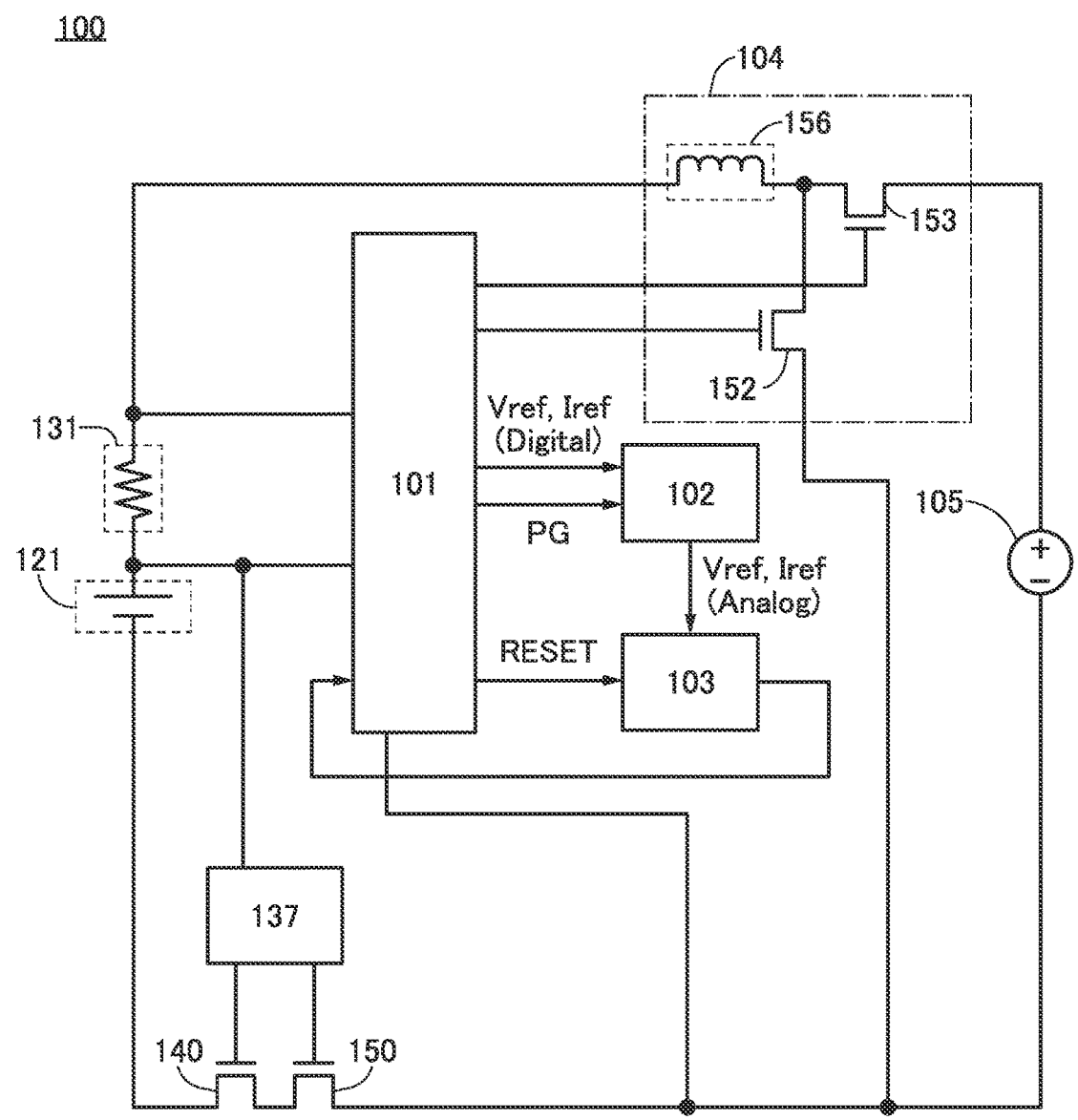
FIG. 10 is a block diagram illustrating one embodiment of the present invention.

The power storage device 100 illustrated in FIG. 10 includes a protection circuit 137, a transistor 140, and a transistor 150 in addition to the components illustrated in FIG. 1.

It is preferable that the protection circuit 137 be electrically connected to the control circuit 101 and transmit and receive signals to/from the control circuit 101.

The protection circuit 137 has a function of stopping the operation of the secondary battery when the secondary battery 121 satisfies a certain predetermined condition. For example, the operation is stopped when the current of the secondary battery 121 exceeds a certain value. For another example, the operation is stopped when the voltage of the secondary battery 121 becomes higher than or equal to a certain value or lower than or equal to a certain value.

The protection circuit 137 may have a path for making the electrodes of the secondary battery 121 short-circuited to stop the operation of the secondary battery 121. A resistor or a capacitor may be provided in the path. The transistor 140 and the transistor 150 illustrated in FIG. 10 function as switches that block current, and the switches are operated when the protection circuit 137 determines to stop the secondary battery 121. As the transistor 140 and the transistor 150, MOSFETs including a parasitic diode can be used. Alternatively, OS transistors may be used as the transistor 140 and the transistor 150. The power storage device 100 may have a structure without the transistor 140 or the transistor 150.

The protection circuit 137 and the timer circuit 103 can be provided in the same chip, for example. "Providing in the same chip" means, for example, providing both circuits on the same silicon substrate or over the same glass substrate.

Alternatively, the protection circuit 137 and the timer circuit 103 can be provided in the same package, for example. "Providing in the same package" means, for example, providing two chips including the circuits over the same printed circuit board.

This embodiment can be combined with any of the other embodiments as appropriate.

Embodiment 2

A structure example of a semiconductor device applicable to the battery control circuit described in the above embodiment will be described.

Figure 14:
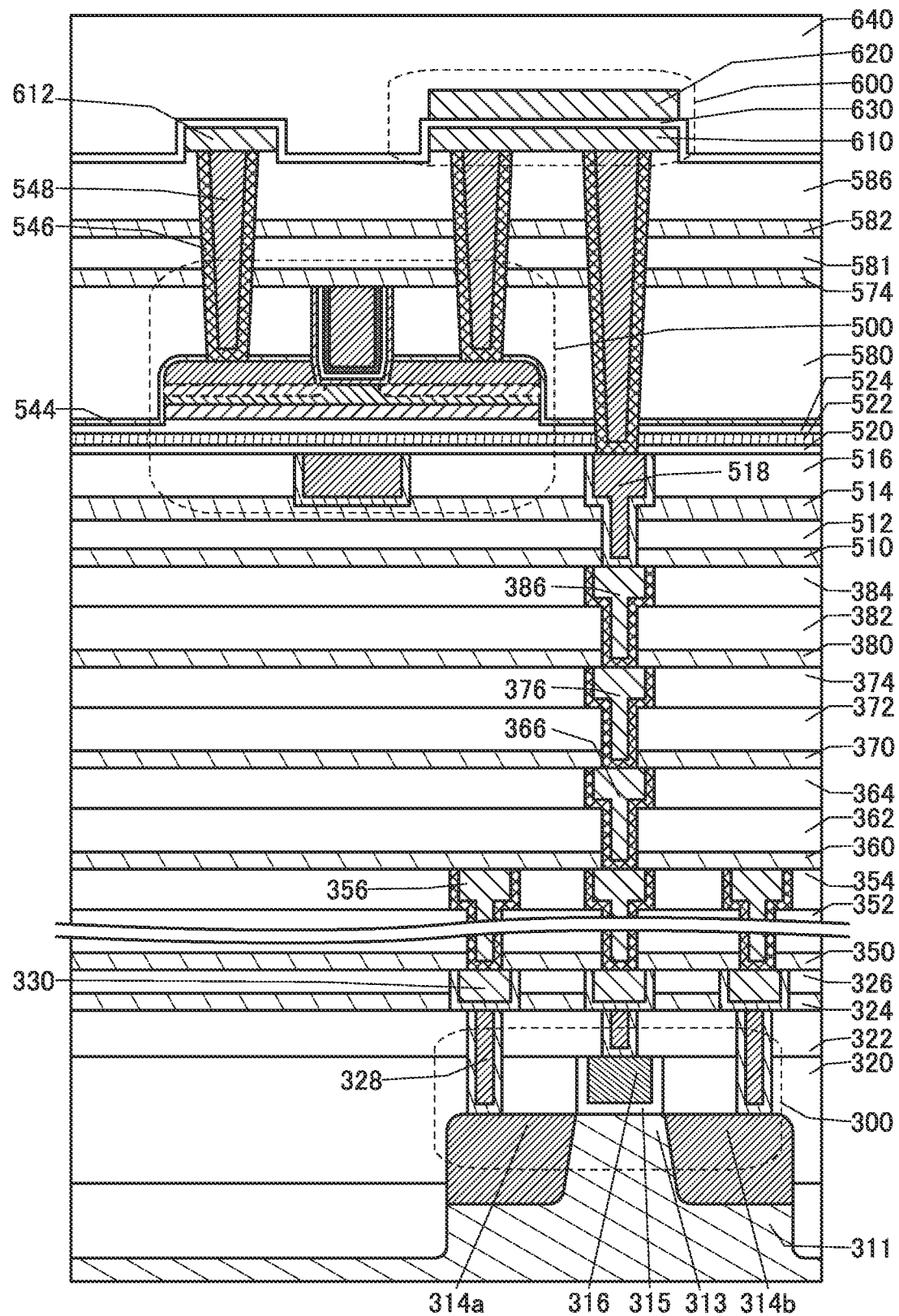
FIG. 14 is a cross-sectional view illustrating a structure example of a semiconductor device.
Figure 16A:
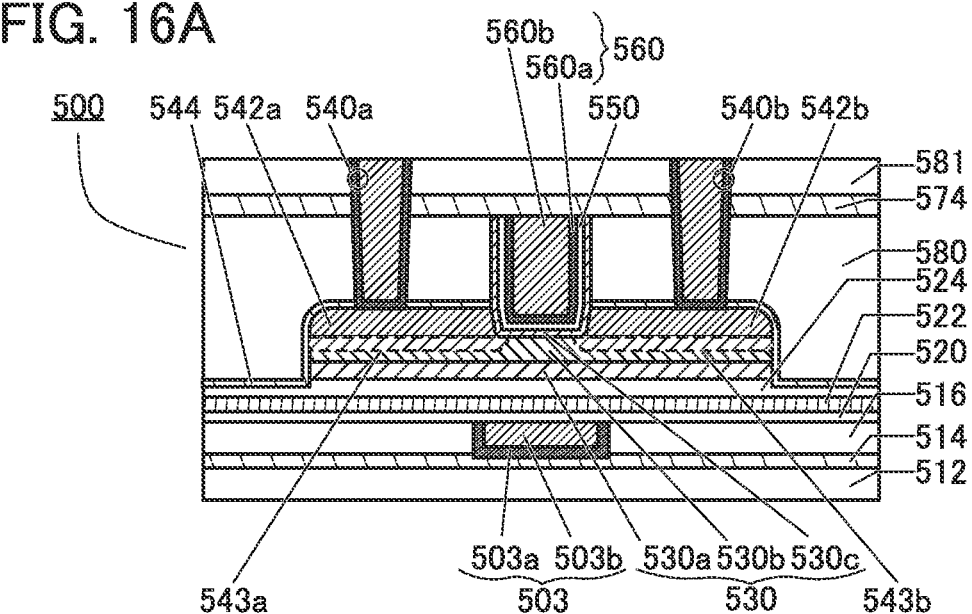
FIG. 16A is a cross-sectional view illustrating a structure example of a transistor.
Figure 16B:
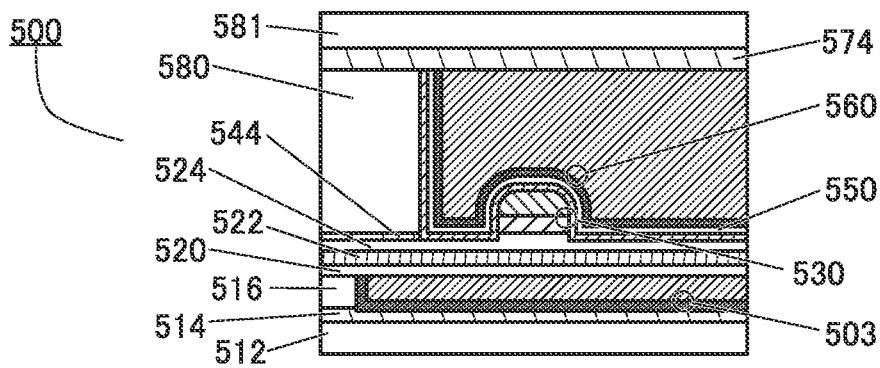
FIG. 16B is a cross-sectional view illustrating a structure example of the transistor.
Figure 16C:
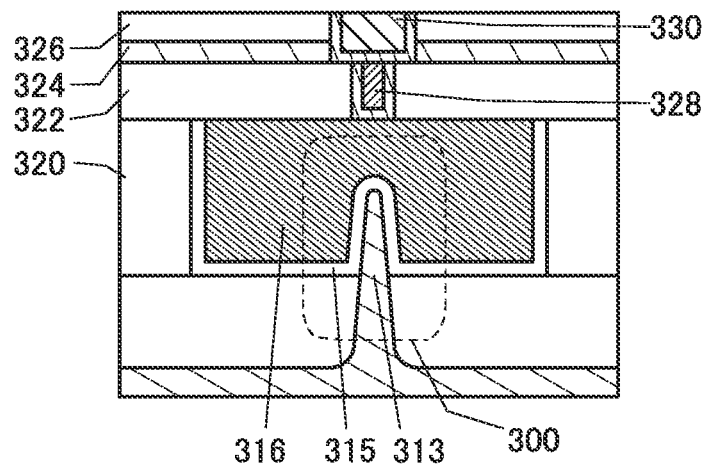
FIG. 16C is a cross-sectional view illustrating a structure example of a transistor.

A semiconductor device illustrated in FIG. 14 includes a transistor 300, a transistor 500, and a capacitor 600. FIG. 16A is a cross-sectional view of the transistor 500 in the channel length direction, FIG. 16B is a cross-sectional view of the transistor 500 in the channel width direction, and FIG. 16C is a cross-sectional view of the transistor 300 in the channel width direction.

The transistor 500 is an OS transistor. The transistor 500 has a low off-state current, and thus enables long-term retention of written data when used as an OS transistor included in the semiconductor device.

The transistor 500 is an n-channel transistor, for example.

As a transistor included in the power storage device of one embodiment of the present invention, an OS transistor can be used. In addition, an OS transistor and a Si transistor may be used in appropriate combination. Furthermore, all the transistors may be either OS transistors or Si transistors. Examples of the Si transistor include a transistor containing amorphous silicon and a transistor containing crystalline silicon (typically, low-temperature polysilicon, single crystal silicon, or the like).

An OS transistor has features of an extremely low off-state current and favorable switching characteristics even in a high-temperature environment. Accordingly, charging or discharging of an assembled battery 120 can be controlled without a malfunction even in a high-temperature environment.

A memory element using an OS transistor can freely be placed by being stacked over a circuit using an Si transistor or the like, so that integration can be easy. Furthermore, OS transistors can be manufactured with a manufacturing apparatus similar to that for Si transistors and thus can be manufactured at low cost.

In addition, an OS transistor can be a four-terminal semiconductor element including a back gate electrode in addition to a gate electrode, a source electrode, and a drain electrode. The OS transistor can be formed using an electric circuit network that can independently control input and output of signals flowing between a source and a drain depending on a voltage applied to the gate electrode or the back gate electrode. Therefore, it is possible to design circuits under the same thought as LSI. Furthermore, an OS transistor has better electrical characteristics than a Si transistor in a high-temperature environment. Specifically, the ratio of an on-state current to an off-state current is high even at a high temperature higher than or equal to 100° C. and lower than or equal to 200° C., preferably higher than or equal to 125° C. and lower than or equal to 150° C.; thus, favorable switching operation can be performed.

The semiconductor device described in this embodiment includes the transistor 300, the transistor 500, and the capacitor 600, as illustrated in FIG. 14. The transistor 500 is provided above the transistor 300, and the capacitor 600 is provided above the transistor 300 and the transistor 500.

The transistor 300 is provided over a substrate 311 and includes a conductor 316, an insulator 315, a semiconductor region 313 that is part of the substrate 311, and a low-resistance region 314a and a low-resistance region 314b each functioning as a source region or a drain region. Note that the transistor 300 can be used as the transistor included in the comparator in the above embodiment, for example.

As illustrated in FIG. 16C, in the transistor 300, a top surface and a side surface of the semiconductor region 313 in the channel width direction are covered with the conductor 316 with the insulator 315 therebetween. Such a Fin-type transistor 300 has an increased effective channel width, and thus the transistor 300 can have improved on-state characteristics. In addition, since contribution of an electric field of a gate electrode can be increased, the off-state characteristics of the transistor 300 can be improved.

Note that the transistor 300 can be either a p-channel transistor or an n-channel transistor.

A region of the semiconductor region 313 where a channel is formed, a region in the vicinity thereof, the low-resistance region 314a and the low-resistance region 314b each functioning as a source region or a drain region, and the like preferably contain a semiconductor such as a silicon-based semiconductor, and preferably contain single crystal silicon. Alternatively, the regions may be formed using a material containing Ge (germanium), SiGe (silicon germanium), GaAs (gallium arsenide), GaAlAs (gallium aluminum arsenide), or the like. A structure may be employed in which silicon whose effective mass is controlled by applying stress to the crystal lattice and changing the lattice spacing is used. Alternatively, the transistor 300 may be an HEMT (High Electron Mobility Transistor) with the use of GaAs and GaAlAs, or the like.

The low-resistance region 314a and the low-resistance region 314b contain an element which imparts n-type conductivity, such as arsenic or phosphorus, or an element which imparts p-type conductivity, such as boron, in addition to the semiconductor material used for the semiconductor region 313.

For the conductor 316 functioning as a gate electrode, a semiconductor material such as silicon containing the element which imparts n-type conductivity, such as arsenic or phosphorus, or the element which imparts p-type conductivity, such as boron, or a conductive material such as a metal material, an alloy material, or a metal oxide material can be used.

Note that since the work function of a conductor depends on the material of the conductor, the threshold voltage of the transistor can be adjusted by selecting the material of the conductor. Specifically, it is preferable to use a material such as titanium nitride or tantalum nitride for the conductor. Moreover, in order to ensure both conductivity and embeddability, it is preferable to use stacked layers of metal materials such as tungsten and aluminum for the conductor, and it is particularly preferable to use tungsten in terms of heat resistance.

Figure 15:
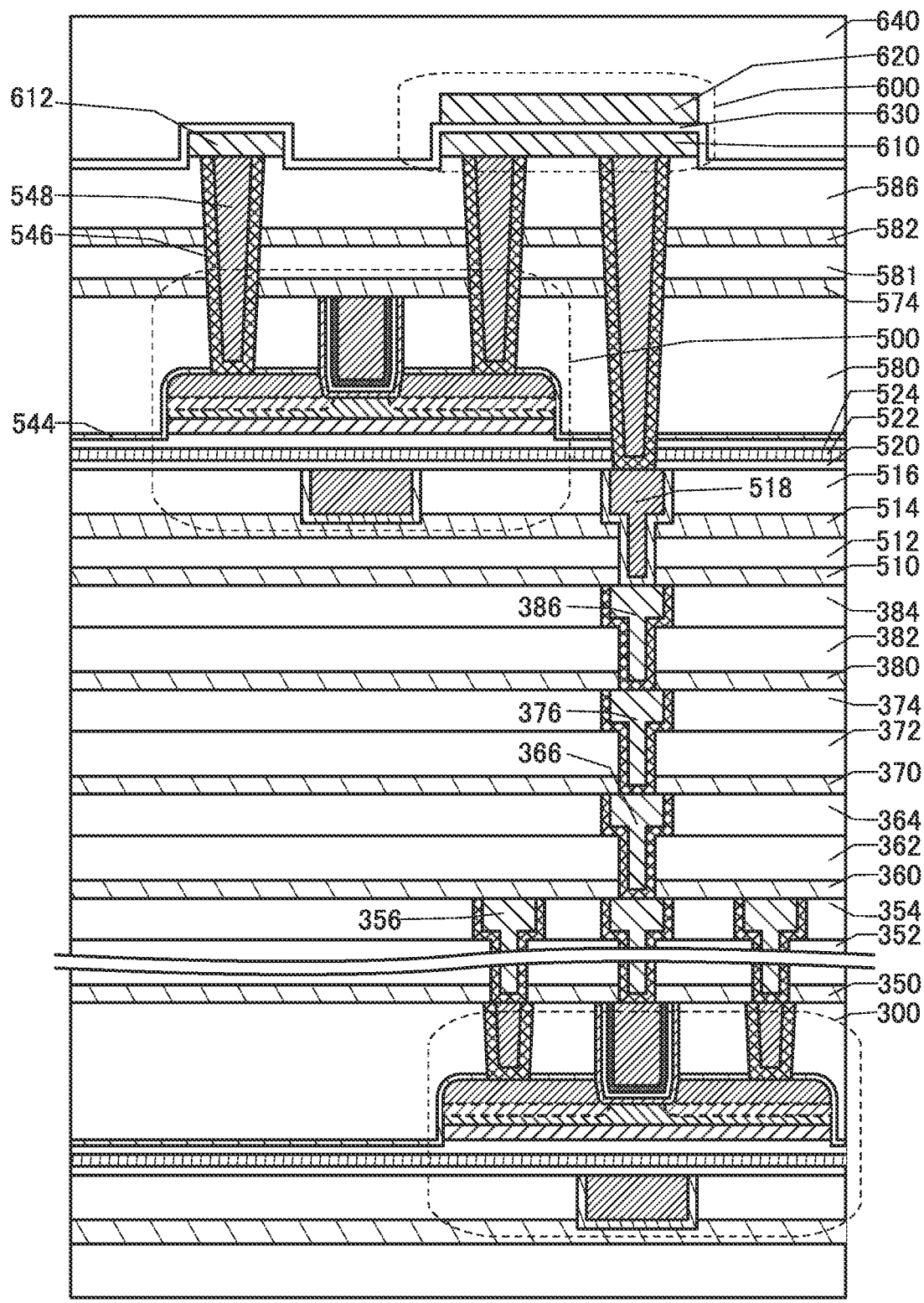
FIG. 15 is a cross-sectional view illustrating a structure example of a semiconductor device.

Note that the transistor 300 illustrated in FIG. 14 is an example and the structure is not limited thereto; an appropriate transistor may be used in accordance with a circuit configuration or a driving method. For example, when the semiconductor device is composed of only OS transistors, the transistor 300 has a structure similar to the structure of the transistor 500 using an oxide semiconductor, as illustrated in FIG. 15. Note that the details of the transistor 500 will be described later.

An insulator 320, an insulator 322, an insulator 324, and an insulator 326 are stacked sequentially and provided to cover the transistor 300.

For the insulator 320, the insulator 322, the insulator 324, and the insulator 326, silicon oxide, silicon oxynitride, silicon nitride oxide, silicon nitride, aluminum oxide, aluminum oxynitride, aluminum nitride oxide, aluminum nitride, or the like is used, for example.

Note that in this specification, silicon oxynitride refers to a material that has a higher oxygen content than a nitrogen content, and silicon nitride oxide refers to a material that has a higher nitrogen content than an oxygen content. Furthermore, in this specification, aluminum oxynitride refers to a material that has a higher oxygen content than a nitrogen content, and aluminum nitride oxide refers to a material that has a higher nitrogen content than an oxygen content.

The insulator 322 may have a function of a planarization film for planarizing a level difference caused by the transistor 300 or the like provided below the insulator 322. For example, a top surface of the insulator 322 may be planarized by planarization treatment using a chemical mechanical polishing (CMP) method or the like to improve planarity.

In addition, for the insulator 324, it is preferable to use a film having a barrier property that prevents diffusion of hydrogen or impurities from the substrate 311, the transistor 300, or the like into a region where the transistor 500 is provided.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film that releases a small amount of hydrogen.

The amount of released hydrogen can be analyzed by thermal desorption spectroscopy (TDS) or the like. The amount of hydrogen released from the insulator 324 that is converted into hydrogen atoms per area of the insulator 324 is less than or equal to $10 \times 10^{15}$ atoms/cm$^2$, preferably less than or equal to $5 \times 10^{15}$ atoms/cm$^2$, in the TDS analysis in a film-surface temperature range of 50° C. to 500° C., for example.

Note that the dielectric constant of the insulator 326 is preferably lower than that of the insulator 324. For example, the dielectric constant of the insulator 326 is preferably lower than 4, further preferably lower than 3. The dielectric constant of the insulator 326 is, for example, preferably 0.7 times or less, further preferably 0.6 times or less the dielectric constant of the insulator 324. When a material with a low dielectric constant is used as an interlayer film, the parasitic capacitance generated between wirings can be reduced.

In addition, a conductor 328, a conductor 330, and the like that are connected to the capacitor 600 or the transistor 500 are embedded in the insulator 320, the insulator 322, the insulator 324, and the insulator 326. Note that the conductor 328 and the conductor 330 each have a function of a plug or a wiring. Furthermore, a plurality of conductors functioning as plugs or wirings are collectively denoted by the same reference numeral in some cases. Moreover, in this specification and the like, a wiring and a plug connected to the wiring may be a single component. That is, there are cases where part of a conductor functions as a wiring and part of a conductor functions as a plug.

As a material for each of the plugs and wirings (the conductor 328, the conductor 330, and the like), a single layer or a stacked layer of a conductive material such as a metal material, an alloy material, a metal nitride material, or a metal oxide material can be used. It is preferable to use a high-melting-point material that has both heat resistance and conductivity, such as tungsten or molybdenum, and it is preferable to use tungsten. Alternatively, it is preferable to form the plugs and wirings with a low-resistance conductive material such as aluminum or copper. The use of a low-resistance conductive material can reduce wiring resistance.

A wiring layer may be provided over the insulator 326 and the conductor 330. For example, in FIG. 14, an insulator 350, an insulator 352, and an insulator 354 are stacked sequentially. Furthermore, a conductor 356 is formed in the insulator 350, the insulator 352, and the insulator 354. The conductor 356 has a function of a plug or a wiring that is connected to the transistor 300. Note that the conductor 356 can be provided using a material similar to those for the conductor 328 and the conductor 330.

The insulator 350 is preferably formed using, for example, an insulator having a barrier property against hydrogen, like the insulator 324. Furthermore, the conductor 356 preferably contains a conductor having a barrier property against hydrogen. In particular, the conductor having a barrier property against hydrogen is formed in an opening portion of the insulator 350 having a barrier property against hydrogen. With this structure, the transistor 300 and the transistor 500 can be separated by a barrier layer, so that diffusion of hydrogen from the transistor 300 into the transistor 500 can be inhibited.

Note that for the conductor having a barrier property against hydrogen, tantalum nitride is preferably used, for example. In addition, the use of a stack including tantalum nitride and tungsten, which has high conductivity, can inhibit diffusion of hydrogen from the transistor 300 while the conductivity of a wiring is kept. In this case, a structure is preferable in which a tantalum nitride layer having a barrier property against hydrogen is in contact with the insulator 350 having a barrier property against hydrogen.

A wiring layer may be provided over the insulator 354 and the conductor 356. For example, in FIG. 14, an insulator 360, an insulator 362, and an insulator 364 are stacked sequentially. Furthermore, a conductor 366 is formed in the insulator 360, the insulator 362, and the insulator 364. The conductor 366 has a function of a plug or a wiring. Note that the conductor 366 can be provided using a material similar to those for the conductor 328 and the conductor 330.

The insulator 360 is preferably formed using, for example, an insulator having a barrier property against hydrogen, like the insulator 324. Furthermore, the conductor 366 preferably contains a conductor having a barrier property against hydrogen. In particular, the conductor having a barrier property against hydrogen is preferably formed in an opening portion of the insulator 360 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 364 and the conductor 366. For example, in FIG. 14, an insulator 370, an insulator 372, and an insulator 374 are stacked sequentially. Furthermore, a conductor 376 is formed in the insulator 370, the insulator 372, and the insulator 374. The conductor 376 has a function of a plug or a wiring. Note that the conductor 376 can be provided using a material similar to those for the conductor 328 and the conductor 330.

The insulator 370 is preferably formed using, for example, an insulator having a barrier property against hydrogen, like the insulator 324. Furthermore, the conductor 376 preferably contains a conductor having a barrier property against hydrogen. In particular, the conductor having a barrier property against hydrogen is preferably formed in an opening portion of the insulator 370 having a barrier property against hydrogen. With this structure, the transistor 300 and the transistor 500 can be separated by a barrier layer, so that diffusion of hydrogen from the transistor 300 into the transistor 500 can be inhibited.

A wiring layer may be provided over the insulator 374 and the conductor 376. For example, in FIG. 14, an insulator 380, an insulator 382, and an insulator 384 are stacked sequentially. Furthermore, a conductor 386 is formed in the insulator 380, the insulator 382, and the insulator 384. The conductor 386 has a function of a plug or a wiring. Note that the conductor 386 can be provided using a material similar to those for the conductor 328 and the conductor 330.

The insulator 380 is preferably formed using, for example, an insulator having a barrier property against hydrogen, like the insulator 324. Furthermore, the conductor 386 preferably contains a conductor having a barrier property against hydrogen. In particular, the conductor having a barrier property against hydrogen is preferably formed in an opening portion of the insulator 380 having a barrier property against hydrogen. With this structure, the transistor 300 and the transistor 500 can be separated by a barrier layer, so that diffusion of hydrogen from the transistor 300 into the transistor 500 can be inhibited.

Although the wiring layer including the conductor 356, the wiring layer including the conductor 366, the wiring layer including the conductor 376, and the wiring layer including the conductor 386 are described above, the semiconductor device of this embodiment is not limited thereto. Three or less wiring layers that are similar to the wiring layer including the conductor 356 may be provided, or five or more wiring layers that are similar to the wiring layer including the conductor 356 may be provided.

An insulator 510, an insulator 512, an insulator 514, and an insulator 516 are stacked sequentially and provided over the insulator 384. A substance having a barrier property against oxygen or hydrogen is preferably used for any of the insulator 510, the insulator 512, the insulator 514, and the insulator 516.

For example, for the insulator 510 and the insulator 514, it is preferable to use a film having a barrier property that prevents diffusion of hydrogen or impurities from the substrate 311, a region where the transistor 300 is provided, or the like into the region where the transistor 500 is provided. Therefore, a material similar to that for the insulator 324 can be used.

For the film having a barrier property against hydrogen, silicon nitride formed by a CVD method can be used, for example. Here, diffusion of hydrogen into a semiconductor element including an oxide semiconductor, such as the transistor 500, degrades the characteristics of the semiconductor element in some cases. Therefore, a film that inhibits hydrogen diffusion is preferably used between the transistor 500 and the transistor 300. The film that inhibits hydrogen diffusion is specifically a film that releases a small amount of hydrogen.

In addition, for the film having a barrier property against hydrogen, a metal oxide such as aluminum oxide, hafnium oxide, or tantalum oxide is preferably used for the insulator 510 and the insulator 514, for example.

In particular, aluminum oxide has an excellent blocking effect that prevents the passage of both oxygen and impurities such as hydrogen and moisture which are factors of a change in electrical characteristics of the transistor. Accordingly, aluminum oxide can prevent mixing of impurities such as hydrogen and moisture into the transistor 500 in a fabrication process and after fabrication of the transistor. In addition, release of oxygen from the oxide included in the transistor 500 can be inhibited. Therefore, aluminum oxide is suitably used for a protective film of the transistor 500.

In addition, for the insulator 512 and the insulator 516, a material similar to that for the insulator 320 can be used, for example. Furthermore, when a material with a comparatively low dielectric constant is used for these insulators, parasitic capacitance generated between wirings can be reduced. A silicon oxide film, a silicon oxynitride film, or the like can be used for the insulator 512 and the insulator 516, for example.

Furthermore, a conductor 518, a conductor included in the transistor 500 (e.g., a conductor 503), and the like are embedded in the insulator 510, the insulator 512, the insulator 514, and the insulator 516. Note that the conductor 518 has a function of a plug or a wiring that is connected to the capacitor 600 or the transistor 300. The conductor 518 can be provided using a material similar to those for the conductor 328 and the conductor 330.

In particular, the conductor 518 in a region in contact with the insulator 510 and the insulator 514 is preferably a conductor having a barrier property against oxygen, hydrogen, and water. With this structure, the transistor 300 and the transistor 500 can be separated by a layer having a barrier property against oxygen, hydrogen, and water; thus, diffusion of hydrogen from the transistor 300 into the transistor 500 can be inhibited.

The transistor 500 is provided above the insulator 516.

As illustrated in FIG. 16A and FIG. 16B, the transistor 500 includes the conductor 503 positioned to be embedded in the insulator 514 and the insulator 516; an insulator 520 positioned over the insulator 516 and the conductor 503; an insulator 522 positioned over the insulator 520; an insulator 524 positioned over the insulator 522; an oxide 530a positioned over the insulator 524; an oxide 530b positioned over the oxide 530a; a conductor 542a and a conductor 542b positioned apart from each other over the oxide 530b; an insulator 580 that is positioned over the conductor 542a and the conductor 542b and is provided with an opening formed to overlap with a region between the conductor 542a and the conductor 542b; an oxide 530c positioned on a bottom and a side surfaces of the opening; an insulator 550 positioned on a formation surface of the oxide 530c; and a conductor 560 positioned on a formation surface of the insulator 550.

In addition, as illustrated in FIG. 16A and FIG. 16B, an insulator 544 is preferably positioned between the insulator 580 and the oxide 530a, the oxide 530b, the conductor 542a, and the conductor 542b. Furthermore, as illustrated in FIG. 16A and FIG. 16B, the conductor 560 preferably includes a conductor 560a provided inside the insulator 550 and a conductor 560b provided to be embedded inside the conductor 560a. Moreover, as illustrated in FIG. 16A and FIG. 16B, an insulator 574 is preferably positioned over the insulator 580, the conductor 560, and the insulator 550.

Note that in the following description, the oxide 530a, the oxide 530b, and the oxide 530c are sometimes collectively referred to as an oxide 530.

Note that although a structure of the transistor 500 in which three layers of the oxide 530a, the oxide 530b, and the oxide 530c are stacked in a region where a channel is formed and its vicinity is shown, the present invention is not limited thereto. For example, a single layer of the oxide 530b, a two-layer structure of the oxide 530b and the oxide 530a, a two-layer structure of the oxide 530b and the oxide 530c, or a stacked-layer structure of four or more layers may be employed. Furthermore, although the conductor 560 is shown to have a stacked-layer structure of two layers in the transistor 500, the present invention is not limited thereto. For example, the conductor 560 may have a single-layer structure or a stacked-layer structure of three or more layers. The transistor 500 shown in FIG. 14 and FIG. 16A is just an example and is not limited to the structure shown therein; an appropriate transistor can be used in accordance with a circuit configuration or a driving method.

Here, the conductor 560 functions as a gate electrode of the transistor, and the conductor 542a and the conductor 542b each function as a source electrode or a drain electrode. As described above, the conductor 560 is formed to be embedded in the opening of the insulator 580 and the region between the conductor 542a and the conductor 542b. The positions of the conductor 560, the conductor 542a, and the conductor 542b with respect to the opening of the insulator 580 are selected in a self-aligned manner. That is, in the transistor 500, the gate electrode can be positioned between the source electrode and the drain electrode in a self-aligned manner. Therefore, the conductor 560 can be formed without an alignment margin, resulting in a reduction in the area occupied by the transistor 500. Accordingly, miniaturization and high integration of the semiconductor device can be achieved.

In addition, since the conductor 560 is formed in the region between the conductor 542a and the conductor 542b in a self-aligned manner, the conductor 560 does not have a region overlapping with the conductor 542a or the conductor 542b. Thus, parasitic capacitance formed between the conductor 560 and each of the conductor 542a and the conductor 542b can be reduced. As a result, the transistor 500 can have improved switching speed and excellent frequency characteristics.

The conductor 560 sometimes functions as a first gate (also referred to as top gate) electrode. In addition, the conductor 503 sometimes functions as a second gate (also referred to as bottom gate) electrode. In that case, the threshold voltage of the transistor 500 can be controlled by changing a potential applied to the conductor 503 independently of a potential applied to the conductor 560. In particular, the threshold voltage of the transistor 500 can be higher than 0 V and the off-state current can be reduced by applying a negative potential to the conductor 503. Thus, a drain current at the time when a potential applied to the conductor 560 is 0 V can be lower in the case where a negative potential is applied to the conductor 503 than in the case where a negative potential is not applied to the conductor 503.

The conductor 503 is positioned to overlap with the oxide 530 and the conductor 560. Thus, in the case where potentials are applied to the conductor 560 and the conductor 503, an electric field generated from the conductor 560 and an electric field generated from the conductor 503 are connected, so that a channel formation region formed in the oxide 530 can be covered. In this specification and the like, a transistor structure in which a channel formation region is electrically surrounded by electric fields of a first gate electrode and a second gate electrode is referred to as a surrounded channel (S-channel) structure.

Furthermore, in this specification and the like, the surrounded channel (S-channel) structure has a feature in that the side surface and the vicinity of the oxide 530 in contact with the conductor 542a and the conductor 542b functioning as a source electrode and a drain electrode are of an I-type like the channel formation region. The side surface and the vicinity of the oxide 530 in contact with the conductor 542a and the conductor 542b are in contact with the insulator 544 and thus can be of an I-type like the channel formation region. Note that in this specification and the like, "I-type" can be equated with "highly purified intrinsic" to be described later. The S-channel structure disclosed in this specification and the like is different from a Fin-type structure and a planar structure. With the S-channel structure, resistance to a short-channel effect can be enhanced, that is, a transistor in which a short-channel effect is less likely to occur can be provided.

In addition, the conductor 503 has a structure similar to that of the conductor 518; a conductor 503a is formed in contact with an inner wall of an opening in the insulator 514 and the insulator 516, and a conductor 503b is formed on the inner side. Note that although the transistor 500 having a structure in which the conductor 503a and the conductor 503b are stacked is shown, the present invention is not limited thereto. For example, the conductor 503 may be provided as a single layer or to have a stacked-layer structure of three or more layers.

Here, for the conductor 503a, a conductive material that has a function of inhibiting diffusion of impurities such as a hydrogen atom, a hydrogen molecule, a water molecule, and a copper atom (through which the impurities are less likely to pass) is preferably used. Alternatively, it is preferable to use a conductive material that has a function of inhibiting diffusion of oxygen (e.g., at least one of an oxygen atom, an oxygen molecule, and the like) (through which oxygen is less likely to pass). Note that in this specification, a function of inhibiting diffusion of impurities or oxygen means a function of inhibiting diffusion of any one or all of the impurities and oxygen.

For example, when the conductor 503a has a function of inhibiting diffusion of oxygen, a reduction in conductivity of the conductor 503b due to oxidation can be inhibited.

In addition, in the case where the conductor 503 also functions as a wiring, a conductive material with high conductivity that contains tungsten, copper, or aluminum as its main component is preferably used for the conductor 503b. In that case, the conductor 503a is not necessarily provided. Note that the conductor 503b is illustrated as a single layer but may have a stacked-layer structure, for example, a stack of the above conductive material and titanium or titanium nitride.

The insulator 520, the insulator 522, and the insulator 524 have a function of a second gate insulating film.

Here, as the insulator 524 in contact with the oxide 530, an insulator that contains oxygen more than oxygen in the stoichiometric composition is preferably used. That is, an excess-oxygen region is preferably formed in the insulator 524. When such an insulator containing excess oxygen is provided in contact with the oxide 530, oxygen vacancies in the oxide 530 can be reduced and the reliability of the transistor 500 can be improved.

As the insulator including an excess-oxygen region, specifically, an oxide material that releases part of oxygen by heating is preferably used. An oxide that releases oxygen by heating is an oxide film in which the amount of released oxygen converted into oxygen atoms is greater than or equal to $1.0 \times 10^{18}$ atoms/cm$^3$, preferably greater than or equal to $1.0 \times 10^{19}$ atoms/cm$^3$, further preferably greater than or equal to $2.0 \times 10^{19}$ atoms/cm$^3$ or greater than or equal to $3.0 \times 10^{20}$ atoms/cm$^3$ in TDS (Thermal Desorption Spectroscopy) analysis. Note that the temperature of the film surface in the TDS analysis is preferably in a range of higher than or equal to 100° C. and lower than or equal to 700° C., or higher than or equal to 100° C. and lower than or equal to 400° C.

One or more of heat treatment, microwave treatment, and RF treatment may be performed in a state in which the insulator including the excess-oxygen region and the oxide 530 are in contact with each other. By the treatment, water or hydrogen in the oxide 530 can be removed. For example, in the oxide 530, dehydrogenation can be performed when a reaction in which a bond of VoH is cut occurs, i.e., a reaction of "VoH→*Vo+H" occurs. Part of hydrogen generated at this time is bonded to oxygen to be $H_2O$, and removed from the oxide 530 or an insulator near the oxide 530 in some cases. Part of hydrogen is diffused into or gettered by the conductor 542 in some cases.

For the microwave treatment, for example, an apparatus including a power supply that generates high-density plasma or an apparatus including a power supply that applies RF to the substrate side is suitably used. For example, the use of an oxygen-containing gas and high-density plasma enables high-density oxygen radicals to be generated, and application of the RF to the substrate side allows the oxygen radicals generated by the high-density plasma to be efficiently introduced into the oxide 530 or an insulator in the vicinity of the oxide 530. The pressure in the microwave treatment is higher than or equal to 133 Pa, preferably higher than or equal to 200 Pa, further preferably higher than or equal to 400 Pa. As a gas introduced into an apparatus for performing the microwave treatment, for example, oxygen and argon are used and the oxygen flow rate ($O_2/(O_2+Ar)$) is lower than or equal to 50%, preferably higher than or equal to 10% and lower than or equal to 30%.

In a fabrication process of the transistor 500, the heat treatment is preferably performed with the surface of the oxide 530 exposed. The heat treatment is performed at higher than or equal to 100° C. and lower than or equal to 450° C., preferably higher than or equal to 350° C. and lower than or equal to 400° C., for example. Note that the heat treatment is performed in a nitrogen gas or inert gas atmosphere, or an atmosphere containing an oxidizing gas at 10 ppm or more, 1% or more, or 10% or more. For example, the heat treatment is preferably performed in an oxygen atmosphere. Accordingly, oxygen can be supplied to the oxide 530 to reduce oxygen vacancies (Vo). Alternatively, the heat treatment may be performed under reduced pressure. Alternatively, the heat treatment may be performed in such a manner that heat treatment is performed in a nitrogen gas or inert gas atmosphere, and then another heat treatment is performed in an atmosphere containing an oxidizing gas at 10 ppm or more, 1% or more, or 10% or more in order to compensate for released oxygen. Alternatively, the heat treatment may be performed in such a manner that heat treatment is performed in an atmosphere containing an oxidizing gas at 10 ppm or more, 1% or more, or 10% or more, and then another heat treatment is successively performed in a nitrogen gas atmosphere or an inert gas atmosphere.

Note that the oxygen adding treatment performed on the oxide 530 can promote a reaction in which oxygen vacancies in the oxide 530 are filled with supplied oxygen, i.e., a reaction of "Vo+O→*null". Furthermore, hydrogen remaining in the oxide 530 reacts with supplied oxygen, so that the hydrogen can be removed as $H_2O$ (dehydrogenation). This can inhibit recombination of hydrogen remaining in the oxide 530 with oxygen vacancies and formation of VoH.

In addition, in the case where the insulator 524 includes an excess-oxygen region, it is preferable that the insulator 522 have a function of inhibiting diffusion of oxygen (e.g., an oxygen atom, an oxygen molecule, or the like) (through which oxygen is less likely to pass).

When the insulator 522 has a function of inhibiting diffusion of oxygen or impurities, oxygen contained in the oxide 530 is not diffused into the insulator 520 side, which is preferable. Furthermore, the conductor 503 can be inhibited from reacting with oxygen contained in the insulator 524 or the oxide 530.

For the insulator 522, a single layer or stacked layers of an insulator containing what is called a high-k material such as aluminum oxide, hafnium oxide, an oxide containing aluminum and hafnium (hafnium aluminate), tantalum oxide, zirconium oxide, lead zirconate titanate (PZT), strontium titanate ($SrTiO_3$), or $(Ba,Sr)TiO_3$ (BST) are preferably used, for example. As miniaturization and high integration of transistors progress, a problem such as leakage current might arise because of a thinner gate insulating film. When a high-k material is used for an insulator functioning as the gate insulating film, a gate potential during transistor operation can be reduced while the physical thickness is maintained.

It is particularly preferable to use an insulator containing an oxide of one or both of aluminum and hafnium, which is an insulating material having a function of inhibiting diffusion of impurities, oxygen, and the like (through which oxygen is less likely to pass). Aluminum oxide, hafnium oxide, an oxide containing aluminum and hafnium (hafnium aluminate), or the like is preferably used as the insulator containing an oxide of one or both of aluminum and hafnium. In the case where the insulator 522 is formed using such a material, the insulator 522 functions as a layer that inhibits release of oxygen from the oxide 530 and mixing of impurities such as hydrogen from the periphery of the transistor 500 into the oxide 530.

Alternatively, aluminum oxide, bismuth oxide, germanium oxide, niobium oxide, silicon oxide, titanium oxide, tungsten oxide, yttrium oxide, or zirconium oxide may be added to these insulators, for example. Alternatively, these insulators may be subjected to nitriding treatment. The insulator over which silicon oxide, silicon oxynitride, or silicon nitride is stacked may be used.

In addition, it is preferable that the insulator 520 be thermally stable. For example, silicon oxide and silicon oxynitride are suitable because they are thermally stable. Furthermore, the combination of an insulator that is a high-k material and silicon oxide or silicon oxynitride enables the insulator 520 and an insulator 526 to have a stacked-layer structure that has thermal stability and a high dielectric constant.

Note that in the transistor 500 in FIG. 16A and FIG. 16B, the insulator 520, the insulator 522, and the insulator 524 are illustrated as the second gate insulating film having a stacked-layer structure of three layers; however, the second gate insulating film may be a single layer or may have a stacked-layer structure of two layers or four or more layers. In such cases, without limitation to a stacked-layer structure formed of the same material, a stacked-layer structure formed of different materials may be employed.

In the transistor 500, a metal oxide functioning as an oxide semiconductor is preferably used as the oxide 530 including the channel formation region. For example, as the oxide 530, a metal oxide such as an In-M-Zn oxide (the element M is one kind or a plurality of kinds selected from aluminum, gallium, yttrium, copper, vanadium, beryllium, boron, titanium, iron, nickel, germanium, zirconium, molybdenum, lanthanum, cerium, neodymium, hafnium, tantalum, tungsten, magnesium, and the like) is preferably used. As the In-M-Zn oxide which can be used as the oxide 530, it is possible to use a CAAC (c-axis-aligned crystalline)-OS (oxide semiconductor), which has c-axis alignment, nanocrystals connected in the a-b plane direction, and a distorted crystal structure, or a CAC (cloud-aligned composite)-OS. Furthermore, as the oxide 530, an In—Ga oxide or an In—Zn oxide may be used.

Furthermore, a metal oxide with a low carrier concentration is preferably used as the oxide 530. In order to reduce the carrier concentration in the metal oxide, the impurity concentration in the metal oxide is reduced so that the density of defect states can be reduced. In this specification and the like, a state with a low impurity concentration and a low density of defect states is referred to as a highly purified intrinsic or substantially highly purified intrinsic state. As examples of the impurities in the metal oxide, hydrogen, nitrogen, alkali metal, alkaline earth metal, iron, nickel, silicon, and the like are given.

In particular, hydrogen contained in a metal oxide reacts with oxygen bonded to a metal atom to be water, and thus forms an oxygen vacancy (also referred to as Vo) in the metal oxide in some cases. If the channel formation region in the metal oxide includes oxygen vacancies, the transistor has normally-on characteristics in some cases. Furthermore, a defect that is an oxygen vacancy into which hydrogen enters functions as a donor and generates an electron serving as a carrier, in some cases. In other cases, bonding of part of hydrogen to oxygen bonded to a metal atom generates an electron serving as a carrier. Thus, a transistor using a metal oxide containing much hydrogen is likely to have normally-on characteristics. In the case where hydrogen enters an oxygen vacancy in the metal oxide, the oxygen vacancy and the hydrogen are bonded to each other to form VoH in some cases. The VoH serves as a donor and an electron that is a carrier is generated in some cases. In other cases, bonding of part of hydrogen to oxygen bonded to a metal atom generates an electron serving as a carrier. Thus, a transistor using a metal oxide containing much hydrogen is likely to have normally-on characteristics. Moreover, hydrogen in a metal oxide easily moves by stress such as heat and an electric field; thus, the reliability of a transistor may be reduced when the metal oxide contains much hydrogen. In one embodiment of the present invention, VoH in the oxide 530 is preferably reduced as much as possible so that the oxide 530 becomes a highly purified intrinsic or substantially highly purified intrinsic oxide. It is important to remove impurities such as moisture and hydrogen in a metal oxide (sometimes described as dehydration or dehydrogenation treatment) and to compensate for oxygen vacancies by supplying oxygen to the metal oxide (sometimes described as oxygen supplying treatment) to obtain a metal oxide whose VoH is reduced enough. When a metal oxide with a sufficiently low concentration of impurities such as VoH is used for a channel formation region of a transistor, the transistor can have stable electrical characteristics.

A defect in which hydrogen has entered an oxygen vacancy can function as a donor of the metal oxide. However, it is difficult to evaluate the defects quantitatively. Thus, the metal oxide is sometimes evaluated by not its donor concentration but its carrier concentration. Therefore, in this specification and the like, the carrier concentration assuming the state where an electric field is not applied is sometimes used, instead of the donor concentration, as the parameter of the metal oxide. That is, "carrier concentration" in this specification and the like can be replaced with "donor concentration" in some cases.

Therefore, hydrogen in the oxide 530 is preferably reduced as much as possible. Specifically, the hydrogen concentration of the metal oxide, which is measured by secondary ion mass spectrometry (SIMS), is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$. When a metal oxide with a sufficiently low concentration of impurities such as hydrogen is used for a channel formation region of a transistor, the transistor can have stable electrical characteristics.

The carrier concentration of the metal oxide in the channel formation region is preferably lower than or equal to $1\times10^{18}$ cm$^{-3}$, further preferably lower than $1\times10^{17}$ cm$^{-3}$, still further preferably lower than $1\times10^{16}$ cm$^{-3}$, yet further preferably lower than $1\times10^{13}$ cm$^{-3}$, and yet still further preferably lower than $1\times10^{12}$ cm$^{-3}$. Note that the lower limit of the carrier concentration of the metal oxide in the channel formation region is not particularly limited and can be, for example, $1\times10^{-9}$ cm$^{-3}$.

The metal oxide functioning as the channel formation region in the oxide 530 has a band gap of preferably 2 eV or higher, further preferably 2.5 eV or higher. With the use of a metal oxide having such a wide bandgap, the off-state current of the transistor can be reduced.

When the oxide 530 includes the oxide 530a under the oxide 530b, it is possible to inhibit diffusion of impurities into the oxide 530b from the components formed below the oxide 530a. Moreover, including the oxide 530c over the oxide 530b makes it possible to inhibit diffusion of impurities into the oxide 530b from the components formed above the oxide 530c.

Note that the oxide 530 preferably has a stacked-layer structure of oxides that differ in the atomic ratio of metal atoms. Specifically, the atomic ratio of the element M to the constituent elements in the metal oxide used as the oxide 530a is preferably higher than the atomic ratio of the element M to the constituent elements in the metal oxide used as the oxide 530b. In addition, the atomic ratio of the element M to In in the metal oxide used as the oxide 530a is preferably higher than the atomic ratio of the element M to In in the metal oxide used as the oxide 530b. Furthermore, the atomic ratio of In to the element M in the metal oxide used as the oxide 530b is preferably higher than the atomic ratio of In to the element M in the metal oxide used as the oxide 530a. Moreover, a metal oxide that can be used as the oxide 530a or the oxide 530b can be used as the oxide 530c.

In addition, the energy of the conduction band minimum of each of the oxide 530a and the oxide 530c is preferably higher than the energy of the conduction band minimum of the oxide 530b. In other words, the electron affinity of each of the oxide 530a and the oxide 530c is preferably smaller than the electron affinity of the oxide 530b.

Here, the energy level of the conduction band minimum gradually changes at junction portions of the oxide 530a, the oxide 530b, and the oxide 530c. In other words, the energy level of the conduction band minimum at the junction portions of the oxide 530a, the oxide 530b, and the oxide 530c continuously changes or is continuously connected. To change the energy level gradually, the densities of defect states in mixed layers formed at an interface between the oxide 530a and the oxide 530b and an interface between the oxide 530b and the oxide 530c is preferably made low.

Specifically, when the oxide 530a and the oxide 530b or the oxide 530b and the oxide 530c contain a common element (as a main component) in addition to oxygen, a mixed layer with a low density of defect states can be formed. For example, in the case where the oxide 530b is an In—Ga—Zn oxide, an In—Ga—Zn oxide, a Ga—Zn oxide, gallium oxide, or the like is preferably used as the oxide 530a and the oxide 530c.

At this time, the oxide 530b serves as a main carrier path. When the oxide 530a and the oxide 530c have the above structures, the densities of defect states at the interface between the oxide 530a and the oxide 530b and the interface between the oxide 530b and the oxide 530c can be made low. Thus, the influence of interface scattering on carrier conduction is small, and the transistor 500 can have a high on-state current.

The conductor 542a and the conductor 542b functioning as the source electrode and the drain electrode are provided over the oxide 530b. For the conductor 542a and the conductor 542b, it is preferable to use a metal element selected from aluminum, chromium, copper, silver, gold, platinum, tantalum, nickel, titanium, molybdenum, tungsten, hafnium, vanadium, niobium, manganese, magnesium, zirconium, beryllium, indium, ruthenium, iridium, strontium, and lanthanum; an alloy containing the above metal element; an alloy containing a combination of the above metal element; or the like. For example, it is preferable to use tantalum nitride, titanium nitride, tungsten, a nitride containing titanium and aluminum, a nitride containing tantalum and aluminum, ruthenium oxide, ruthenium nitride, an oxide containing strontium and ruthenium, an oxide containing lanthanum and nickel, or the like. In addition, tantalum nitride, titanium nitride, a nitride containing titanium and aluminum, a nitride containing tantalum and aluminum, ruthenium oxide, ruthenium nitride, an oxide containing strontium and ruthenium, and an oxide containing lanthanum and nickel are preferable because they are oxidation-resistant conductive materials or materials that retain their conductivity even after absorbing oxygen. Furthermore, a metal nitride film of tantalum nitride or the like is preferable because it has a barrier property against hydrogen or oxygen.

Although the conductor 542a and the conductor 542b each having a single-layer structure are illustrated in FIG. 16A, a stacked-layer structure of two or more layers may be employed. For example, it is preferable to stack a tantalum nitride film and a tungsten film. Alternatively, a titanium film and an aluminum film may be stacked. Alternatively, a two-layer structure where an aluminum film is stacked over a tungsten film, a two-layer structure where a copper film is stacked over a copper-magnesium-aluminum alloy film, a two-layer structure where a copper film is stacked over a titanium film, or a two-layer structure where a copper film is stacked over a tungsten film may be employed.

Other examples include a three-layer structure where a titanium film or a titanium nitride film is formed, an aluminum film or a copper film is stacked over the titanium film or the titanium nitride film, and a titanium film or a titanium nitride film is formed over the aluminum film or the copper film; and a three-layer structure where a molybdenum film or a molybdenum nitride film is formed, an aluminum film or a copper film is stacked over the molybdenum film or the molybdenum nitride film, and a molybdenum film or a molybdenum nitride film is formed over the aluminum film or the copper film. Note that a transparent conductive material containing indium oxide, tin oxide, or zinc oxide may be used.

In addition, as illustrated in FIG. 16A or the like, a region 543a and a region 543b are sometimes formed as low-resistance regions at an interface between the oxide 530 and the conductor 542a (the conductor 542b) and in the vicinity of the interface. In that case, the region 543a functions as one of a source region and a drain region, and the region 543b functions as the other of the source region and the drain region. Furthermore, the channel formation region is formed in a region between the region 543a and the region 543b.

When the conductor 542a (the conductor 542b) is provided to be in contact with the oxide 530, the oxygen concentration in the region 543a (the region 543b) sometimes decreases. In addition, a metal compound layer that contains the metal contained in the conductor 542a (the conductor 542b) and the component of the oxide 530 is sometimes formed in the region 543a (the region 543b). In such a case, the carrier density of the region 543a (the region 543b) increases, and the region 543a (the region 543b) becomes a low-resistance region.

Furthermore, when the conductor 542a (the conductor 542b) and the oxide 530 are in contact with each other, oxygen in the oxide 530 diffuses into the electrode and the conductor is oxidized in some cases. It is highly possible that oxidation of the conductor lowers the conductivity of the conductor. Note that diffusion of oxygen from the oxide 530 into the conductor can be interpreted as absorption of oxygen in the oxide 530 by the conductor.

In addition, diffusion of oxygen from the oxide 530 into the conductor 542a (the conductor 542b) might form a layer between the oxide 530 and the oxide conductor. The layer contains more oxygen than the conductor 542a (the conductor 542b) does, so that the layer presumably has an insulating property. The three-layer structure of the conductor 542a (the conductor 542b), the layer, and the oxide 530 can be the structure with a metal, an insulator, and a semiconductor, which is sometimes called a metal-insulator-semiconductor (MIS) structure or a diode junction structure having an MIS structure as its main part.

The insulator 544 is provided to cover the conductor 542a and the conductor 542b and inhibits oxidation of the conductor 542a and the conductor 542b. At this time, the insulator 544 may be provided to cover a side surface of the oxide 530 and to be in contact with the insulator 524.

A metal oxide containing one kind or two or more kinds selected from hafnium, aluminum, gallium, yttrium, zirconium, tungsten, titanium, tantalum, nickel, germanium, neodymium, lanthanum, magnesium, and the like can be used as the insulator 544. Alternatively, silicon nitride oxide, silicon nitride, or the like can be used for the insulator 544.

It is particularly preferable to use an insulator containing an oxide of one or both of aluminum and hafnium, such as aluminum oxide, hafnium oxide, or an oxide containing aluminum and hafnium (hafnium aluminate), as the insulator 544. In particular, hafnium aluminate has higher heat resistance than a hafnium oxide film. Therefore, hafnium aluminate is preferable because it is less likely to be crystallized by heat treatment in a later step. Note that the insulator 544 is not an essential component when the conductor 542a and the conductor 542b are oxidation-resistant materials or do not significantly lose their conductivity even after absorbing oxygen. Design is appropriately set in consideration of required transistor characteristics.

When the insulator 544 is included, diffusion of impurities such as water and hydrogen contained in the insulator 580 into the oxide 530b through the oxide 530c and the insulator 550 can be inhibited. Furthermore, oxidation of the conductor 560 due to excess oxygen contained in the insulator 580 can be inhibited.

The insulator 550 functions as a first gate insulating film. The insulator 550 is preferably positioned in contact with an inner side (a top surface and a side surface) of the oxide 530c. Like the insulator 524, the insulator 550 is preferably formed using an insulator that contains excess oxygen and releases oxygen by heating.

Specifically, silicon oxide containing excess oxygen, silicon oxynitride, silicon nitride oxide, silicon nitride, silicon oxide to which fluorine is added, silicon oxide to which carbon is added, silicon oxide to which carbon and nitrogen are added, or porous silicon oxide can be used. In particular, silicon oxide and silicon oxynitride are preferable because they are thermally stable.

When an insulator that releases oxygen by heating is provided as the insulator 550 in contact with the top surface of the oxide 530c, oxygen can be effectively supplied from the insulator 550 to the channel formation region of the oxide 530b through the oxide 530c. Furthermore, as in the insulator 524, the concentration of impurities such as water or hydrogen in the insulator 550 is preferably lowered. The thickness of the insulator 550 is preferably greater than or equal to 1 nm and less than or equal to 20 nm.

Furthermore, to efficiently supply excess oxygen contained in the insulator 550 to the oxide 530, a metal oxide may be provided between the insulator 550 and the conductor 560. The metal oxide preferably inhibits diffusion of oxygen from the insulator 550 to the conductor 560. Providing the metal oxide that inhibits diffusion of oxygen inhibits diffusion of excess oxygen from the insulator 550 to the conductor 560. That is, a reduction in the amount of excess oxygen supplied to the oxide 530 can be inhibited. Moreover, oxidation of the conductor 560 due to excess oxygen can be inhibited. For the metal oxide, a material that can be used for the insulator 544 is used.

Note that the insulator 550 may have a stacked-layer structure like the second gate insulating film. As miniaturization and high integration of transistors progress, a problem such as leakage current might arise because of a thinner gate insulating film. For that reason, when the insulating film functioning as the gate insulating film has a stacked-layer structure of a high-k material and a thermally stable material, a gate potential during transistor operation can be reduced while the physical thickness is maintained. Furthermore, the stacked-layer structure can be thermally stable and have a high dielectric constant.

Although the conductor 560 that functions as the first gate electrode and has a two-layer structure is shown in FIG. 16A and FIG. 16B, a single-layer structure or a stacked-layer structure of three or more layers may be employed.

For the conductor 560a, it is preferable to use a conductive material having a function of inhibiting diffusion of impurities such as a hydrogen atom, a hydrogen molecule, a water molecule, a nitrogen atom, a nitrogen molecule, a nitrogen oxide molecule ($N_2O$, NO, $NO_2$, and the like), and a copper atom. Alternatively, it is preferable to use a conductive material having a function of inhibiting diffusion of oxygen (e.g., at least one of an oxygen atom, an oxygen molecule, and the like). When the conductor 560a has a function of inhibiting diffusion of oxygen, it is possible to inhibit a reduction in conductivity of the conductor 560b due to oxidation caused by oxygen contained in the insulator 550. As a conductive material having a function of inhibiting diffusion of oxygen, for example, tantalum, tantalum nitride, ruthenium, ruthenium oxide, or the like is preferably used. For the conductor 560a, the oxide semiconductor that can be used as the oxide 530 can be used. In that case, when the conductor 560b is deposited by a sputtering method, the conductor 560a can have a reduced electrical resistance value to be a conductor. Such a conductor can be referred to as an OC (Oxide Conductor) electrode.

In addition, a conductive material containing tungsten, copper, or aluminum as its main component is preferably used for the conductor 560b. Furthermore, the conductor 560b also functions as a wiring and thus a conductor having high conductivity is preferably used as the conductor 560b. For example, a conductive material containing tungsten, copper, or aluminum as its main component can be used.

Moreover, the conductor 560b may have a stacked-layer structure, for example, a stacked-layer structure of the above conductive material and titanium or titanium nitride.

The insulator 580 is provided over the conductor 542a and the conductor 542b with the insulator 544 therebetween. The insulator 580 preferably includes an excess-oxygen region. For example, the insulator 580 preferably contains silicon oxide, silicon oxynitride, silicon nitride oxide, silicon nitride, silicon oxide to which fluorine is added, silicon oxide to which carbon is added, silicon oxide to which carbon and nitrogen are added, porous silicon oxide, resin, or the like. In particular, silicon oxide and silicon oxynitride are preferable because they are thermally stable. In particular, silicon oxide and porous silicon oxide are preferable because an excess-oxygen region can be easily formed in a later step.

The insulator 580 preferably includes an excess-oxygen region. When the insulator 580 that releases oxygen by heating is provided in contact with the oxide 530c, oxygen in the insulator 580 can be efficiently supplied to the oxide 530 through the oxide 530c. Note that the concentration of impurities such as water or hydrogen in the insulator 580 is preferably reduced.

The opening of the insulator 580 is formed to overlap with the region between the conductor 542a and the conductor 542b. Accordingly, the conductor 560 is formed to be embedded in the opening of the insulator 580 and the region between the conductor 542a and the conductor 542b.

The gate length needs to be short for miniaturization of the semiconductor device, but it is necessary to prevent a reduction in conductivity of the conductor 560. When the conductor 560 is made thick to achieve this, the conductor 560 might have a shape with a high aspect ratio. In this embodiment, the conductor 560 is provided to be embedded in the opening of the insulator 580; thus, even when the conductor 560 has a shape with a high aspect ratio, the conductor 560 can be formed without collapsing during the process.

The insulator 574 is preferably provided in contact with a top surface of the insulator 580, a top surface of the conductor 560, and a top surface of the insulator 550. When the insulator 574 is deposited by a sputtering method, excess-oxygen regions can be provided in the insulator 550 and the insulator 580. Accordingly, oxygen can be supplied from the excess-oxygen regions to the oxide 530.

For example, a metal oxide containing one kind or two or more kinds selected from hafnium, aluminum, gallium, yttrium, zirconium, tungsten, titanium, tantalum, nickel, germanium, magnesium, and the like can be used as the insulator 574.

In particular, aluminum oxide has a high barrier property, and even a thin aluminum oxide film having a thickness of greater than or equal to 0.5 nm and less than or equal to 3.0 nm can inhibit diffusion of hydrogen and nitrogen. Accordingly, aluminum oxide deposited by a sputtering method serves as an oxygen supply source and can also have a function of a barrier film against impurities such as hydrogen.

Note that after the transistor 500 is formed, an opening may be formed to surround the transistor 500 and an insulator having a high barrier property against hydrogen or water may be formed to cover the opening. Surrounding the transistor 500 by the insulator having a high barrier property can prevent entry of moisture and hydrogen from the outside. Alternatively, a plurality of transistors 500 may be collectively surrounded by the insulator having a high barrier property against hydrogen or water. When an opening is formed to surround the transistor 500, for example, the formation of an opening reaching the insulator 514 or the insulator 522 and the formation of the insulator having a high barrier property in contact with the insulator 514 or the insulator 522 are suitable because these formation steps can also serve as some of the fabrication steps of the transistor 500. Note that the insulator having a high barrier property against hydrogen or water is formed using a material similar to that for the insulator 522, for example.

In addition, an insulator 581 functioning as an interlayer film is preferably provided over the insulator 574. As in the insulator 524 or the like, the concentration of impurities such as water or hydrogen in the insulator 581 is preferably reduced.

Furthermore, a conductor 540a and a conductor 540b are positioned in openings formed in the insulator 581, the insulator 574, the insulator 580, and the insulator 544. The conductor 540a and the conductor 540b are provided to face each other with the conductor 560 therebetween. The conductor 540a and the conductor 540b have a structure similar to that of a conductor 546 and a conductor 548 that will be described later.

An insulator 582 is provided over the insulator 581. A substance having a barrier property against oxygen or hydrogen is preferably used for the insulator 582. Therefore, a material similar to that for the insulator 514 can be used for the insulator 582. For the insulator 582, a metal oxide such as aluminum oxide, hafnium oxide, or tantalum oxide is preferably used, for example.

In particular, aluminum oxide has an excellent blocking effect that prevents the passage of both oxygen and impurities such as hydrogen and moisture which are factors of a change in electrical characteristics of the transistor. Accordingly, aluminum oxide can prevent mixing of impurities such as hydrogen and moisture into the transistor 500 in a fabrication process and after fabrication of the transistor. In addition, release of oxygen from the oxide included in the transistor 500 can be inhibited. Therefore, aluminum oxide is suitably used for a protective film of the transistor 500.

In addition, an insulator 586 is provided over the insulator 582. For the insulator 586, a material similar to that for the insulator 320 can be used. Furthermore, when a material with a comparatively low dielectric constant is used for these insulators, parasitic capacitance generated between wirings can be reduced. A silicon oxide film, a silicon oxynitride film, or the like can be used for the insulator 586, for example.

Furthermore, the conductor 546, the conductor 548, and the like are embedded in the insulator 520, the insulator 522, the insulator 524, the insulator 544, the insulator 580, the insulator 574, the insulator 581, the insulator 582, and the insulator 586.

The conductor 546 and the conductor 548 have functions of plugs or wirings that are connected to the capacitor 600, the transistor 500, or the transistor 300. The conductor 546 and the conductor 548 can be provided using materials similar to those for the conductor 328 and the conductor 330.

Next, the capacitor 600 is provided above the transistor 500. The capacitor 600 includes a conductor 610, a conductor 620, and an insulator 630.

In addition, a conductor 612 may be provided over the conductor 546 and the conductor 548. The conductor 612 has a function of a plug or a wiring that is connected to the transistor 500. The conductor 610 has a function of an electrode of the capacitor 600. Note that the conductor 612 and the conductor 610 can be formed at the same time.

For the conductor 612 and the conductor 610, a metal film containing an element selected from molybdenum, titanium, tantalum, tungsten, aluminum, copper, chromium, neodymium, and scandium; a metal nitride film containing the above element as its component (a tantalum nitride film, a titanium nitride film, a molybdenum nitride film, or a tungsten nitride film); or the like can be used. Alternatively, it is possible to use a conductive material such as indium tin oxide, indium oxide containing tungsten oxide, indium zinc oxide containing tungsten oxide, indium oxide containing titanium oxide, indium tin oxide containing titanium oxide, indium zinc oxide, or indium tin oxide to which silicon oxide is added.

Although the conductor 612 and the conductor 610 each having a single-layer structure are shown in FIG. 14, the structure is not limited thereto; a stacked-layer structure of two or more layers may be employed. For example, between a conductor having a barrier property and a conductor having high conductivity, a conductor that is highly adhesive to the conductor having a barrier property and the conductor having high conductivity may be formed.

The conductor 620 is provided to overlap with the conductor 610 with the insulator 630 therebetween. Note that a conductive material such as a metal material, an alloy material, or a metal oxide material can be used for the conductor 620. It is preferable to use a high-melting-point material that has both heat resistance and conductivity, such as tungsten or molybdenum, and it is particularly preferable to use tungsten. In addition, in the case where the conductor 620 is formed concurrently with another component such as a conductor, Cu (copper), Al (aluminum), or the like, which is a low-resistance metal material, is used.

An insulator 640 is provided over the conductor 620 and the insulator 630. The insulator 640 can be provided using a material similar to that for the insulator 320. In addition, the insulator 640 may function as a planarization film that covers an uneven shape therebelow.

With the use of this structure, a change in electrical characteristics can be inhibited and reliability can be improved in a semiconductor device using a transistor including an oxide semiconductor. Alternatively, a battery control circuit using a transistor including an oxide semiconductor can be miniaturized or highly integrated.

An example of a memory using the OS transistor of one embodiment of the present invention is shown below.

The power storage device of one embodiment of the present invention preferably includes a memory. As the memory, a memory device using an OS transistor can be used. For example, a NOSRAM (registered trademark) or a DOSRAM (registered trademark) which are described below can be used.

A NOSRAM is a gain cell DRAM in which a write transistor of a memory cell is an OS transistor. A NOSRAM is an abbreviation for Nonvolatile Oxide Semiconductor RAM. A configuration example of a NOSRAM is described below.

<NOSRAM>

Figure 17A:
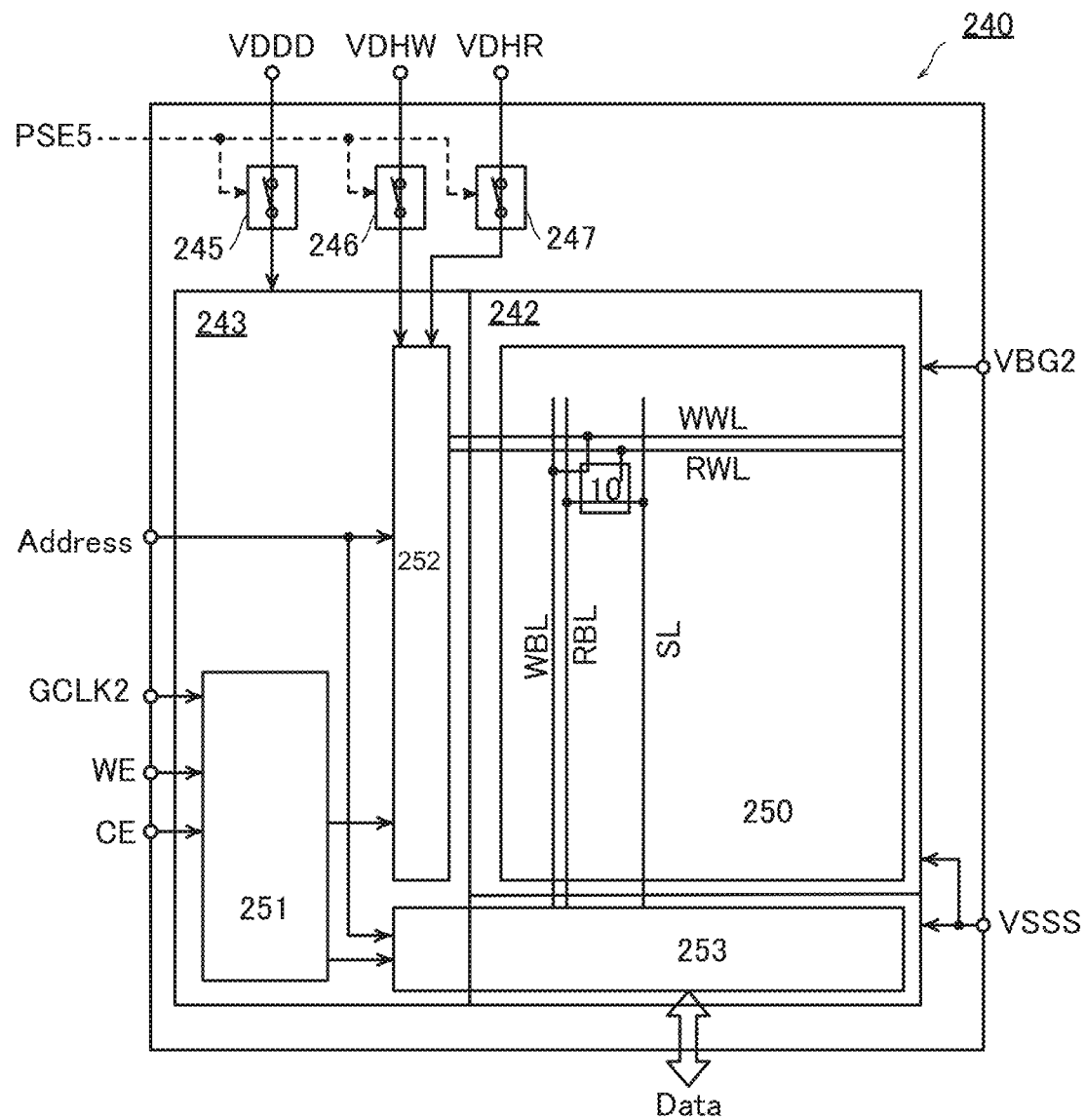
FIG. 17A is a block diagram illustrating a configuration example of a memory.

FIG. 17A is a block diagram showing a configuration example of a NOSRAM. In a NOSRAM 240, power domains 242 and 243 and power switches 245 to 247 are provided. A memory cell array 250 is provided in the power domain 242, and a peripheral circuit of the NOSRAM 240 is provided in the power domain 243. The peripheral circuit includes a control circuit 251, a row circuit 252, and a column circuit 253.

Voltages VDDD, VSSS, VDHW, VDHR, and VBG2, a clock signal GCLK2, an address signal, and signals CE, WE, and PSE5 are input to the NOSRAM 240 from the outside. The signals CE and WE are a chip enable signal and a write enable signal, respectively. The signal PSE5 controls the on/off of the power switches 245 to 247. The power switches 245 to 247 control the input of the voltages VDDD, VDHW, and VDHR, respectively, to the power domain 243.

Note that the voltages, signals, and the like input to the NOSRAM 240 are appropriately selected in accordance with the circuit configuration and operation method of the NOSRAM 240. For example, the NOSRAM 240 may be provided with a power domain which is not power gated, and a power gating control circuit that generates the signal PSE5 may be provided.

The memory cell array 250 includes a memory cell 10, a write word line WWL, a readout word line RWL, a write bit line WBL, a readout bit line RBL, and a source line SL.

Figure 17B:
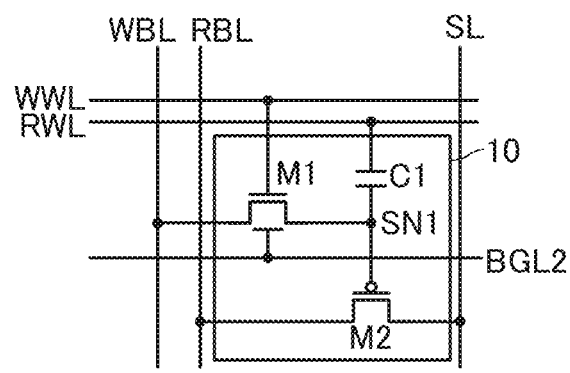
FIG. 17B is a diagram illustrating an example of a memory cell.

As illustrated in FIG. 17B, the memory cell 10 is a 2T1C (two transistors and one capacitor) gain cell, which includes a node SN1, transistors M1 and M2, and a capacitor C1. The transistor M1 is a write transistor, which is an OS transistor having a back gate. The back gate of the transistor M1 is electrically connected to a wiring BGL2 for supplying the voltage VBG2. The transistor M2 is a readout transistor, which is a p-channel Si transistor. The capacitor C1 is a storage capacitor for retaining the voltage of the node SN1.

The voltages VDDD and VSSS are voltages representing data "1" and "0", respectively. Note that high-level voltages of the write word lines WWL and RWL are VDHW and VHDR, respectively.

Figure 18A:
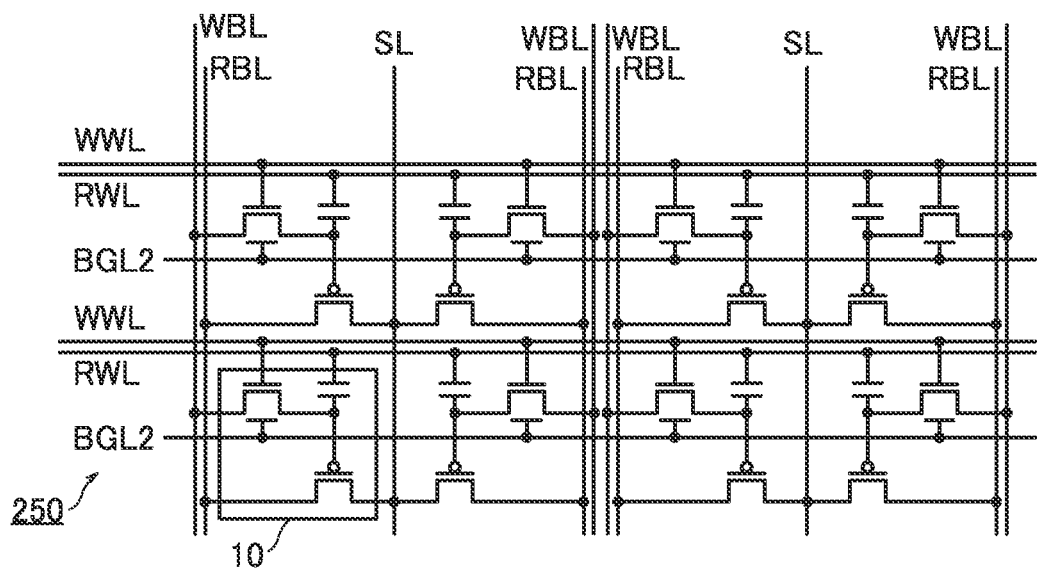
FIG. 18A is a diagram illustrating a configuration example of a memory cell array.

FIG. 18A shows a configuration example of the memory cell array 250. In the memory cell array 250 shown in FIG. 18A, one source line is supplied to the adjacent two rows.

The memory cell 10 does not have a limitation on the number of rewriting times in principle, can perform data rewriting with low energy, and does not consume power in retaining data. Since the transistor M1 is an OS transistor with an extremely low off-state current, the memory cell 10 can retain data for a long time. Thus, when cache memory devices 202 and 202 include the NOSRAM 240, the cache memory devices 202 and 203 can be low-power-consumption nonvolatile memory devices.

Figure 18B:
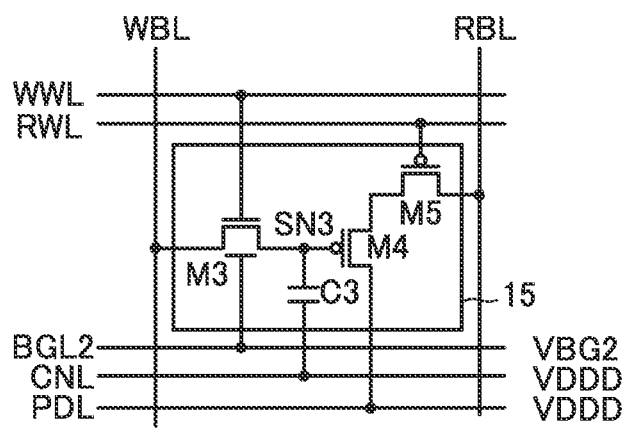
FIG. 18B is a diagram illustrating a configuration example of a memory cell.
Figure 18C:
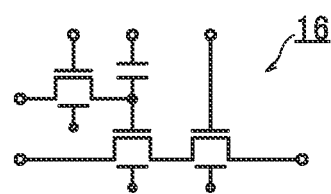
FIG. 18C is a diagram illustrating a configuration example of a memory cell.

The circuit configuration of the memory cell 10 is not limited to the circuit configuration shown in FIG. 17B. For example, the readout transistor M2 may be an OS transistor having a back gate or an n-channel Si transistor. Alternatively, the memory cell 10 may be a 3T gain cell. For example, FIG. 18B and FIG. 18C show examples of a 3T gain cell. A memory cell 15 shown in FIG. 18B includes transistors M3 to M5, a capacitor C3, and a node SN3. The transistors M3 to M5 are a write transistor, a readout transistor, and a selection transistor, respectively. The transistor M3 is an OS transistor having a back gate, and the transistors M4 and M5 are p-channel Si transistors. The transistors M4 and M5 may each be an n-channel Si transistor or an OS transistor having a back gate. In a memory cell 16 shown in FIG. 18C, three transistors are OS transistors each having a back gate.

The node SN3 is a retention node. The capacitor C3 is a storage capacitor for retaining the voltage of the node SN3. The capacitor C3 may be omitted intentionally, and the storage capacitor may be formed using gate capacitance of the transistor M4, or the like. A fixed voltage (e.g., VDDD) is input to a wiring PDL. The wiring PDL is an alternative to the source line SL, and for example, the voltage VDDD is input.

The control circuit 251 has a function of controlling the entire operation of the NOSRAM 240. For example, the control circuit 251 performs a logical operation of the signals CE and WE to determine whether access from the outside is write access or readout access.

The row circuit 252 has a function of selecting the write word line WWL and the readout word line in the row selected and specified by the address signal. The column circuit 253 has a function of writing data to the write bit line in the column specified by the address signal and a function of reading out data from the readout bit line WBL in the column.

<DOSRAM>

A DOSRAM refers to a RAM including a 1T1C memory cell and is an abbreviation for Dynamic Oxide Semiconductor RAM. A DOSRAM is described below with reference to FIG. 19A and FIG. 19B.

Figure 19A:
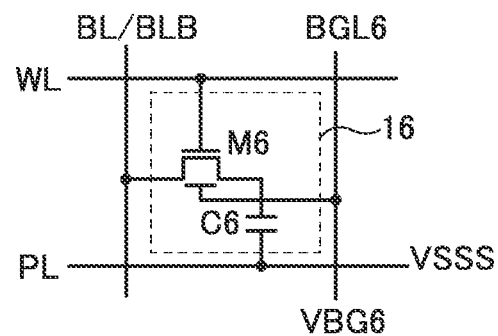
FIG. 19A is a diagram illustrating an example of a memory cell.

As illustrated in FIG. 19A, the memory cell 16 of a DOSRAM 351 is electrically connected to a bit line BL (or BLB), a word line WL, and wirings BGL6 and PL. The bit line BLB is an inverted bit line. For example, voltages VBG6 and VSSS are input to the wirings BGL6 and PL, respectively. The memory cell 16 includes a transistor M6 and a capacitor C6. The transistor M6 is an OS transistor having a back gate.

There is no limitation on the number of rewriting operations of the DOSRAM 351 in principle because data is rewritten by charging and discharging of the capacitor C6; and data can be written and read out with low energy. In addition, the memory cell 16 has a simple circuit configuration, and thus the capacity can be easily increased. Since the write transistor of the memory cell 16 is an OS transistor, the retention time of the DOSRAM 351 is significantly longer than that of a DRAM. This allows less frequent refresh or makes refresh operations unnecessary; thus, the power needed for refresh operations can be reduced.

Figure 19B:
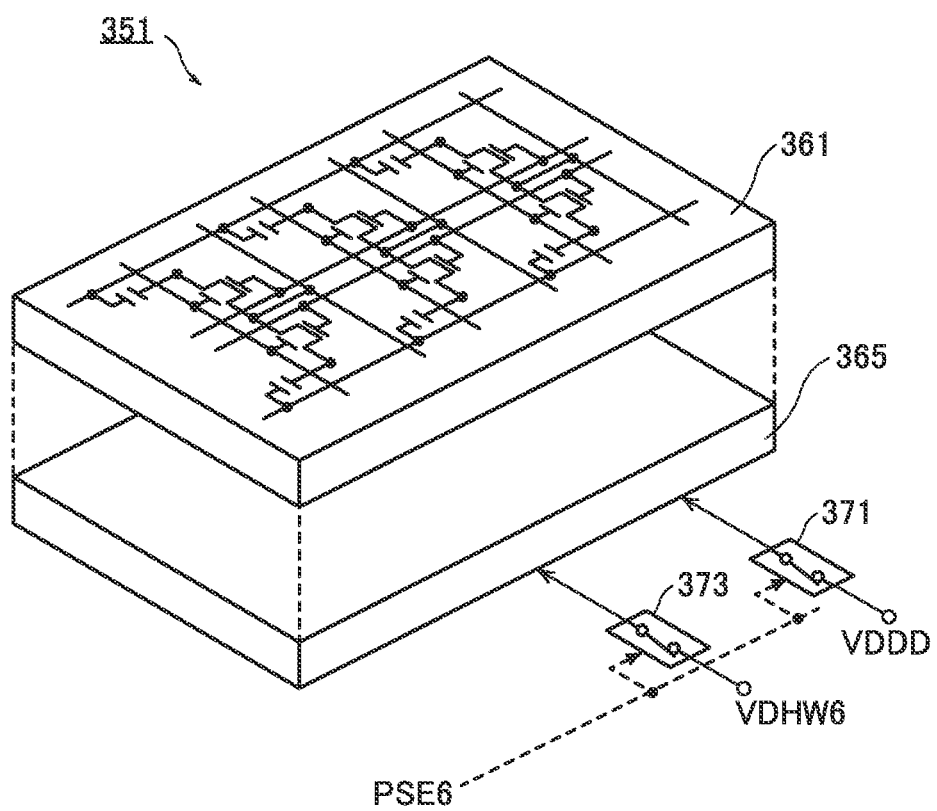
FIG. 19B is a diagram illustrating a configuration example of a memory.

As illustrated in FIG. 19B, in the DOSRAM 351, a memory cell array 361 can be stacked over a peripheral circuit 365. This is because the transistor M6 of the memory cell 16 is an OS transistor.

In the memory cell array 361, a plurality of memory cells 16 are arranged in a matrix, and the bit lines BL and BLB, the word line WL, and the wirings BGL6 and PL are provided according to the arrangement of the memory cells 16. A control circuit, a row circuit, and a column circuit are provided in the peripheral circuit 365. The row circuit selects the word line WL that is to be accessed, for example. The column circuit performs writing and reading out of data to and from a bit line pair formed of BL and BLB, for example.

Power switches 371 and 373 are provided in order to power gate the peripheral circuit 365. The power switches 371 and 373 control the input of voltages VDDD and VDHW6, respectively, to the peripheral circuit 365. Note that the voltage VDHW6 is a high-level voltage for the word line WL. On/off of the power switches 371 and 373 is controlled with a signal PSE6. For example, the signal PSE6 is generated by a PMU 113.

This embodiment can be combined with any of the other embodiments as appropriate.

Embodiment 3

In this embodiment, an example in which the battery control circuit described in the above embodiment is used as an electronic component is described with reference to FIG. 20A and FIG. 20B.

Figure 20A:
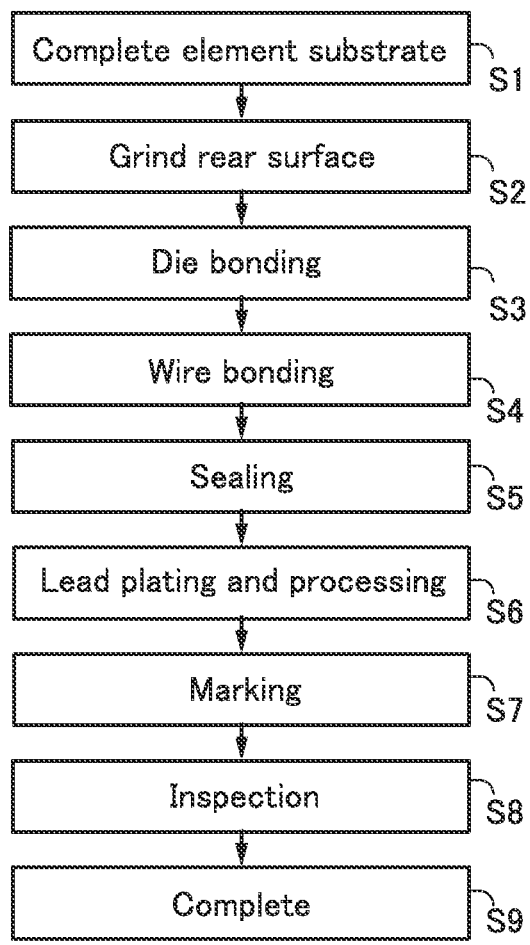
FIG. 20A is a flow chart showing a fabrication process of an electronic component.

FIG. 20A shows an example in which the battery control circuit described in the above embodiment is used as an electronic component. Note that the electronic component is also referred to as a semiconductor package or an IC package. For the electronic component, there are a plurality of standards and names corresponding to a terminal extraction direction and a terminal shape. Thus, examples thereof are described in this embodiment.

A circuit portion including an OS transistor or a Si transistor is completed by integrating a plurality of detachable components on a printed circuit board through an assembly process (a post-process).

The post-process can be completed through steps shown in FIG. 20A. Specifically, after an element substrate obtained in a pre-process is completed (Step S1), a rear surface of the substrate is ground (Step S2). The substrate is thinned down at this stage, so that warpage or the like of the substrate in the pre-process is reduced and the size of the component is reduced.

The rear surface of the substrate is ground, and a dicing step is performed to divide the substrate into a plurality of chips. Then, a die bonding step of individually picking up the divided chips to be mounted on and bonded to a lead frame is performed (Step S3). To bond the chip and the lead frame in this die bonding step, a method such as bonding with resin or bonding with a tape is selected as appropriate depending on products. Note that in the die bonding step, chips may be mounted on and bonded to an interposer.

Next, wire bonding in which a lead of the lead frame and an electrode on the chip are electrically connected with a metal fine line (wire) is performed (Step S4). A silver line or a gold line can be used as the metal fine line. Furthermore, ball bonding or wedge bonding can be used as the wire bonding.

The wire-bonded chip is subjected to sealing with an epoxy resin or the like in a molding step (Step S5). With the molding step, the inside of the electronic component is filled with the resin, so that damage to the circuit portion and the wire embedded by external mechanical force can be reduced, and degradation in characteristics due to moisture or dust can be reduced.

Next, the lead of the lead frame is subjected to plating treatment. Then, the lead is cut and processed (Step S6). This plating treatment prevents corrosion of the lead and enables more reliable soldering at the time of mounting the electronic component on a printed circuit board in a later step.

Next, printing treatment (marking) is performed on a surface of the package (Step S7). Then, through a final inspection step (Step S8), an electronic component that includes a circuit portion including a PLD is completed (Step S9).

Figure 20B:
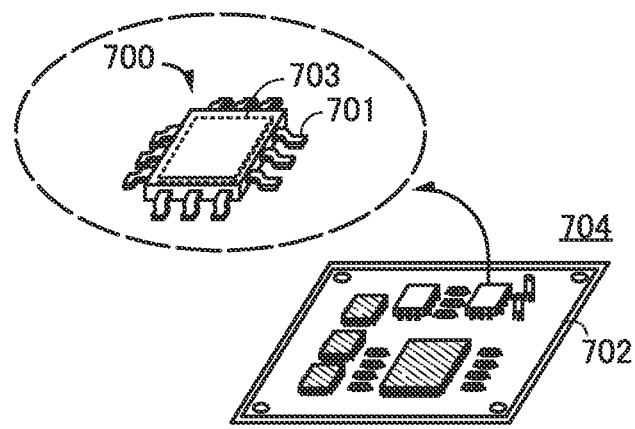
FIG. 20B is a schematic perspective view of the electronic component.

FIG. 20B shows a perspective schematic view of the completed electronic component. FIG. 20B shows a perspective schematic view of a QFP (Quad Flat Package) as an example of the electronic component. A lead 701 and a circuit portion 703 of an electronic component 700 are shown in FIG. 20B. The electronic component 700 shown in FIG. 20B is mounted on a printed circuit board 702, for example. A plurality of electronic components 700 that are combined and electrically connected to each other over the printed circuit board 702 can be mounted inside an electronic device. A completed circuit board 704 is provided in an electronic device or the like.

Embodiment 4

In this embodiment, structures of a power storage device and a power storage system to which the electronic component including the battery control circuit described in the above embodiment can be applied is described.

[Cylindrical Secondary Battery]

Figure 21A:
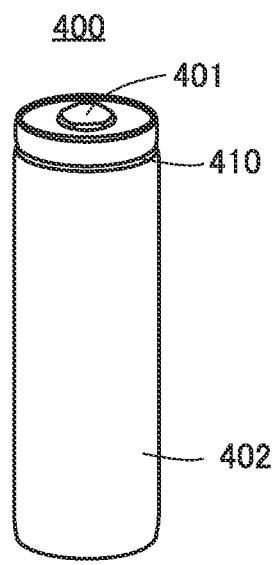
FIG. 21A is a diagram illustrating an example of a secondary battery.

An example of a cylindrical secondary battery is described with reference to FIG. 21A. A cylindrical secondary battery 400 includes, as illustrated in FIG. 21A, a positive electrode cap (battery lid) 401 on the top surface and a battery can (outer can) 402 on the side and bottom surfaces. The positive electrode cap 401 and the battery can (outer can) 402 are insulated from each other by a gasket (insulating packing) 410.

Figure 21B:
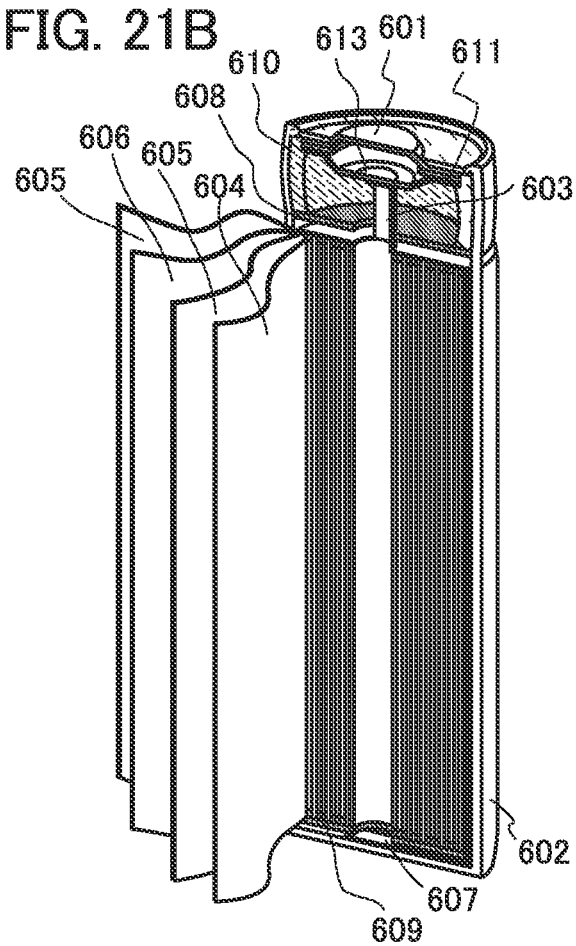
FIG. 21B is a cross-sectional view illustrating an example of a secondary battery.

FIG. 21B is a schematic cross-sectional diagram of a cylindrical secondary battery. As illustrated in FIG. 21B, the cylindrical secondary battery includes a positive electrode cap (battery lid) 601 on a top surface and a battery can (outer can) 602 on a side surface and a bottom surface. The positive electrode cap and the battery can (outer can) 602 are insulated from each other by a gasket (insulating packing) 610.

Inside the battery can 602 having a hollow cylindrical shape, a battery element in which a belt-like positive electrode 604 and a belt-like negative electrode 606 are wound with a separator 605 located therebetween is provided. Although not illustrated, the battery element is wound centering around a center pin. One end of the battery can 602 is closed and the other end thereof is open. For the battery can 602, a metal having a corrosion-resistant property to an electrolyte solution, such as nickel, aluminum, or titanium, an alloy of such a metal, or an alloy of such a metal and another metal (e.g., stainless steel) can be used. Alternatively, the battery can 602 is preferably covered with nickel, aluminum, or the like in order to prevent corrosion due to the electrolyte solution. Inside the battery can 602, the battery element in which the positive electrode, the negative electrode, and the separator are wound is sandwiched between a pair of insulating plates 608 and 609 that face each other. Furthermore, a nonaqueous electrolyte (not illustrated) is injected inside the battery can 602 provided with the battery element. As the nonaqueous electrolyte, a nonaqueous electrolyte that is similar to that for the coin-type secondary battery can be used.

Since a positive electrode and a negative electrode that are used for a cylindrical storage battery are wound, active materials are preferably formed on both surfaces of a current collector.

A positive electrode terminal (positive electrode current collector lead) 603 is connected to the positive electrode 604, and a negative electrode terminal (negative electrode current collector lead) 607 is connected to the negative electrode 606. For both the positive electrode terminal 603 and the negative electrode terminal 607, a metal material such as aluminum can be used. The positive electrode terminal 603 and the negative electrode terminal 607 are resistance-welded to a safety valve mechanism 613 and the bottom of the battery can 602, respectively. The safety valve mechanism 613 is electrically connected to the positive electrode cap 601 through a PTC (Positive Temperature Coefficient) element 611. The safety valve mechanism 613 cuts off electrical connection between the positive electrode cap 601 and the positive electrode 604 when the internal pressure of the battery exceeds a predetermined threshold. In addition, the PTC element 611 is a thermally sensitive resistor whose resistance increases as temperature rises, and limits the amount of current by increasing the resistance to prevent abnormal heat generation. Barium titanate (BaTiO$_3$)-based semiconductor ceramics or the like can be used for the PTC element.

Figure 21C:
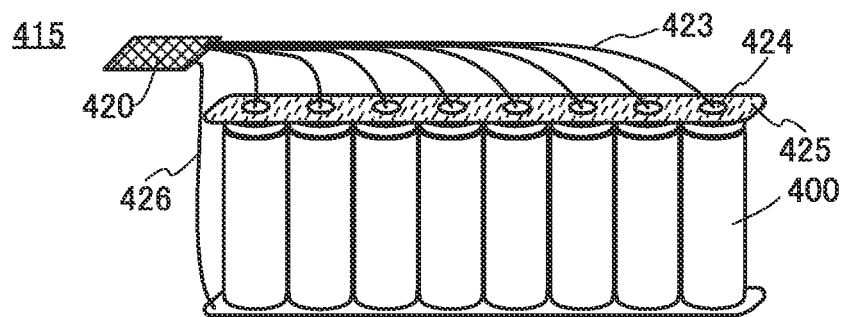
FIG. 21C is a diagram illustrating an example of a power storage system.

FIG. 21C illustrates an example of a power storage system 415. The power storage system 415 includes a plurality of secondary batteries 400. Positive electrodes of the secondary batteries are in contact with conductors 424 isolated by an insulator 425 and are electrically connected. The conductor 424 is electrically connected to a control circuit 420 through a wiring 423. Negative electrodes of the secondary batteries are electrically connected to the control circuit 420 through a wiring 426. As the control circuit 420, the battery control circuit described in the above embodiment can be used.

Figure 21D:
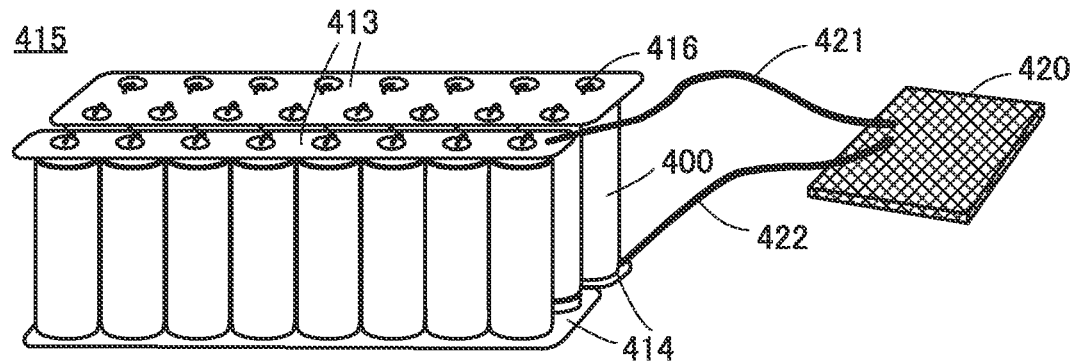
FIG. 21D is a diagram illustrating an example of a power storage system.

FIG. 21D illustrates an example of the power storage system 415. The power storage system 415 includes the plurality of secondary batteries 400, and the plurality of secondary batteries 400 are sandwiched between a conductive plate 413 and a conductive plate 414. The plurality of secondary batteries 400 are electrically connected to the conductive plate 413 and the conductive plate 414 through the wiring 416. The plurality of secondary batteries 400 may be connected parallel to each other, connected in series, or connected in series after being connected parallel to each other. With the power storage system 415 including the plurality of secondary batteries 400, large electric power can be extracted.

A temperature control device may be provided between the plurality of secondary batteries 400. When the secondary batteries 400 are heated excessively, the temperature control device can cool them, and when the secondary batteries 400 are cooled too much, the temperature control device can heat them. Thus, the performance of the power storage system 415 is not easily influenced by the outside air temperature.

In FIG. 21D, the power storage system 415 is electrically connected to the control circuit 420 through a wiring 421 and a wiring 422. As the control circuit 420, the battery control circuit described in the above embodiment can be used. The wiring 421 is electrically connected to the positive electrodes of the plurality of the secondary batteries 400 through the conductive plate 413. The wiring 422 is electrically connected to the negative electrodes of the plurality of the secondary batteries 400 through the conductive plate 414.

[Secondary Battery Pack]

Next, examples of the power storage system of one embodiment of the present invention are described with reference to FIG. 22A, FIG. 22B, and FIG. 22C.

Figure 22A:
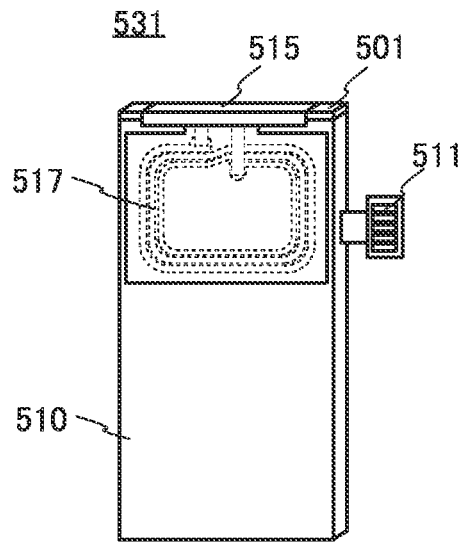
FIG. 22A is a diagram illustrating an example of an external appearance of a secondary battery pack.
Figure 22B:
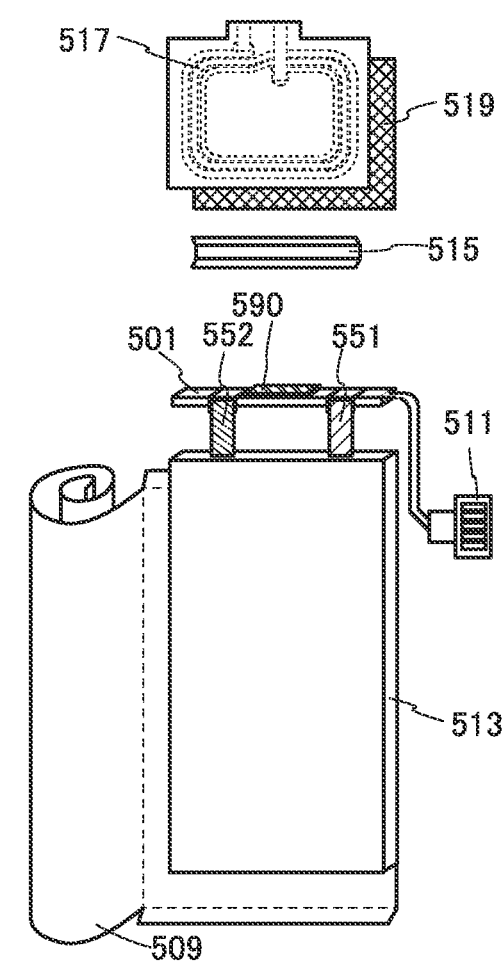
FIG. 22B is a diagram illustrating an example of a structure of the secondary battery pack.

FIG. 22A is a diagram illustrating an external appearance of a secondary battery pack 531. FIG. 22B illustrates a structure of the secondary battery pack 531. The secondary battery pack 531 includes a circuit board 501 and a secondary battery 513. A label 509 is attached onto the secondary battery 513. The circuit board 501 is fixed by a sealant 515. The secondary battery pack 531 also includes an antenna 517.

The circuit board 501 includes a control circuit 590. As the control circuit 590, the battery control circuit described in the above embodiment can be used. For example, as illustrated in FIG. 22B, the control circuit 590 is provided over the circuit board 501. The circuit board 501 is electrically connected to a terminal 511. The circuit board 501 is electrically connected to the antenna 517, one 551 of a positive electrode lead and a negative electrode lead of the secondary battery 513, and the other 552 of the positive electrode lead and the negative electrode lead.

Figure 22C:
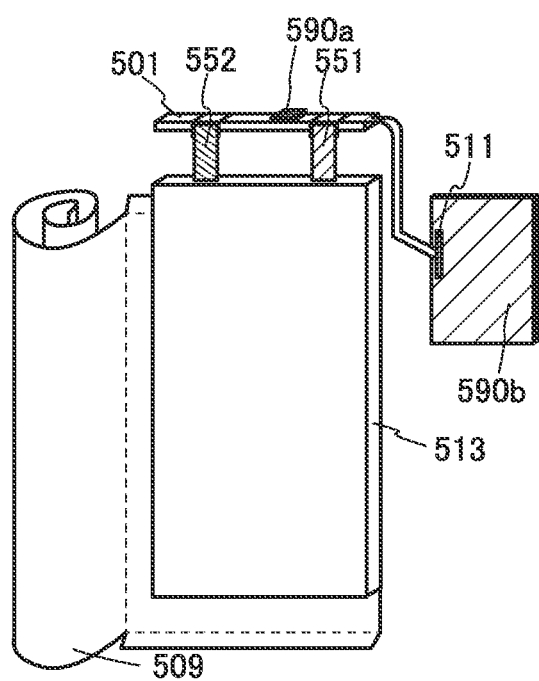
FIG. 22C is a diagram illustrating an example of a structure of the secondary battery pack.

Alternatively, as illustrated in FIG. 22C, the secondary battery pack system may include a circuit system 590a provided over the circuit board 501 and a circuit system 590b electrically connected to the circuit board 501 through the terminal 511. For example, a part of the control circuit of one embodiment of the present invention is provided in the circuit system 590a, and another part thereof is provided in the circuit system 590b.

The shape of the antenna 517 is not limited to a coil shape and may be a linear shape or a plate shape. An antenna such as a planar antenna, an aperture antenna, a traveling-wave antenna, an EH antenna, a magnetic-field antenna, or a dielectric antenna may be used. Alternatively, the antenna 517 may be a flat-plate conductor. This flat-plate conductor can serve as one of conductors for electric field coupling. That is, the antenna 517 can serve as one of two conductors of a capacitor. Thus, electric power can be transmitted and received not only by an electromagnetic field or a magnetic field but also by an electric field.

The secondary battery pack 531 includes a layer 519 between the antenna 517 and the secondary battery 513. The layer 519 has a function of blocking an electromagnetic field from the secondary battery 513, for example. As the layer 519, for example, a magnetic body can be used.

The secondary battery 513 may include a wound battery element. The battery element includes a negative electrode, a positive electrode, and a separator. The battery element is obtained, for example, through winding a sheet of a stack in which the negative electrode overlaps with the positive electrode with the separator interposed therebetween.

This embodiment can be combined with any of the other embodiments as appropriate.

Embodiment 5

In this embodiment, an example of a vehicle equipped with a power storage system which is one embodiment of the present invention is described. Examples of the vehicle include an automobile, a motorcycle, and a bicycle.

The use of power storage systems in vehicles enables production of next-generation clean energy vehicles such as hybrid electric vehicles (HEVs), electric vehicles (EVs), and plug-in hybrid electric vehicles (PHEVs).

Figure 23A:
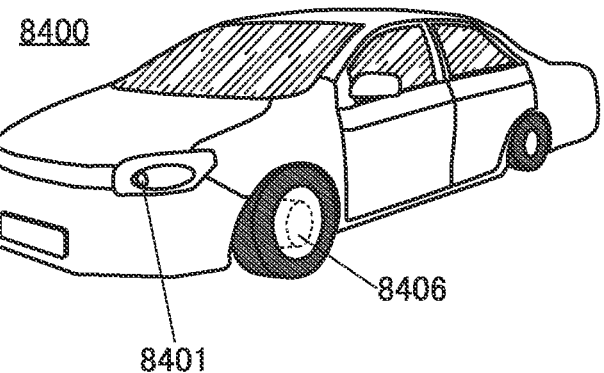
FIG. 23A is a diagram illustrating a vehicle of one embodiment of the present invention.
Figure 23B:
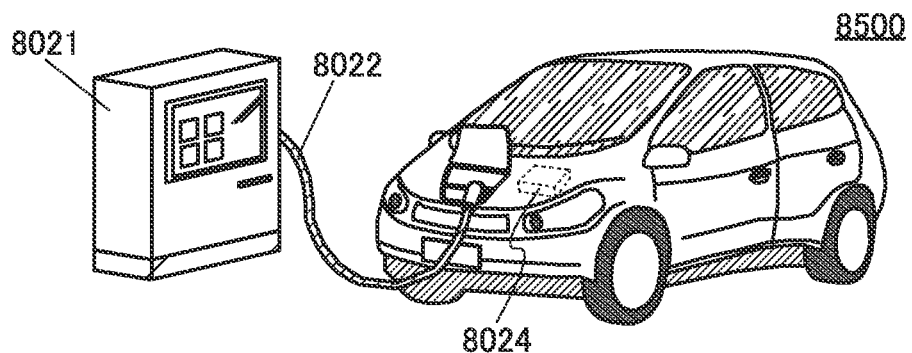
FIG. 23B is a diagram illustrating a vehicle of one embodiment of the present invention.
Figure 23C:
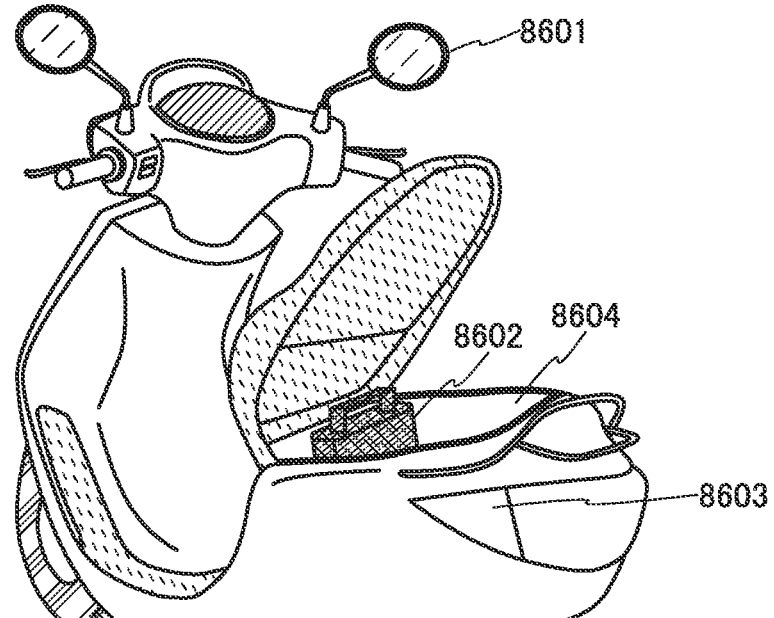
FIG. 23C is a diagram illustrating a vehicle of one embodiment of the present invention.

FIG. 23A, FIG. 23B, and FIG. 23C each illustrate an example of a vehicle using the power storage system which is one embodiment of the present invention. An automobile 8400 illustrated in FIG. 23A is an electric vehicle that runs on an electric motor as a power source. Alternatively, the automobile 8400 is a hybrid electric vehicle capable of driving using either an electric motor or an engine with an appropriate selection. The use of one embodiment of the present invention can achieve a high-mileage vehicle. The automobile 8400 includes a power storage system. The power storage system is used not only for driving an electric motor 8406, but also for supplying electric power to a light-emitting device such as a headlight 8401 or a room light (not illustrated).

The power storage system can also supply electric power to a display device of a speedometer, a tachometer, or the like included in the automobile 8400. Furthermore, the power storage system can supply electric power to a navigation system or the like included in the automobile 8400.

An automobile 8500 illustrated in FIG. 23B can be charged when a power storage system 8024 included in the automobile 8500 is supplied with electric power from external charging equipment by a plug-in system, a contactless power feeding system, or the like. FIG. 23B illustrates the state in which the power storage system 8024 included in the automobile 8500 is charged from a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. With the use of a plug-in technique, the power storage system 8024 included in the automobile 8500 can be charged by being supplied with electric power from the outside, for example. The charging can be performed by converting AC electric power into DC electric power through a converter, such as an AC-DC converter.

Although not illustrated, the vehicle may include a power receiving device so that it can be charged by being supplied with electric power from an above-ground power transmitting device in a contactless manner. In the case of the contactless power feeding system, by incorporating a power transmitting device in a road or an exterior wall, charging can be performed not only when the electric vehicle is stopped but also when driven. In addition, the contactless power feeding system may be utilized to perform transmission and reception of electric power between vehicles. A solar cell may be provided in the exterior of the automobile to charge the power storage system when the automobile stops or moves. To supply electric power in such a contactless manner, an electromagnetic induction method or a magnetic resonance method can be used.

FIG. 23C is an example of a two-wheeled vehicle using the power storage system of one embodiment of the present invention. A motor scooter 8600 illustrated in FIG. 23C includes a power storage system 8602, side mirrors 8601, and indicator lights 8603. The power storage system 8602 can supply electricity to the indicator lights 8603.

In the motor scooter 8600 illustrated in FIG. 23C, the power storage system 8602 can be stored in an under-seat storage 8604. The power storage system 8602 can be stored in the under-seat storage 8604 even when the under-seat storage 8604 is small.

Figure 24A:
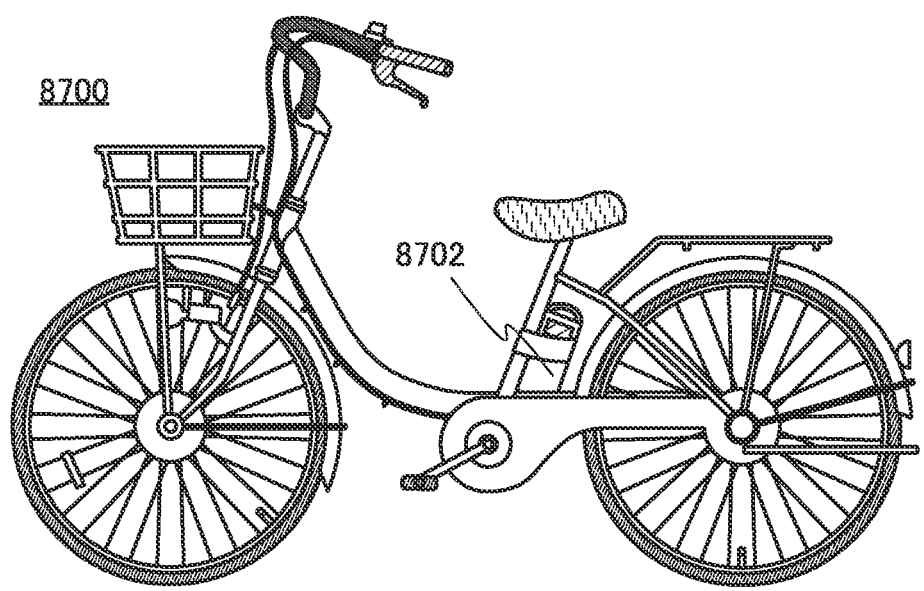
FIG. 24A is a diagram illustrating an electric device of one embodiment of the present invention.

FIG. 24A is an example of an electric bicycle using the power storage system of one embodiment of the present invention. The power storage system of one embodiment of the present invention can be used for an electric bicycle 8700 illustrated in FIG. 24A. The power storage system of one embodiment of the present invention includes a plurality of storage batteries, a protective circuit, and a neural network, for example.

Figure 24B:
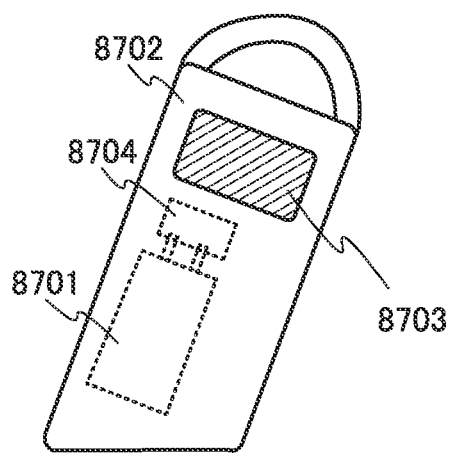
FIG. 24B is a diagram illustrating an example of a power storage device of one embodiment of the present invention.

The electric bicycle 8700 includes a power storage system 8702. The power storage system 8702 can supply electricity to a motor that assists a rider. The power storage system 8702 is portable, and FIG. 24B illustrates the state where the power storage system 8702 is detached from the bicycle. A plurality of storage batteries 8701 included in the power storage system of one embodiment of the present invention are incorporated in the power storage system 8702, and the remaining battery capacity and the like can be displayed on a display portion 8703. The power storage system 8702 also includes a control circuit 8704 of one embodiment of the present invention. The control circuit 8704 is electrically connected to a positive electrode and a negative electrode of the storage battery 8701. The battery control circuit described in the above embodiment can be used as the control circuit 8704.

This embodiment can be combined with any of the other embodiments as appropriate.

Embodiment 6

In this embodiment, examples of electronic devices on which the power storage system described in the above embodiments is mounted will be described.

Figure 25A:
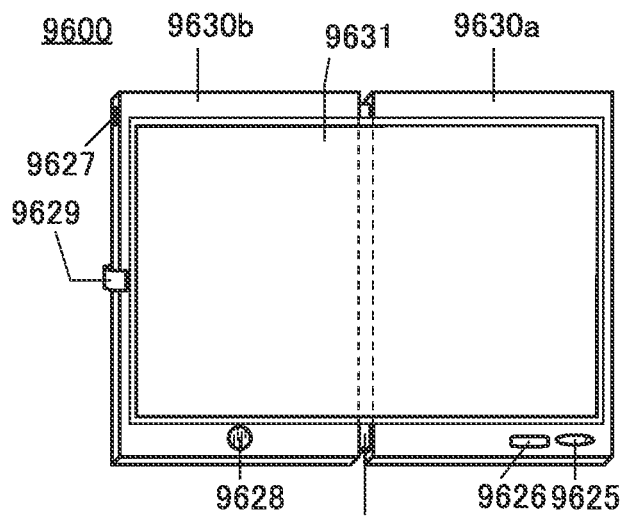
FIG. 25A is a diagram illustrating an electric device of one embodiment of the present invention.
Figure 25B:
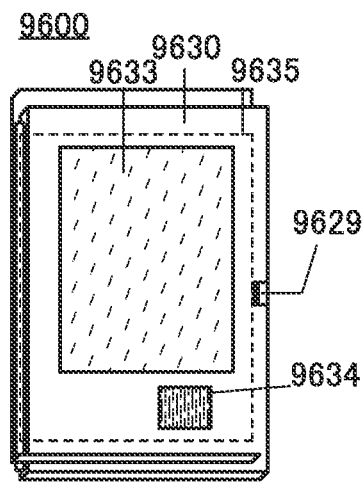
FIG. 25B is a diagram illustrating the electric device of one embodiment of the present invention.

Next, FIG. 25A and FIG. 25B illustrate an example of a foldable tablet terminal (including a clamshell tablet). A tablet terminal 9600 illustrated in FIG. 25A and FIG. 25B includes a housing 9630a, a housing 9630b, a movable portion 9640 connecting the housing 9630a and the housing 9630b, a display portion 9631, a display mode changing switch 9626, a power switch 9627, a power saving mode changing switch 9625, a fastener 9629, and an operation switch 9628. By using a flexible panel for the display portion 9631, the tablet terminal can have a larger display portion. FIG. 25A illustrates the tablet terminal 9600 that is opened, and FIG. 25B illustrates the tablet terminal 9600 that is closed.

The tablet terminal 9600 includes a power storage unit 9635 inside the housing 9630a and the housing 9630b. The power storage unit 9635 is provided across the housing 9630a and the housing 9630b, passing through the movable portion 9640.

Part of the display portion 9631 can be a touch panel region and data can be input when a displayed operation key is touched. When a position where a keyboard display switching button is displayed on the touch panel is touched with a finger, a stylus, or the like, keyboard buttons can be displayed on the display portion 9631.

With the display mode switch 9626, a user can select switching of the display orientation such as a portrait mode and a landscape mode, and switching between a monochrome display and color display, for example. With the power saving mode changing switch 9625, display luminance can be optimized in accordance with the amount of external light in use, which is detected with an optical sensor incorporated in the tablet terminal 9600. Another detection device including a sensor for detecting inclination, such as a gyroscope sensor or an acceleration sensor, may be incorporated in the tablet terminal, in addition to the optical sensor.

FIG. 25B is the tablet terminal 9600 that is closed, and the tablet terminal 9600 includes the housing 9630, a solar cell 9633, and the power storage system of one embodiment of the present invention. The power storage system includes a control circuit 9634 and the power storage unit 9635. The battery control circuit described in the above embodiment can be used as the control circuit 9634.

The tablet terminal 9600 can be folded in half and thus can be folded such that the housing 9630a and the housing 9630b overlap with each other when not in use. The display portion 9631 can be protected owing to the holding, which increases the durability of the tablet terminal 9600.

The tablet terminal illustrated in FIG. 25A and FIG. 25B can also have a function of displaying various kinds of information (a still image, a moving image, a text image, and the like), a function of displaying a calendar, a date, the time, or the like on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the power storage unit 9635 can be charged efficiently.

Figure 25C:
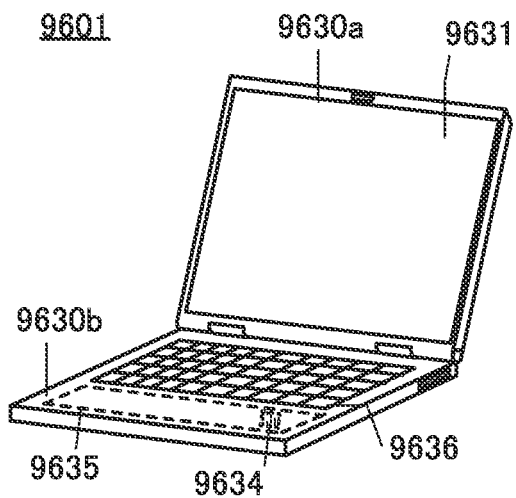
FIG. 25C is a diagram illustrating an electric device of one embodiment of the present invention.

Note that although FIG. 25A and FIG. 25B illustrate a structure in which the battery control circuit described in the above embodiment is used for a tablet terminal foldable in half, another structure may be employed. For example, application to a clamshell laptop personal computer is possible as illustrated in FIG. 25C. FIG. 25C illustrates a laptop personal computer 9601 including a display portion 9631 in a housing 9630a and a keyboard portion 9636 in a housing 9630b. The laptop personal computer 9601 includes the control circuit 9634 and the power storage unit 9635 which are described with reference to FIG. 25A and FIG. 25B. The battery control circuit described in the above embodiment can be used as the control circuit 9634.

Figure 26:
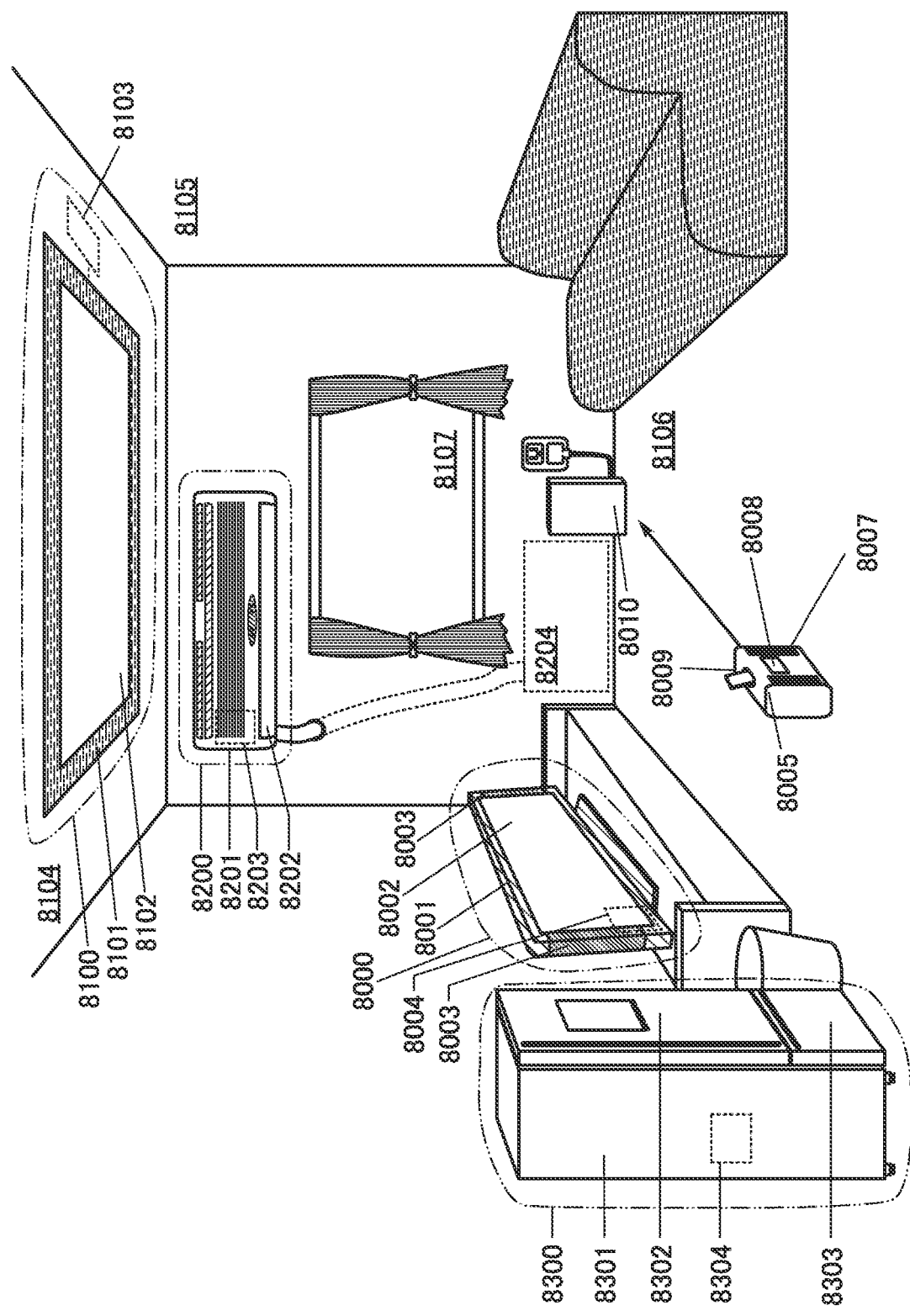
FIG. 26 is a diagram illustrating electric devices of one embodiment of the present invention.

FIG. 26 illustrates other examples of electronic devices. In FIG. 26, a display device 8000 is an example of an electronic device on which the power storage system of one embodiment of the present invention is mounted. Specifically, the display device 8000 corresponds to a display device for TV broadcast reception and includes a housing 8001, a display portion 8002, speaker portions 8003, a secondary battery 8004, and the like. A detection system according to one embodiment of the present invention is provided in the housing 8001. The display device 8000 can receive electric power from a commercial power source or can use electric power stored in the secondary battery 8004.

A semiconductor display device such as a liquid crystal display device, a light-emitting device in which a light-emitting element such as an organic EL element is provided in each pixel, an electrophoretic display device, a DMD (Digital Micromirror Device), a PDP (Plasma Display Panel), or an FED (Field Emission Display) can be used for the display portion 8002.

An audio input device 8005 also uses a secondary battery. The audio input device 8005 includes the power storage system described in the above embodiments. The audio input device 8005 includes a plurality of sensors (an optical sensor, a temperature sensor, a humidity sensor, a pressure sensor, an illuminance sensor, a motion sensor, and the like) including a microphone, in addition to wireless communication elements. In accordance with an instruction spoken by a user, another device can be operated; for example, powering of the display device 8000 can be controlled, the amount of light of a lighting device 8100 can be controlled, or the like. The audio input device 8005 is capable of audio operation of a peripheral device and replaces a manual remote controller.

The audio input device 8005 includes a wheel or a mechanical transfer means and is configured to move in a direction in which speaking by a user is heard to precisely receive an instruction with the incorporated microphone and display the content on the display portion 8008, or to allow the user to perform a touch input operation on the display portion 8008.

The audio input device 8005 can also function as a charging doc of a portable information terminal 8009 such as a smartphone. Electric power can be transmitted and received with or without a wire between the portable information terminal 8009 and the audio input device 8005. The portable information terminal 8009 does not particularly need to be carried indoors, and a load on the secondary battery and degradation thereof are desirably avoided while a necessary capacity is ensured. Thus, control or maintenance of the secondary battery or the like is desirably performed by the audio input device 8005. Since the audio input device 8005 includes the speaker 8007 and the microphone, hands-free conversation is possible even while the portable information terminal 8009 is charged. When the capacity of the secondary battery of the audio input device 8005 decreases, the audio input device 8005 moves in the direction indicated by the arrow and is charged by wireless charging from a charging module 8010 connected to an external power source.

The audio input device 8005 may be put on a stand. The audio input device 8005 may be provided with a wheel or a mechanical transfer means to move to a desired position. Alternatively, a stand or a wheel is not provided and the audio input device 8005 may be fixed to a desired position, for example, on the floor or the like.

Note that the display device includes, in its category, all of information display devices for personal computers, advertisement displays, and the like other than TV broadcast reception.

In FIG. 26, the tabletop lighting device 8100 is an example of an electronic device using a secondary battery 8103 which is controlled by a microprocessor that controls charging (including an APS). Specifically, the lighting device 8100 includes a housing 8101, a light source 8102, the secondary battery 8103, and the like. Although FIG. 26 illustrates the case where the secondary battery 8103 is provided in a roof 8104 on which the housing 8101 and the light source 8102 are installed, the secondary battery 8103 may be provided in the housing 8101.

The lighting device 8100 can receive electric power from a commercial power source. Alternatively, the lighting device 8100 can use electric power stored in the secondary battery 8103.

Note that although the installation lighting device 8100 provided on the roof 8104 is illustrated in FIG. 26 as an example, the secondary battery 8103 can be used as an installation lighting device provided in, for example, a sidewall 8105, a floor 8106, a window 8107, or the like other than the roof 8104. Alternatively, the secondary battery can be used in a tabletop lighting device or the like.

As the light source 8102, an artificial light source which emits light artificially by using power can be used. Specifically, an incandescent lamp, a discharge lamp such as a fluorescent lamp, and a light-emitting element such as an LED or an organic EL element are given as examples of the artificial light source.

In FIG. 26, an air conditioner including an indoor unit 8200 and an outdoor unit 8204 is an example of an electronic device using a secondary battery 8203. Specifically, the indoor unit 8200 includes a housing 8201, an air outlet 8202, the secondary battery 8203, and the like. Although FIG. 26 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The air conditioner can receive electric power from a commercial power source, or can use electric power stored in the secondary battery 8203.

In FIG. 26, an electric refrigerator-freezer 8300 is an example of an electronic device using a secondary battery 8304. Specifically, the electric refrigerator-freezer 8300 includes a housing 8301, a door for refrigerator compartment 8302, a door for freezer compartment 8303, the secondary battery 8304, and the like. The secondary battery 8304 is provided in the housing 8301 in FIG. 26. The electric refrigerator-freezer 8300 can receive electric power from a commercial power source, or can use electric power stored in the secondary battery 8304.

In addition, in a time period when electronic devices are not used, particularly when the proportion of the amount of electric power which is actually used to the total amount of electric power which can be supplied from a commercial power source (such a proportion referred to as a usage rate of electric power) is low, electric power can be stored in the secondary battery, whereby an increase in the usage rate of electric power can be reduced in a time period when the electronic devices are used. For example, in the case of the electric refrigerator-freezer 8300, electric power can be stored in the secondary battery 8304 in night time when the temperature is low and the door for refrigerator compartment 8302 and the door for freezer compartment 8303 are not often opened and closed. On the other hand, in daytime when the temperature is high and the door for refrigerator compartment 8302 and the door for freezer compartment 8303 are frequently opened and closed, the secondary battery 8304 is used as an auxiliary power source; thus, the usage rate of electric power in daytime can be reduced.

A secondary battery can be provided in any electronic device other than the above-described electronic devices. According to one embodiment of the present invention, the secondary battery can have favorable cycle characteristics. Thus, the microprocessor that controls charging (including an APS) of one embodiment of the present invention is mounted on the electronic device described in this embodiment, whereby an electronic device with a longer lifetime can be obtained. This embodiment can be implemented in appropriate combination with the other embodiments.

FIG. 27A to FIG. 27E show examples of electronic devices on which the power storage system of one embodiment of the present invention is mounted. Examples of electronic devices to which the power storage system of one embodiment of the present invention is applied are television sets (also referred to as televisions or television receivers), monitors of computers or the like, digital cameras, digital video cameras, digital photo frames, mobile phones (also referred to as cellular phones or mobile phone devices), portable game machines, portable information terminals, audio reproducing devices, and large game machines such as pachinko machines, and the like.

Figure 27A:
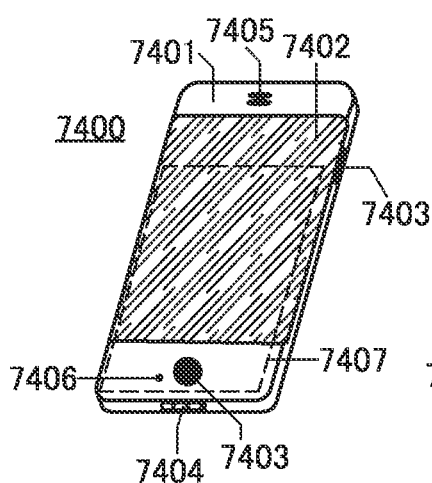
FIG. 27A is a diagram illustrating an electric device of one embodiment of the present invention.

FIG. 27A illustrates an example of a mobile phone. A mobile phone 7400 includes operation buttons 7403, an external connection port 7404, a speaker 7405, a microphone 7406, and the like in addition to a display portion 7402 incorporated in a housing 7401. The mobile phone 7400 includes the power storage system of one embodiment of the present invention. The power storage system of one embodiment of the present invention includes a storage battery 7407 and the battery control circuit described in the above embodiment.

Figure 27B:
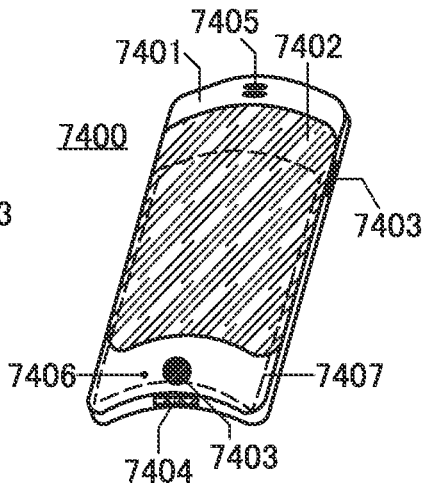
FIG. 27B is a diagram illustrating the electric device of one embodiment of the present invention.
Figure 27C:
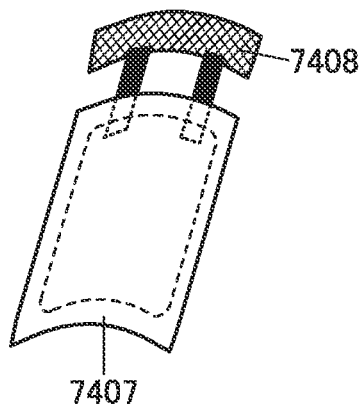
FIG. 27C is a diagram illustrating the electric device of one embodiment of the present invention.

FIG. 27B illustrates the state where the mobile phone 7400 is bent. When the mobile phone 7400 is entirely bent by external force, the storage battery 7407 provided therein may also be bent. In such a case, a storage battery having flexibility is preferably used as the storage battery 7407. FIG. 27C illustrates the state where the storage battery having flexibility is bent. A control circuit 7408 is electrically connected to the storage battery. The battery control circuit described in the above embodiment can be used as the control circuit 7408.

A storage battery having a flexible shape can also be incorporated along a curved inside/outside wall surface of a house or a building or a curved interior/exterior surface of an automobile.

Figure 27D:
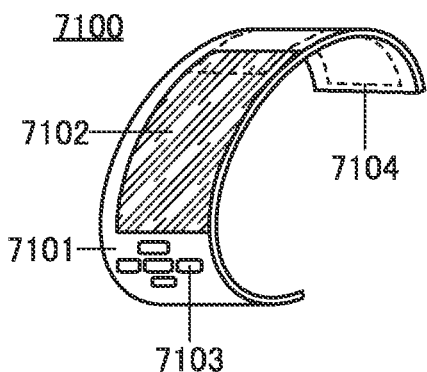
FIG. 27D is a diagram illustrating an electric device of one embodiment of the present invention.

FIG. 27D illustrates an example of a bangle-type display device. A portable display device 7100 includes a housing 7101, a display portion 7102, operation buttons 7103, and the power storage system of one embodiment of the present invention. The power storage system of one embodiment of the present invention includes a storage battery 7104 and the battery control circuit described in the above embodiment.

Figure 27E:
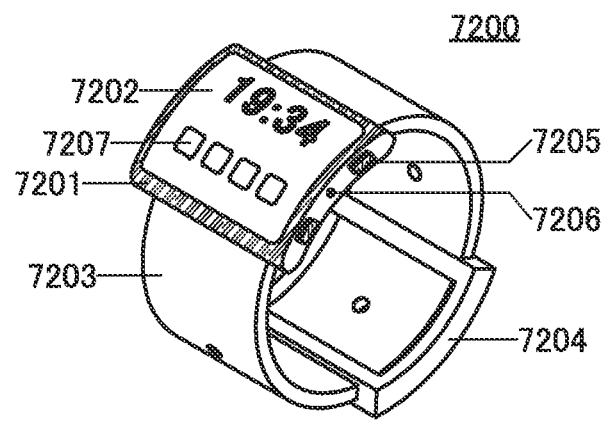
FIG. 27E is a diagram illustrating an electric device of one embodiment of the present invention.

FIG. 27E shows an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display portion 7202 with a curved display surface is provided, and images can be displayed on the curved display surface. The display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. For example, mutual communication with a headset capable of wireless communication enables hands-free calling.

The portable information terminal 7200 includes the input output terminal 7206, and can perform direct data communication with another information terminal via a connector. In addition, charging via the input output terminal 7206 is possible. The charging operation may be performed by wireless power feeding without using the input output terminal 7206.

The portable information terminal 7200 includes the power storage system of one embodiment of the present invention. The power storage system includes a storage battery and the battery control circuit described in the above embodiment.

The portable information terminal 7200 preferably includes a sensor. As the sensor, for example, a human body sensor such as a fingerprint sensor, a pulse sensor, or a temperature sensor; a touch sensor; a pressure sensitive sensor; an acceleration sensor; or the like is preferably mounted.

This embodiment can be combined with any of the other embodiments as appropriate.

Embodiment 7

In this embodiment, a market image where an OS transistor can be used will be described.
<Market Image>

Figure 28:
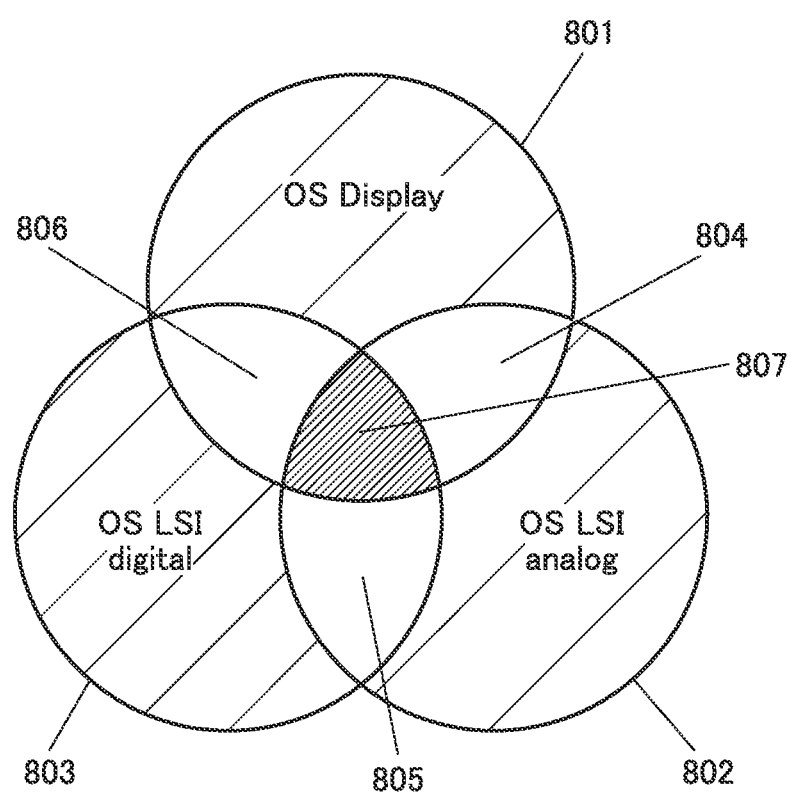
FIG. 28 is a diagram showing a market image.

FIG. 28 illustrates a market image where an OS transistor can be used. In FIG. 28, a region 801 represents a product field (OS Display) applicable to a display using an OS transistor; a region 802 represents a product field (OS LSI analog) where an LSI (Large Scale Integration) using an OS transistor can be applied to analog processing; and a region 803 represents a product field (OS LSI digital) where an LSI using an OS transistor can be applied to digital processing. An OS transistor can be favorably used in the three regions: the region 801, the region 802, and the region 803 illustrated in FIG. 28, in other words, three big markets.

In FIG. 28, a region 804 represents a region where the region 801 and the region 802 overlap with each other; a region 805 represents a region where the region 802 and the region 803 overlap with each other; a region 806 represents a region where the region 801 and the region 803 overlap with each other; and a region 807 represents a region where the region 801, the region 802, and the region 803 overlap with one another.

In OS Display, an FET structure such as a bottom-gate OS FET (BG OSFET) or a top-gate OS FET (TG OS FET) can be favorably used. Note that the bottom-gate OS FET includes a channel-etched FET and a channel-protective FET. In addition, the top-gate OS FET includes a TGSA (Top Gate Self-Aligned) FET.

In OS LSI analog and OS LSI digital, a gate-last OS FET (GL OS FET) can be favorably used, for example.

Note that the above-described transistors each include a single-gate transistor with one gate electrode, a dual-gate transistor with two gate electrodes, or a transistor with three or more gate electrodes. Among dual-gate transistors, it is particularly preferable to use an S-channel (surrounded channel) transistor.

As products included in OS display (the region 801), products in which an LCD (liquid crystal display), EL (Electro Luminescence), and an LED (Light Emitting Diode) are included in display devices can be given. Any of the above display devices is favorably combined with Q-Dot (Quantum Dot).

Note that in this embodiment, EL includes organic EL and inorganic EL. In addition, in this embodiment, LED includes a micro LED, a mini LED, and a macro LED. Note that in this specification and the like, a light-emitting diode with a chip size less than 10000 $\mu m^2$ is referred to as a micro LED, a light-emitting diode with a chip size greater than 10000 $\mu m^2$ and less than or equal to 1 $mm^2$ is referred to as a mini LED, and a light-emitting diode with a chip size greater than 1 $mm^2$ is referred to as a macro LED, in some cases.

As products included in OS LSI analog (the region 802), a sound-source identification device that covers a wide frequency range (e.g., an audible sound with a frequency of 20 Hz to 20 kHz or ultrasonic wave of 20 kHz or greater), a battery control device (a battery control IC, a battery protection IC, or a battery management system), and the like can be given.

As products included in OS LSI digital (the region 803), a memory device, a CPU (Central Processing Unit) device, a GPU (Graphics Processing Unit) device, an FPGA (field-programmable gate array) device, a power device, a hybrid device in which an OS LSI and an Si LSI are stacked or mixed, a light-emitting device, and the like can be given.

As products included in the region 804, a display device including an infrared ray sensor or a near-infrared ray sensor in a display region, a sensor-equipped signal processing device including an OS FET, an implantable biosensor device, and the like can be given. As products included in the region 805, a processing circuit including an A/D (Analog to Digital) conversion circuit or the like, an AI (Artificial Intelligence) device including the processing circuit, and the like can be given. As products included in the region 806, a display device using a Pixel AI technology can be given, for example. Note that in this specification and the like, the Pixel AI technology refers to a technology utilizing a memory composed of an OS FET or the like included in a pixel circuit of a display.

As a product included in the region 807, a composite product that combines a variety of products included in the region 801 to the region 806 can be given.

A semiconductor device of one embodiment of the present invention can be applied to a variety of product fields, as illustrated in FIG. 28. That is, a semiconductor device of one embodiment of the present invention can be applied to a lot of markets.

This embodiment can be implemented in combined with any of the structures described in the other embodiments as appropriate.

(Supplementary Notes on the Description in this Specification and the Like)

The description of the above embodiments and each structure in the embodiments are noted below.

One embodiment of the present invention can be constituted by combining, as appropriate, the structure described in each embodiment with the structures described in the other embodiments. In addition, in the case where a plurality of structure examples are described in one embodiment, the structure examples can be combined as appropriate.

Note that content (or may be part of the content) described in one embodiment can be applied to, combined with, or replaced with another content (or may be part of the content) described in the embodiment and/or content (or may be part of the content) described in another embodiment or other embodiments.

Note that in each embodiment, content described in the embodiment is content described using a variety of diagrams or content described with text disclosed in the specification.

Note that by combining a diagram (or may be part thereof) described in one embodiment with another part of the diagram, a different diagram (or may be part thereof) described in the embodiment, and/or a diagram (or may be part thereof) described in another embodiment or other embodiments, much more diagrams can be formed.

In addition, in this specification and the like, components are classified on the basis of the functions, and shown as blocks independent of one another in block diagrams. However, in an actual circuit or the like, it is difficult to separate components on the basis of the functions, and there are such a case where one circuit is associated with a plurality of functions and a case where a plurality of circuits are associated with one function. Therefore, blocks in the block diagrams are not limited by the components described in this specification, and the description can be changed appropriately depending on the situation.

Furthermore, in the drawings, the size, the layer thickness, or the region is shown with given magnitude for description convenience. Therefore, the size, the layer thickness, or the region is not necessarily limited to the illustrated scale. Note that the drawings are schematically shown for clarity, and embodiments of the present invention are not limited to shapes, values or the like shown in the drawings. For example, variation in signal, voltage, or current due to noise, variation in signal, voltage, or current due to difference in timing, or the like can be included.

In this specification and the like, expressions "one of a source and a drain" (or a first electrode or a first terminal) and "the other of the source and the drain" (or a second electrode or a second terminal) for the other of the source and the drain are used in the description of the connection relationship of a transistor. This is because the source and the drain of the transistor change depending on the structure, operating conditions, or the like of the transistor. Note that the source or the drain of the transistor can also be referred to as a source (drain) terminal, a source (drain) electrode, or the like as appropriate depending on the situation.

In addition, in this specification and the like, the terms "electrode" and "wiring" do not functionally limit these components. For example, an "electrode" is used as part of a "wiring" in some cases, and vice versa. Furthermore, the term "electrode" or "wiring" also includes the case where a plurality of "electrodes" or "wirings" are formed in an integrated manner, for example.

Furthermore, in this specification and the like, "voltage" and "potential" can be interchanged with each other as appropriate. The voltage refers to a potential difference from a reference potential, and when the reference potential is a ground voltage, for example, the voltage can be rephrased into the potential. The ground potential does not necessarily mean 0 V. Note that potentials are relative values, and a potential applied to a wiring or the like is sometimes changed depending on the reference potential.

Note that in this specification and the like, the terms such as "film" and "layer" can be interchanged with each other depending on the case or according to circumstances. For example, the term "conductive layer" can be changed into the term "conductive film" in some cases. As another example, the term "insulating film" can be changed into the term "insulating layer" in some cases.

In this specification and the like, a switch has a function of controlling whether current flows or not by being in a conduction state (an on state) or a non-conduction state (an off state). Alternatively, a switch has a function of selecting and changing a current path.

In this specification and the like, channel length refers to, for example, the distance between a source and a drain in a region where a semiconductor (or a portion where current flows in a semiconductor when a transistor is in an on state) and a gate overlap with each other or a region where a channel is formed in a top view of the transistor.

In this specification and the like, channel width refers to, for example, the length of a portion where a source and a drain face each other in a region where a semiconductor (or a portion where current flows in a semiconductor when a transistor is in an on state) and a gate electrode overlap with each other or a region where a channel is formed.

In this specification and the like, the expression "A and B are connected" includes the case where A and B are electrically connected as well as the case where A and B are directly connected. Here, the expression "A and B are electrically connected" includes the case where electric signals can be transmitted and received between A and B when an object having any electric action exists between A and B.

Example 1

In this example, changes in time taken for CC charging and time taken for CV charging in secondary batteries that differ in voltage at the start of charging and temperature were measured.

FIG. 29A, FIG. 29B, FIG. 30A, and FIG. 30B each show a relation between a voltage at the start of charging (hereinafter, a voltage Vst) and each of the time taken for CC charging (hereinafter, a time Tccr) and the time taken for CV charging (hereinafter, a time Tcvr). The upper limit voltage of the CC charging was set to 4.2 V.

Figure 29A:
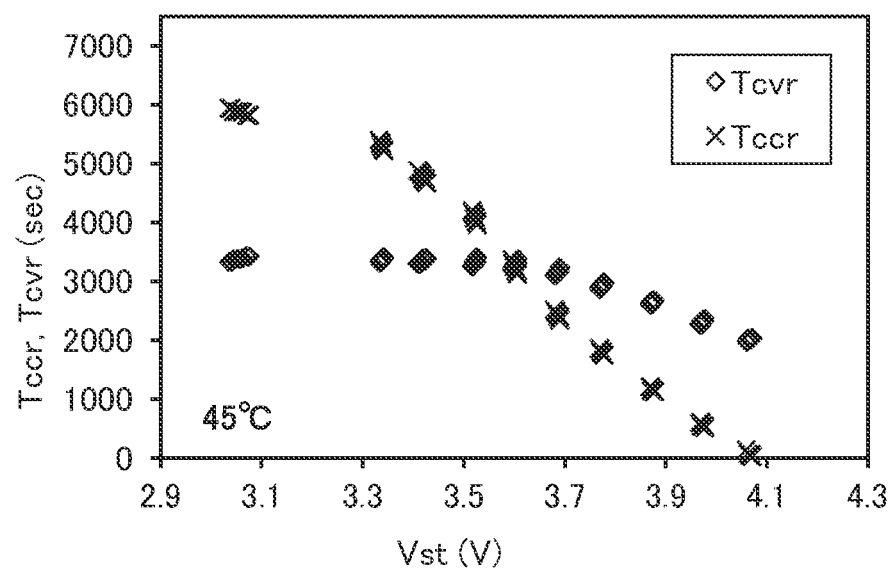
FIG. 29A is a diagram showing charging time of a secondary battery.

FIG. 29A shows a relation between the voltage Vst and each of the time Tccr and the time Tcvr at a secondary battery temperature of 45° C. The voltage Vst is higher as the remaining capacity SOC is larger. Thus, the time Tccr tended to be short when the voltage Vst was high.

Within the voltage range where the voltage Vst is much lower than the upper limit voltage of charging, the time Tcvr tended to be stable with a small variation, which indicates the low dependence on the voltage Vst. On the other hand, within the range where the voltage Vst is high, Tcvr decreased as the voltage Vst increased even when the voltage Vst did not reach the upper limit voltage, which indicates a noticeable dependence.

Figure 29B:
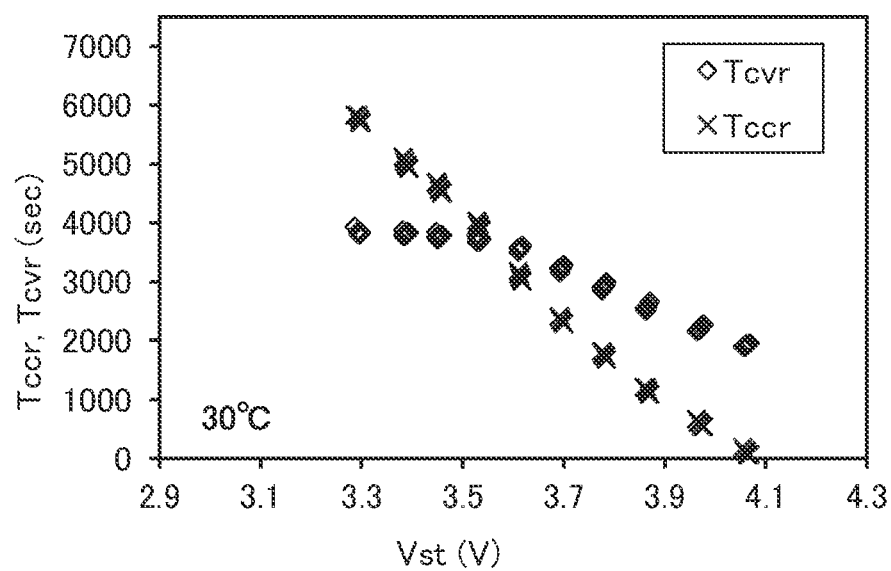
FIG. 29B is a diagram showing charging time of a secondary battery.
Figure 30A:
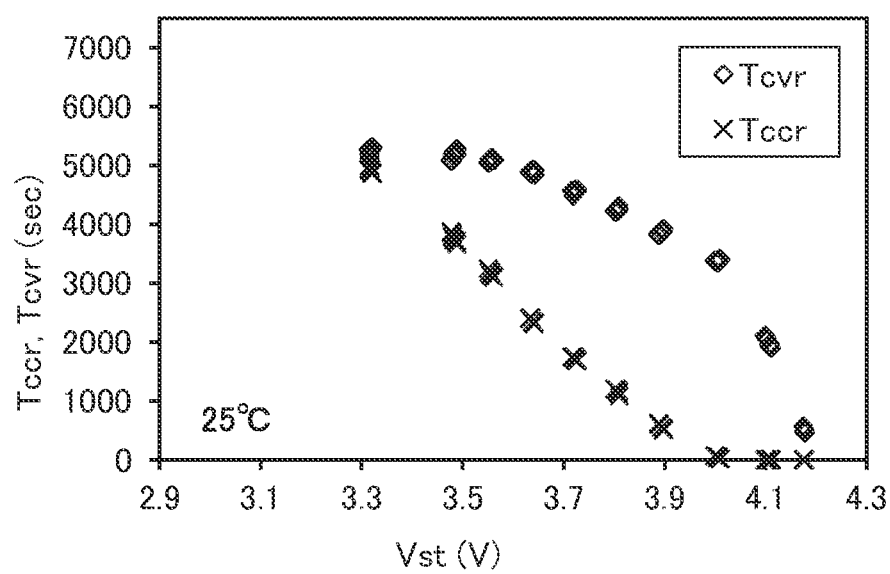
FIG. 30A is a diagram showing charging time of a secondary battery.
Figure 30B:
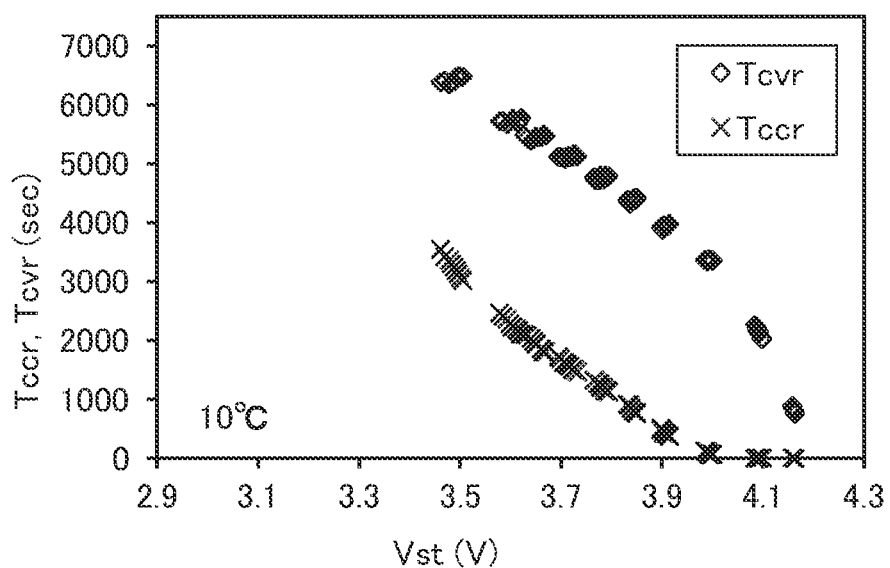
FIG. 30B is a diagram showing charging time of a secondary battery.

FIG. 29B, FIG. 30A, and FIG. 30B show a relation between the voltage Vst and each of the time Tccr and the time Tcvr at a secondary battery temperature of 30° C., 25° C., and 10° C., respectively. As the temperature decreased, the voltage Vst tended to have a narrower range in which the time Tccr is stable.

As shown in FIG. 29A, FIG. 29B, FIG. 30A, and FIG. 30B, the time Tcvr was found to be greatly affected by the secondary battery temperature and the time Tccr.

Example 2

In this example, changes with cycles in the time Tccr and the time Tcvr taken for charging of a secondary battery and charging behavior of the secondary battery were evaluated.

Figure 31A:
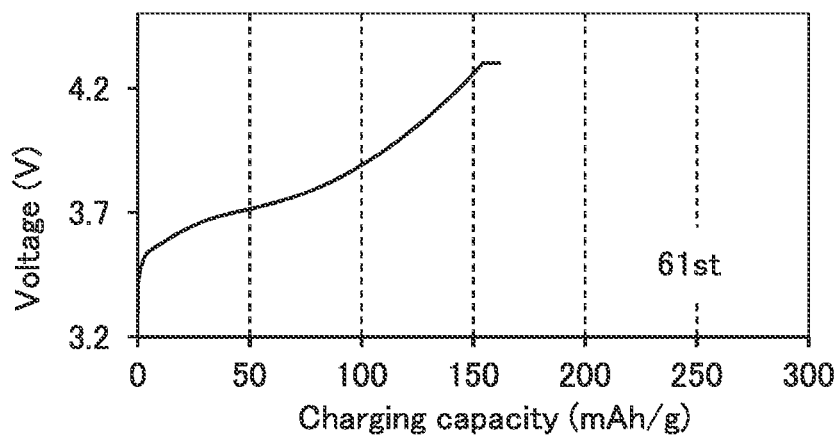
FIG. 31A is a charging curve of a secondary battery.
Figure 31B:
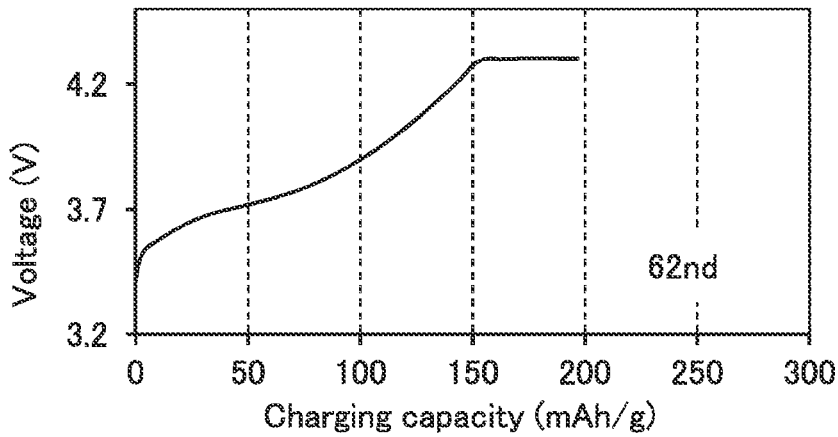
FIG. 31B is a charging curve of the secondary battery.
Figure 31C:
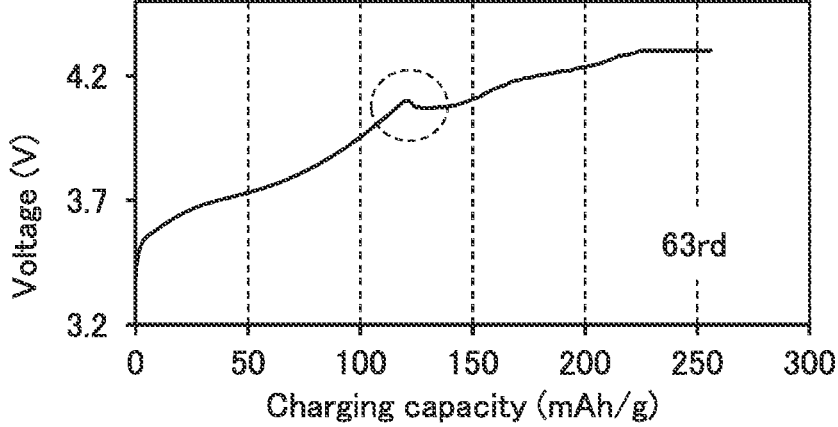
FIG. 31C is a charging curve of the secondary battery.

A secondary battery underwent charging and discharging cycles. FIG. 31A, FIG. 31B, and FIG. 31C respectively show charging curves of the 61st, the 62nd, and the 63rd cycles. In FIG. 31A, FIG. 31B, and FIG. 31C, the horizontal axis represents charging capacity and the vertical axis represents charging voltage.

In the 63rd cycle, a waveform indicating a micro short circuit was observed in a region surrounded by a dashed line.

In the 62nd cycle that is one cycle before the cycle in which the waveform indicating a micro short circuit was observed, the time Tcvr, i.e., the time taken for constant voltage charging was noticeably longer than that in the 61st cycle. In addition, the time Tccr, i.e., the time for constant current charging was also longer.

Figure 32:
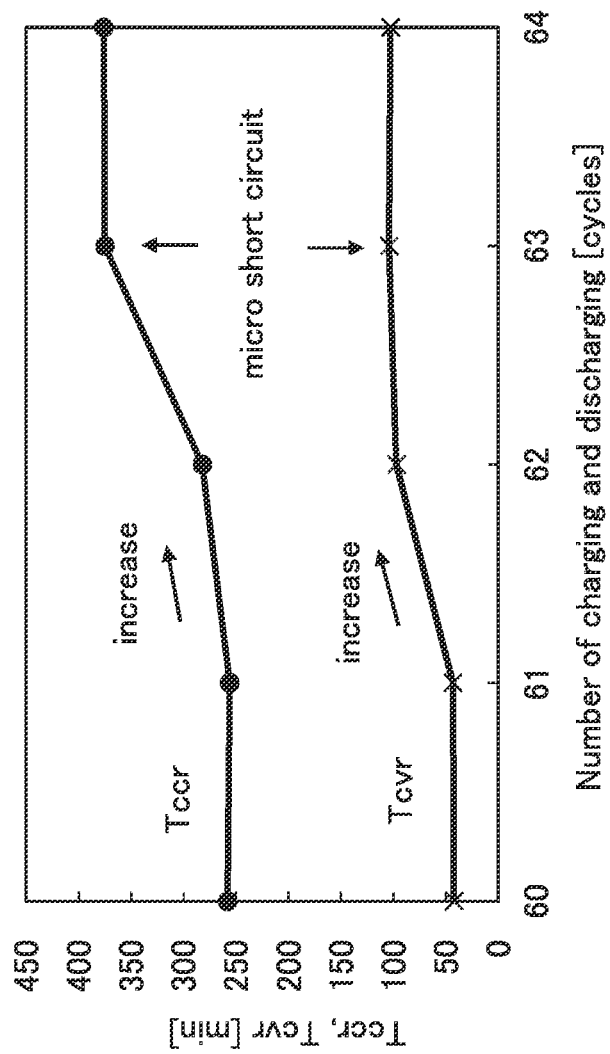
FIG. 32 is a diagram showing a charging time of a secondary battery.

FIG. 32 shows the time Tcvr and the time Tccr of the 60th to the 64th charging and discharging cycles. The horizontal axis represents the number of charging and discharging cycles and the vertical axis represents the time Tcvr and the time Tccr. The time Tcvr and the time Tccr were found to increase in the cycle just before the cycle in which a micro short circuit was indicated.

Reference Numerals

Hi: signal, I: current, IN: terminal, IN1: terminal, IN2: terminal, Iref: current, Iss1: current, Iss2: current, Iss3: current, Lo: signal, OUT: terminal, OUT2: terminal, Q: signal, QB: signal, RESET: signal, RESETB: signal, VB: voltage, VC: voltage, VR: voltage, Vdd: high potential signal, Vin: voltage, Vref1: voltage, Vref2: high potential signal, Vref3: high potential signal, t1: time, t2: time, t3: time, t4: time, 100: power storage device, 101: control circuit, 102: reference generation circuit, 103: timer circuit, 104: regulator, 105: power source, 106: counter, 121: secondary battery, 131: resistor, 137: protection circuit, 140: transistor, 150: transistor, 152: transistor, 153: transistor, 156: coil, 160: capacitor, 161: capacitor, 162: switch, 163: constant current source, 164: comparator, 165: transistor, 166: switch, 167: constant current source, 168: switch, 169: switch, 170: constant current source, 171: comparator, 172: comparator, 173: constant current source, 174: capacitor, 175: capacitor, 178: NAND circuit, 179: NAND circuit, 181: transistor, 182: transistor, 183: transistor, 184: transistor, 185: transistor, 186: transistor, 187: transistor, 188: transistor, 190: transistor, 191: current supply portion, 192: current supply portion, 193: current supply portion, 194: transistor, 195: transistor, 196: transistor, 197: transistor

The invention claimed is:
1. A method for operating a power storage device comprising a secondary battery, a control circuit configured to control a charging of the secondary battery, a reference generating circuit, and a timer circuit comprising a comparator, the method comprising:

generating a reference voltage and a reference current corresponding to a reference time of charging in the reference generating circuit in advance of charging;

supplying the reference voltage and the reference current from the reference generating circuit to the timer circuit, wherein the reference voltage is supplied to one of a non-inverting input terminal and an inverting input terminal of the comparator;

starting the charging of the secondary battery and supplying a first signal to inform that the charging of the secondary battery is started, wherein the first signal is supplied from the control circuit to the timer circuit;

generating a voltage corresponding to an elapsed time from when the charging of the secondary battery was started and supplying the voltage to the other one of the non-inverting input terminal and the inverting input terminal of the comparator; and giving a warning to a user and stopping the charging of the secondary battery when the voltage corresponding to the elapsed time exceeds the reference voltage corresponding to the reference time of charging in the reference generating circuit.

2. The method for operating the power storage device according to claim 1,
wherein the timer circuit comprises a capacitor,
wherein the timer circuit charges the capacitor with electric charges with an amount corresponding to a product of the reference current and the elapsed time, and
wherein the voltage corresponds to a potential difference between electrodes on both ends of the capacitor.

3. The method for operating the power storage device according to claim 1,
wherein the reference generating circuit generates the reference voltage by converting a digital signal supplied from the control circuit, and
wherein the reference voltage is an analog signal.

4. The method for operating the power storage device according to claim 1,
wherein the timer circuit comprises a transistor,
wherein the one of the non-inverting input terminal and the inverting input terminal of the comparator is electrically connected to one of a source and a drain of the transistor, and
wherein the transistor is turned off to retain the reference voltage supplied to the one of the non-inverting input terminal and the inverting input terminal of the comparator during the charging of the secondary battery.

5. The method for operating the power storage device according to claim 1,
wherein the timer circuit comprises a capacitor,
wherein a charging of the capacitor with the reference current is started when the first signal is supplied, and
wherein the voltage corresponds to a potential difference between electrodes on both ends of the capacitor.

6. A method for operating a power storage device comprising a secondary battery, a control circuit configured to control a charging of the secondary battery, a reference generating circuit, and a timer circuit comprising a comparator, the method comprising:

starting a first charging of the secondary battery and a measurement of a first elapsed time from when the first charging of the secondary battery was started;

terminating the first charging of the secondary battery and the measurement of the first elapsed time;

setting a reference time by adding the first elapsed time and a certain time;

generating a reference voltage and a reference current corresponding to the reference time in the reference generating circuit, supplying the reference voltage and the reference current from the reference generating circuit to the timer circuit, wherein the reference voltage is supplied to one of a non-inverting input terminal and an inverting input terminal of the comparator;

starting a second charging of the secondary battery and supplying a first signal to inform that the second charging of the secondary battery is started, wherein the first signal is supplied from the control circuit to the timer circuit;

generating a voltage corresponding to a second elapsed time from when the second charging of the secondary battery was started and supplying the voltage to the other one of the non-inverting input terminal and the inverting input terminal of the comparator; and giving a warning to a user and stopping the second charging of the secondary battery when the voltage exceeds the reference voltage.

7. The method for operating the power storage device according to claim 6,
wherein the timer circuit comprises a capacitor,
wherein the timer circuit charges the capacitor with electric charges with an amount corresponding to a product of the reference current and the second elapsed time, and
wherein the voltage corresponds to a potential difference between electrodes on both ends of the capacitor.

8. The method for operating the power storage device according to claim 6,
wherein the reference generating circuit generates the reference voltage by converting a digital signal supplied from the control circuit, and
wherein the reference voltage is an analog signal.

9. The method for operating the power storage device according to claim 6,
wherein the timer circuit comprises a transistor,
wherein the one of the non-inverting input terminal and the inverting input terminal of the comparator is electrically connected to one of a source and a drain of the transistor, and
wherein the transistor is turned off to retain the reference voltage supplied to the one of the non-inverting input terminal and the inverting input terminal of the comparator during the second charging of the secondary battery.

10. The method for operating the power storage device according to claim 6,
wherein the timer circuit comprises a capacitor,
wherein a charging of the capacitor with the reference current is started when the first signal is supplied, and
wherein the voltage corresponds to a potential difference between electrodes on both ends of the capacitor.

* * * * *